United States Patent [19]

Iwaki et al.

[11] Patent Number: 5,491,587
[45] Date of Patent: Feb. 13, 1996

[54] COLLIMATING LENS FOR OPTICAL SYSTEM USING SEMICONDUCTOR LASER

[75] Inventors: Makoto Iwaki; Koichi Maruyama; Makoto Iki, all of Tokyo, Japan

[73] Assignee: Asahi Kogaku Kogyo Kabushiki Kaisha, Tokyo, Japan

[21] Appl. No.: 909,040

[22] Filed: Jul. 6, 1992

Related U.S. Application Data

[63] Continuation-in-part of Ser. No. 769,764, Oct. 4, 1991, Pat. No. 5,173,809, which is a continuation of Ser. No. 486,600, Feb. 28, 1990, abandoned.

[30] Foreign Application Priority Data

| Feb. 28, 1989 | [JP] | Japan | 1-47589 |
| Feb. 28, 1989 | [JP] | Japan | 1-47590 |
| Jul. 25, 1991 | [JP] | Japan | 3-276080 |

[51] Int. Cl.[6] ............................ G02B 27/30; G02B 13/18
[52] U.S. Cl. ............................ 359/641; 359/717; 359/793
[58] Field of Search ............................ 359/708, 716–718, 359/784–786, 793–796, 641, 787, 788

[56] References Cited

U.S. PATENT DOCUMENTS

| 3,554,629 | 1/1971 | Takahashi . |
| 4,743,093 | 5/1988 | Oinen . |
| 4,753,524 | 6/1988 | Sugiyama . |
| 4,765,723 | 8/1988 | Takamura . |
| 4,909,616 | 3/1990 | Arai . |
| 4,927,247 | 5/1990 | Tanaka et al. ............................ 359/708 |
| 4,953,959 | 9/1990 | Ishiwata et al. . |
| 4,995,709 | 2/1991 | Iwata et al. ............................ 359/641 |
| 5,157,553 | 10/1992 | Phillips et al. ............................ 359/744 |
| 5,202,867 | 4/1993 | Matsui et al. ............................ 369/44.23 |
| 5,204,774 | 4/1993 | Owen ............................ 359/418 |
| 5,270,851 | 12/1993 | Makino et al. ............................ 359/206 |

FOREIGN PATENT DOCUMENTS

| 58-72114 | 4/1983 | Japan . |
| 59-23313 | 5/1984 | Japan . |
| 60-232519 | 11/1985 | Japan . |
| 61-177408 | 8/1986 | Japan . |
| 61-259215 | 11/1986 | Japan . |
| 62-35311 | 2/1987 | Japan . |
| 62-203112 | 9/1987 | Japan . |
| 62-269922 | 11/1987 | Japan . |
| 63-10118 | 1/1988 | Japan . |
| 1287519 | 2/1990 | Japan . |

*Primary Examiner*—James Phan
*Attorney, Agent, or Firm*—Sandler, Greenblum & Bernstein

[57] ABSTRACT

A collimating lens system comprises a chromatic aberration correction element and a converging lens which has both surfaces formed of a convex aspherical surface. The converging lens has no aberrations except chromatic aberration. The chromatic aberration correction element has small refractive power adapted to correct a chromatic aberration of the converging lens, and the element is constructed of positive and negative lenses cemented to each other. The positive lens and the negative lens have almost the same refractive index, and have different dispersion.

11 Claims, 51 Drawing Sheets

FIG. 30
MERIDIONAL 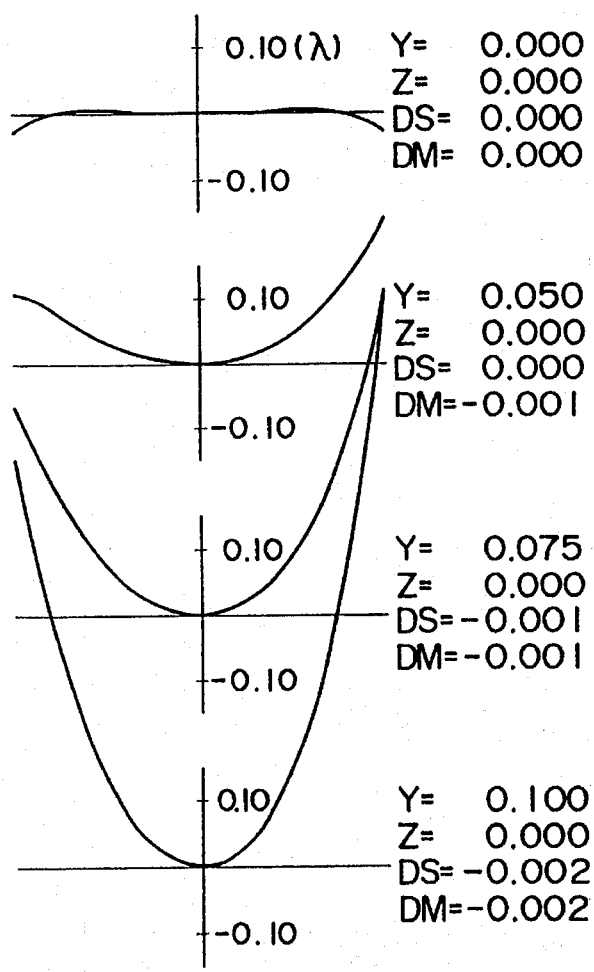 SAGITTAL 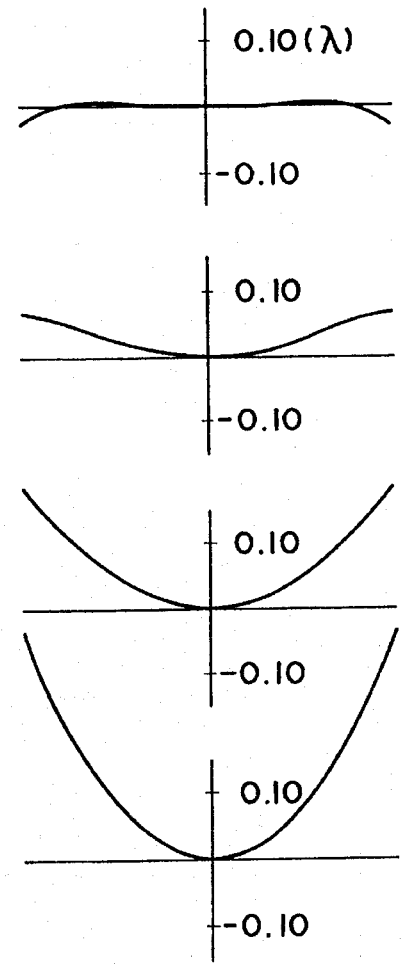

FIG.35
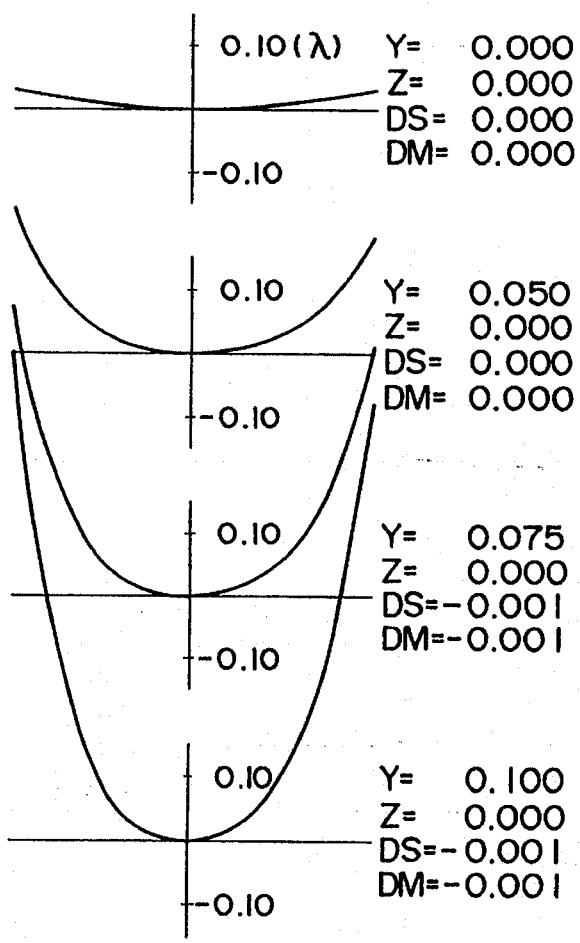
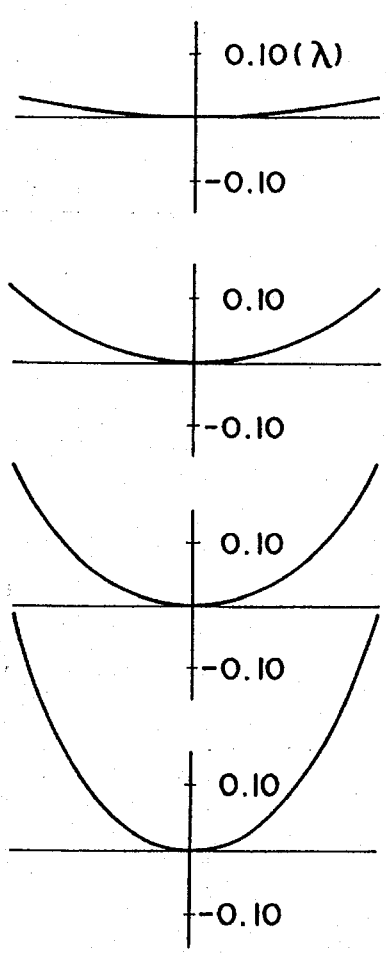

5,491,587

COLLIMATING LENS FOR OPTICAL SYSTEM USING SEMICONDUCTOR LASER

This is a continuation in part application of application Ser. No. 07/769,764, filed on Oct. 4, 1991, now U.S. Pat. No. 5,173,809, which is in turn a continuation of application Ser. No. 09/486,600, filed on Feb. 28, 1990, now abandoned, which application are expressly incorporated by reference in their entireties.

BACKGROUND OF THE INVENTION

1. Field of the Invention

This invention relates to a converging lens for converging parallel beam of light or a collimator lens for collimating, divergent beam of light. In particular, this invention relates to a lens installed in an optical system in which a semiconductor laser is used as a light source.

2. Description of the Prior Art

An optical system of an optical information recording/reproducing apparatus, such as optical disk apparatus etc. includes a light source having a semiconductor laser, and an objective lens converging (focusing) the luminous flux emitted from the light source onto an optical disk, and a signal detecting optical system which is adapted to read information recorded in the disk and error signals by reflected light from the optical disk.

Also, the objective lens is mounted on an actuator which is designed such that the objective lens can be finely moved at least in the optical axis direction thereof (focusing servo) so that an out of focus caused by warping of the disk, etc. can be corrected.

In a read only type apparatus, a plastic lens of which surfaces are aspherical is used as an objective lens so as to take the objective lens lightly. On the other hand, a glass molded lens is used as a collimator lens to avoid focal length change by change of temperature and/or humidity.

In any event, since it cannot correct a chromatic aberration with one lens, in a system in which record and reproduction are possible, the chromatic aberration correction lens is used. This type lens is constituted from an element of 4 pieces, in general.

However, in the 4 piece construction, there are problems that the arrangement space becomes large and the cost becomes high.

SUMMARY OF THE INVENTION

This invention has been accomplished in order to solve the above-mentioned problems. An object of the present invention is to provide a chromatic aberration correction lens which can be made at lower cost and is lighter in weight than the four piece glass lens.

The lens of the present invention is characterized in that the lens has a converging lens which has both surfaces formed of a convex aspherical surface, said converging lens has no aberrations except chromatic aberration; a chromatic aberration correction element having small refractive power adapted to correct a chromatic aberration of said converging lens, and said element is constructed of positive and negative lenses cemented with each other, said positive lens and said negative lens have almost the same refractive index and have different dispersion.

BRIEF DESCRIPTION OF THE DRAWINGS

FIG. 30 are wave aberration diagrams of the objective lens shown in FIG. 28.

FIG. 35 are wave aberration diagrams of the objective lens shown in FIG. 33.

DETAILED DESCRIPTION OF THE EMBODIMENTS

Figure 1:
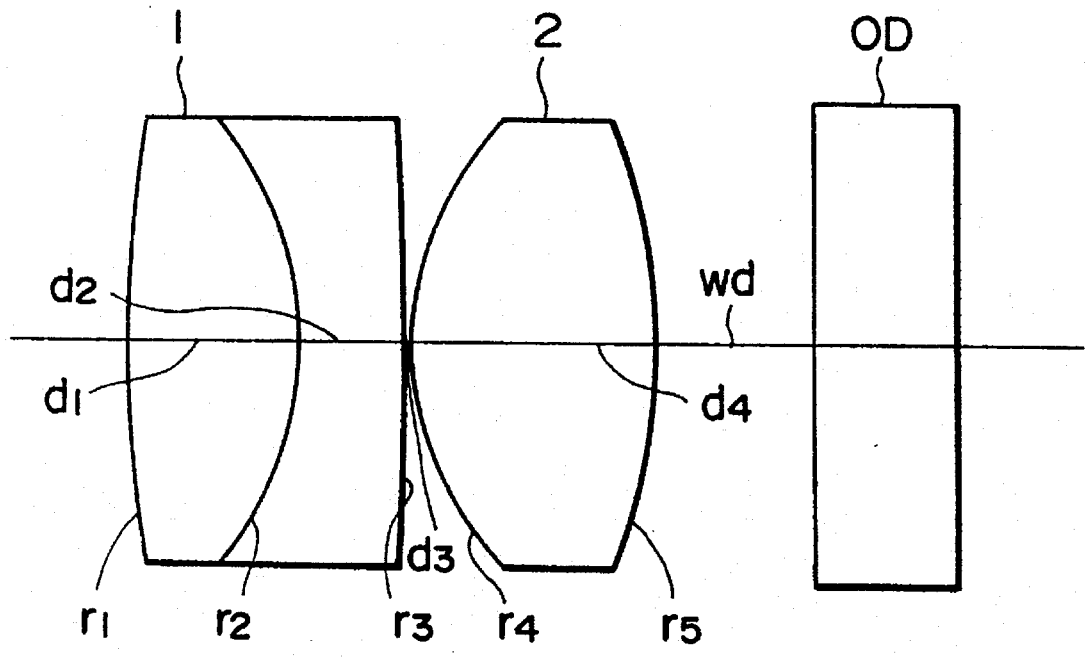
FIG. 1 is a lens diagram showing Embodiment 1 of an objective lens according to the present invention.

The embodiment of the present invention will now be described hereinafter with reference to the drawings. The present disclosure relates to subject matter contained in Japanese patent application No. H3-276080 (filed on Jul. 25, 1991 which is expressly incorporated herein by reference in its entirety.

The following embodiments 1 to 10 disclose the present invention applied to an objective lens for conversing a parallel beam of light.

The objective lenses shown in the following embodiments satisfy the conditions set forth hereunder.

$$|f/f a| < 0.20 \tag{1}$$

$$|r 2/f| > 0.70 \tag{2}$$

$$v_{n780} < 700 \tag{3}$$

$$v_{p780} > 800 \tag{4}$$

$$n_{p780} > 1.55 \tag{5}$$

$$|n_{p780} - n_{n780}| \times 10^5 < 20000 \tag{6}$$

$$(n_{p780} - 1)(1 - v_{n780}/v_{p7880}) > 0.2 \tag{7}$$

The symbolic characters used in the relations have the following meanings.

f: focal length of whole objective lens system fa: focal length of chromatic aberration correction element r2: radius of curvature of cemented surface nn780, nn830: refractive indexes of a negative lens in wavelengths 780 nm, 830 nm np780, np830: refractive indexes of a positive lens in wavelengths 780 nm, 830 nm vn780: dispersion of a negative lens in the vicinity of wavelength 780 nm wherein; vp780=nn780/(nn780−nn830)

vp780: dispersion of a positive lens in the vicinity of wavelength 780 am wherein; vp780=np780/(np780−np830)

The relation (1) stipulates a refracting power of the chromatic aberration correction element. If f/fa is lower than −0.02, it is difficult to maintain enough working distance. If f/fa is greater than +0.02, the lens becomes large in diameter and heavy in weight.

The relation (2) stipulates a condition for maintaining the edge thickness and restraining the center thickness of the positive lens of the chromatic aberration correction element.

If this condition is not satisfied, as a radius of curvature of the cemented surface is too small, a higher-order spherical aberration is generated, and as total length of the lens system is too long, it is impossible to restrain the weight thereof.

By the way, the higher the refractive index of the positive and negative lenses of the chromatic aberration correction element are, the larger the radius of curvature of the cemented surface is. Also, as a difference between the refractive indexes of the positive and negative lenses is small and the radius of curvature of the cemented surface is large, it is desirable that the dispersion of the positive lens is large and that of negative lens is small.

In general, regarding glass material, the higher the refractive index is, the higher a dispersion is. Therefore if glass material of the negative lens satisfies the relation (3), the chromatic aberration correcting effect is obtained and refractive index thereof is higher than 1.70.

If a glass material of the positive lens of the chromatic aberration correction element satisfies the relation (4), the element is able to obtain enough chromatic aberration correcting effect. However if this glass material does not satisfy the relation (5), great aberration is generated in the cemented surface due to the difference of the refractive indexes between the positive and negative lenses.

The relation (6) shows the condition for restraining the difference of refractive index of positive and negative lenses of the chromatic aberration correction element and reducing the generation of aberrations other than the chromatic aberration, as much as possible.

However, even in the case that the condition of the relation (6) is satisfied, it is desirable that the radius of curvature of the cemented is as large as possible. The reason is that when the radius of curvature of the cemented surfaces is small, the thickness of the whole chromatic aberration correction element becomes large in order to obtain the edge thickness of the positive lens, while when a lens having a large numerical aperture (NA) is used, a spherical aberration of a higher order is generated. Therefore, the chromatic aberration correction element must be formed of a combination of materials capable of increasing the radius of curvature of the cemented surfaces as much as possible, but within a limit able to exhibit a chromatic aberration correcting effect.

The relation (7) shows the condition for regulating the dispersion of quality of a chromatic aberration correction element in order to satisfy the chromatic aberration correcting effect. In case this condition is not satisfied, even if a conversing lens having the smallest dispersion CaFK95 (Merchandise Name: Sumida Kogaku) among raw materials for the use of an aspherical lens obtainable at present, the chromatic aberration correction element becomes too thick in order to sufficiently correct the chromatic aberration, thus resulting in a problem in respect of weight or space.

Suppose that a lens has no thickness, a change of lens power to a change of wavelength is shown as follows:

$$\Delta \text{ ncn}/(f \text{ cn} X(cn-1))$$

Wherein, $\Delta$ ncn is a changing ratio of refractive index to change of wavelength, f cn is a focal length of the converging lens, and n cn is refractive index in center use wavelength of the converging lens.

The larger the lens thickness is, the smaller the change of power is. If the lens thickness is larger than the focal length or the converging lens is a meniscus lens having very small radius of curvature, it is able to make the change of power zero. However, these constructions are not realistic and it is difficult to make chromatic aberration zero by one Piece aspherical lens. The lens of the present invention, therefore, has a chromatic aberration correction element.

The change of power of the chromatic aberration correction element to the change of wavelength is shown as follows.

$$|Cs| \times (\Delta np - \Delta nn)$$

Wherein,

Cs is the curvature of the cemented surface between the positive lens and the negative lens, $\Delta$ n n is the changing ratio of the refractive index of the negative lens to the change of wavelength, and $\Delta$n p is the changing ratio of the refractive index of the positive lens to the change of wavelength.

If it is able to set off the change of power of the converging lens against the same of the chromatic aberration correction element, chromatic aberration of the whole lens can be made zero.

To satisfy this condition, the lenses of the embodiments satisfy the following condition.

$$0.50 < |fcn \times Cs \times (\Delta nn - \Delta np)(ncn-1)/\Delta ncn| < 1.50 \quad (8)$$

If the condition (8) is not satisfied, the chromatic aberration is too corrected too much when value is larger than upper limit, the chromatic aberration is not corrected enough what value is smaller than the lower limit.

If glass material used in the chromatic aberration correction element, it is desirable to use the following condition to avoid the generation of various aberration at the cemented surface.

$$|np - nn| < 0.03 \quad (9)$$

Wherein, n n is refractive index in center use wavelength of the negative tens, n p is refractive index in center use wavelength of the positive lens.

If the condition (9) is not satisfied, since the power of the chromatic aberration correction element becomes large, the element and the converging lens have any aberrations set off against each other. The converging lens cannot be used for various apparatuses, because the power of the converging lens changes by whether the chromatic aberration correction element is used or not.

Next, we will consider a difference of the ratio of refractive index change between the positive and negative lenses of the chromatic aberration correction element. In general, Abbe number νd which indicates dispersion of glass material is shown as the following equation.

$$v\ d = (nd-1)/(n\ F - nC)$$

Wherein n d, n F, n C are refractive index at d-line (wavelength 588 nm), F-line (486nm) and C-line (656nm).

The following equation is obtained by transforming the above equation.

$$(nF - nC) = (nd-1)/vd$$

Since it is considered that the ratio $\Delta$n of the refractive index to change of wavelength is proportional to the value of (nF−nC), the following condition can be obtained.

$$\Delta n = \alpha \times (nd-1)/vd$$

$$\Delta np - \Delta nn = \alpha X((ndp-1)/vdp - (ndn-1)/vdn))$$

And also, since nd is nearly equal to ndn, the following transforming can be obtained.

$$\Delta np - \Delta nn = \alpha X((ndp-1)/(1vdp - 1/vdn)$$

$$\Delta np - \Delta nn = \alpha X((ndp-1)\ (\Delta vd/vdp + vdn))$$

To make value of $\Delta$n p−$\Delta$n n large, it is desirable that the refractive index is larger when Abbe numbers are the same, and it is desirable that the Abbe number is smaller when difference of the Abbe number is constant. In general, glass materials, which have small Abbe number, have high refractive index. Therefore, the glass material of the negative lens of the chromatic aberration correction element is desirable to satisfy the following condition so that it makes the radius of curvature of the cemented surface large.

$$n_{dn} > 1.70 \quad (10)$$

$$\nu_{dn} < 30 \quad (11)$$

Wherein, n dn is refractive index in wavelength of 588 nm of the negative lens of the chromatic aberration correction element, and ν dn is Abbe number of the negative lens of the chromatic aberration correction element.

When the conditions (10) and (11) are not satisfied, since the radius of curvature of the cemented lens becomes small in order an edge thickness of the positive lens to reduce aberrations, becomes too small.

Embodiment 1

FIG. 1 shows Embodiment 1 of the objective lens. This objective lens consists a chromatic aberration correction element 1 and a converging lens 2, they are arranged in order from a light source side (left side in figure).

The chromatic aberration correction element i comprises a positive lens and a negative lens which are cemented with each other.

The converging lens 2 is formed into an aspherical lens having a larger radius of curvature as it goes toward the peripheral portion thereof.

Concrete numerical constructions are as shown in TABLE 1. In the TABLES, the reference character NA denotes the numerical aperture, f denotes a focal length of the objective lens in a wavelength of 780 nm, ω denotes a half field angle, wd denotes a working distance between last surface of the objective lens and the first surface of the optical disk OD, r denotes the radius of curvature of a surface, d denotes a lens thickness or a spatial distance, n780 denotes a refractive index in a wavelength of 780 nm of a lens, ν780 denotes a dispersion of a lens in the vicinity of wavelength 780 nm, and Ac denotes value of expression (8).

TABLE 1

| NA = 0.55 | f = 3.30 | ω = 1.7° | wd = 1.350 | fcn = 3.36 | Ac = 1.01 | |
|---|---|---|---|---|---|---|
| surface | | | | | | glass material |
| NO. | r | d | n780 | νd | Δn | ν780 | name |
| 1 | 10.330 | 1.450 | 1.61139 | 63.4 | −2.4 × 10⁻⁵ | 1454 | PSK02 |
| 2 | −2.751 | 0.900 | 1.78565 | 25.4 | −6.5 × 10⁻⁵ | 601 | SFL6 |
| 3 | −27.147 | 0.050 | | | | | |
| 4 | 2.380 | 2.000 | 1.48479 | | −2.4 × 10⁻⁵ | 1461 | Plastic |
| 5 | −3.752 | | | | | | |

The surface NO. 4 and 5 denotes the converging lens. Regarding the glass material, the converging lens is a polymethylmethaorylate and the cover glass OD of the optical disk is BK7.

The aspherical 4th and 5th surfaces are expressed as follows:

$$X = \frac{CY^2}{1 + \sqrt{1 - (1+K)C^2Y^2}} + A_4Y^4 + A_6Y^6 + A_8Y^8 + A_{10}Y^{10}$$

wherein X is a distance from a tangential plane of the vertex of an aspherical surface on the aspherical surface where the height Y from the optical axis, C is the radius of curvature (1/r) of the vertex of the aspherical surface, K is the coefficient of a circular cone, and the A4, A6, A8 and A10 are aspherical surfaces coefficients. These aspherical coefficients of the converging lens are shown in TABLE 2.

Figure 2:
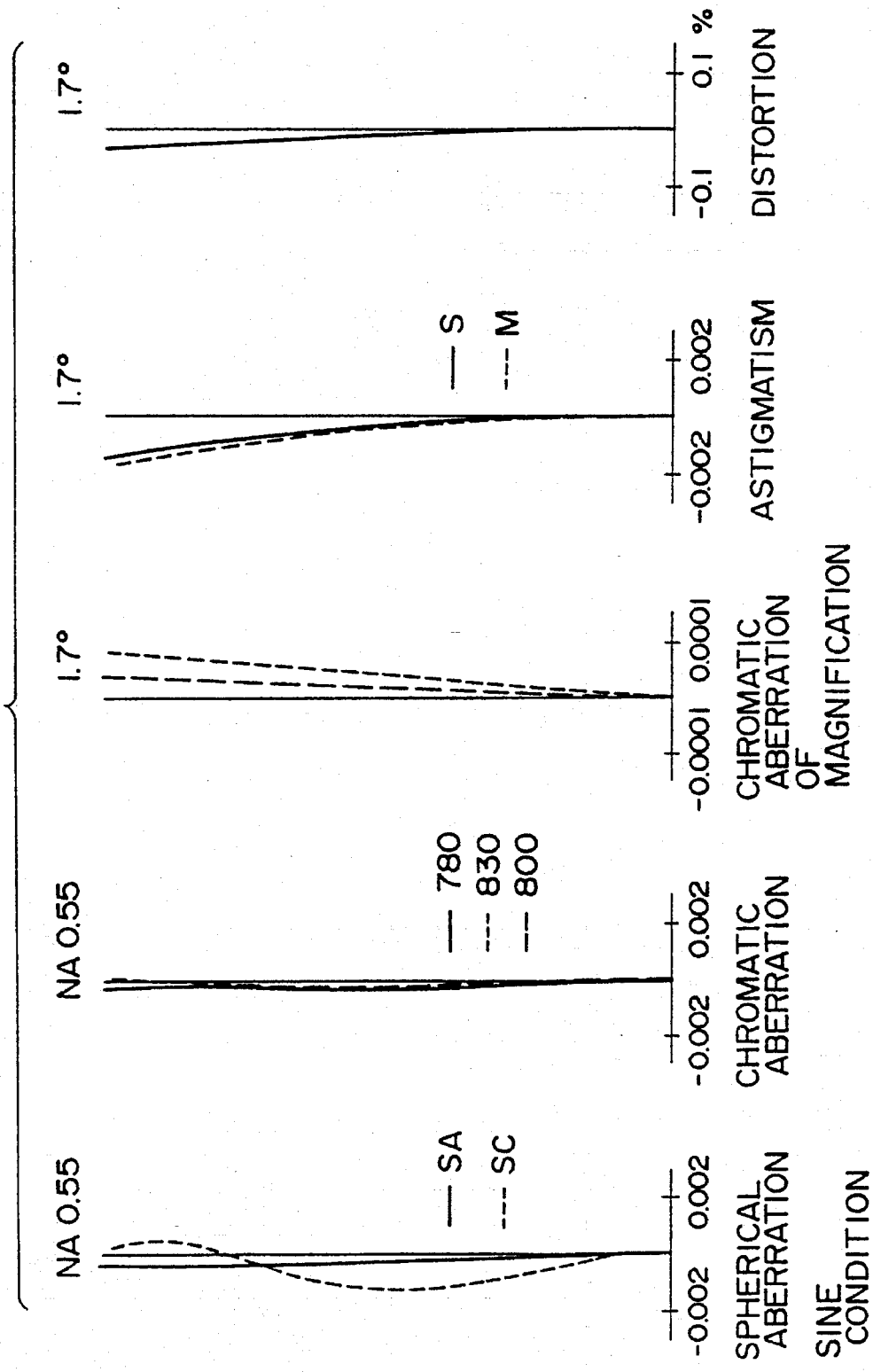
FIG. 2 are various aberration diagrams of the objective lens shown in FIG. 1.
Figure 3:
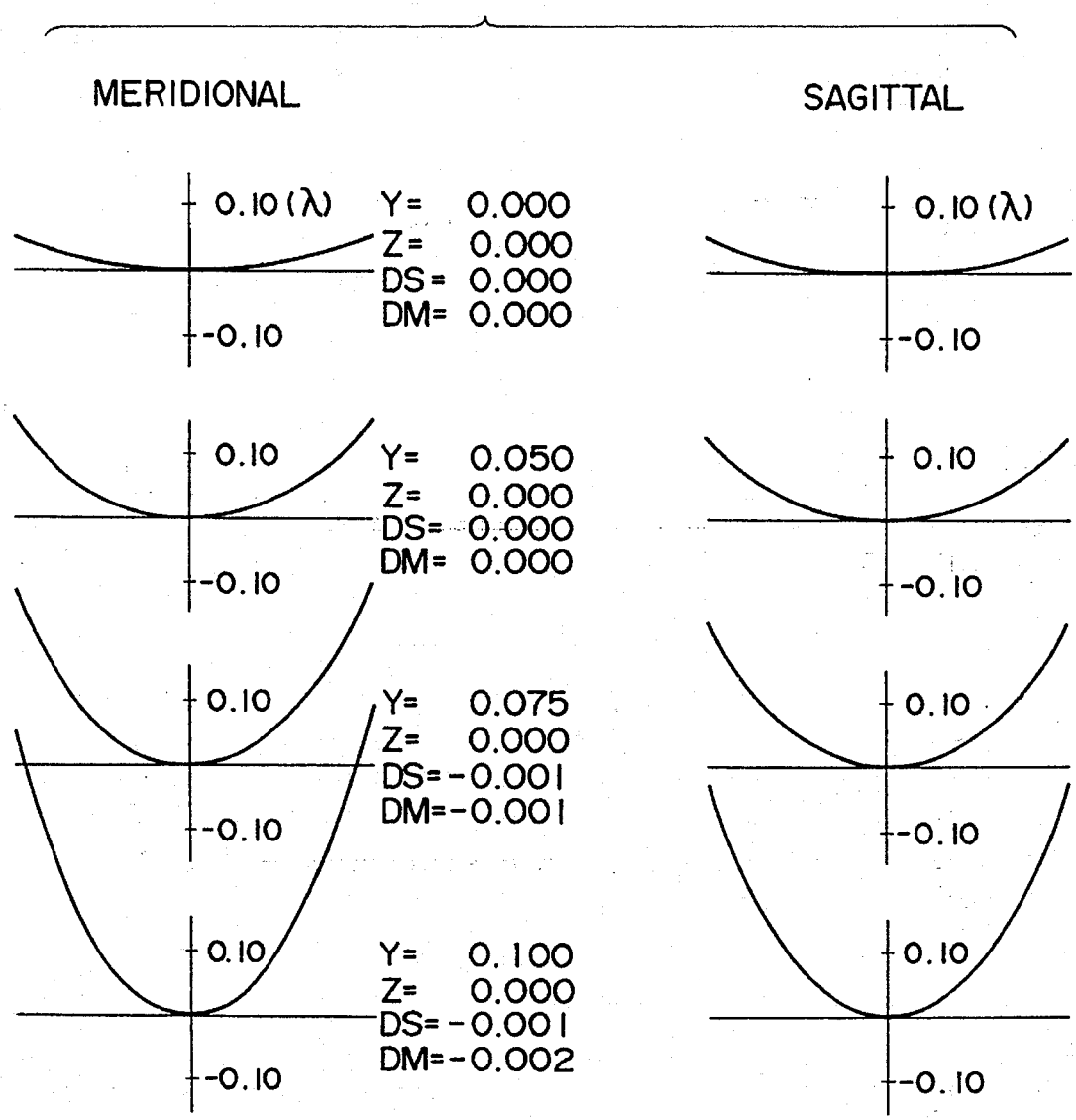
FIG. 3 are wave aberration diagrams of the objective lens shown in FIG. 1.

Various aberrations of this objective lens are shown in FIG. 2 and the wave aberrations are shown in FIG. 3.

TABLE 2

| 4th surface | 5th surface |
|---|---|
| K = −0.6848 | K = −0.1514 × 10 |
| A4 = −0.1011 × 10⁻² | A4 = 0.1259 × 10⁻¹ |
| A6 = −0.1518 × 10⁻³ | A6 = −0.2710 × 10⁻² |
| A8 = −0.2169 × 10⁻⁴ | A8 = 0.3962 × 10⁻³ |
| A10 = −0.5843 × 10⁻⁵ | A10 = 0.3097 × 10⁻⁴ |

In a case that a single unit of the converging lens shown in FIG. I is used as an objective lens, as the chromatic aberration is not able to be corrected, an out of focus condition occurs by shifting of a wavelength. According to the out of focus, wave aberration is generated.

Figure 4:
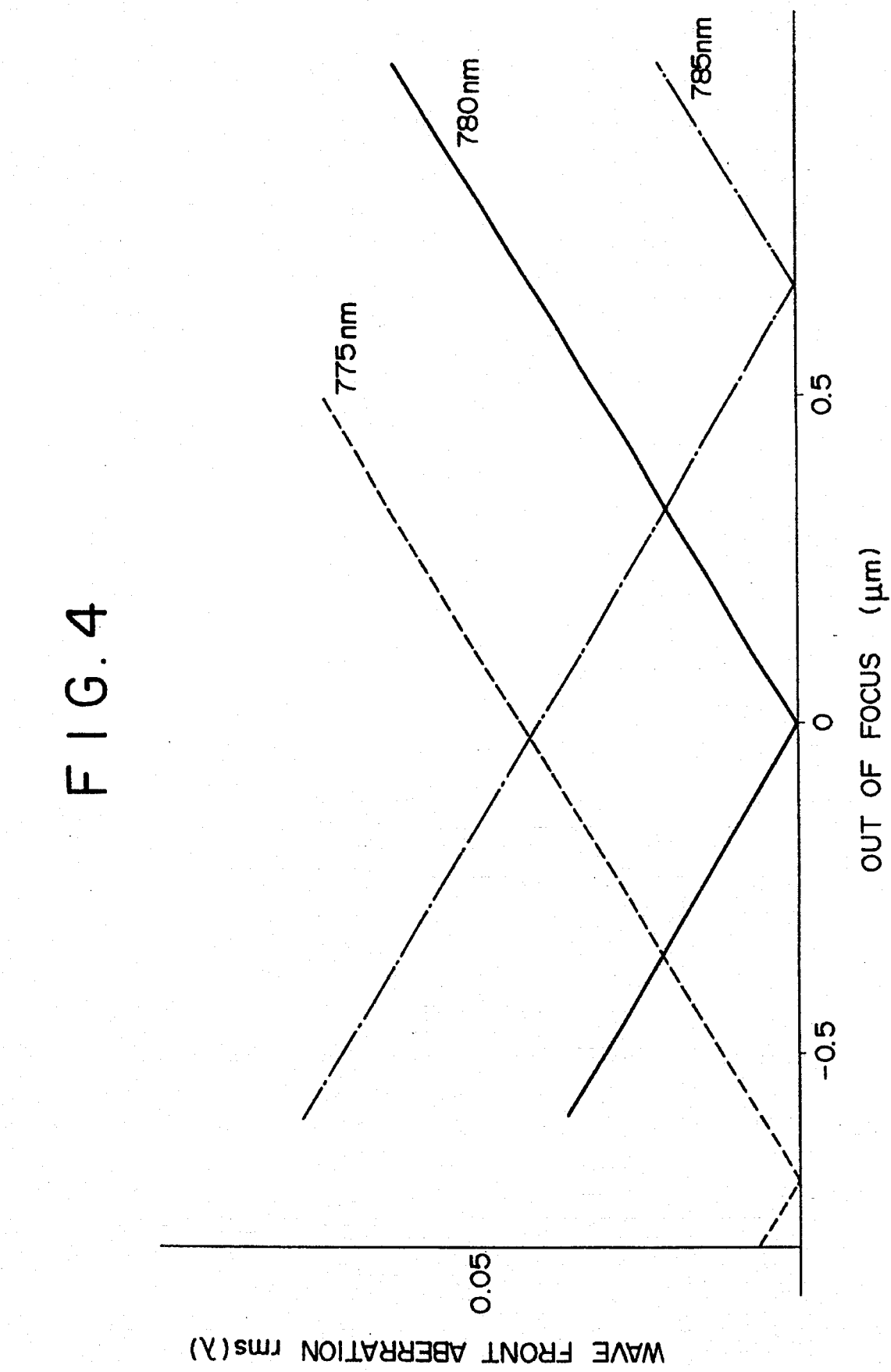
FIG. 4 is a graph showing the movement of a light converged position caused by wavelength fluctuation by the single unit of the conversion lens shown in FIG. 1.

Deterioration of wave aberration based on the out of focus condition of the single body of the converging lens 2 is as shown in FIG. 4. It will be understood from FIG. 4 that when the wavelength is shifted by 5 nm, a wave aberration of about 0.04λ is generated. In order to maintain the efficiency as an objective lens, the limit of the wave aberration is about 0.05λ. Actually, however, as there exists out of focus conditions based on factors other than the chromatic aberration, there is a possibility that the above limit is exceeded by shift of the wavelength of about 5 nm.

Embodiment 2

Figure 5:
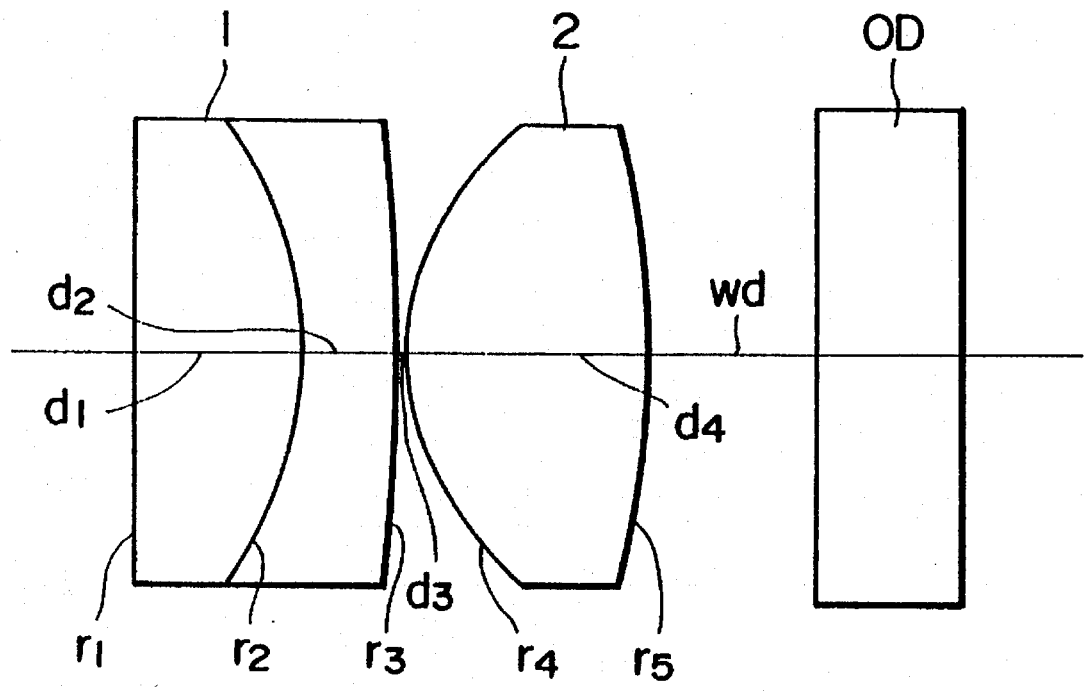
FIG. 5 is a lens diagram showing Embodiment 2 of an objective lens according to the present invention.
Figure 6:
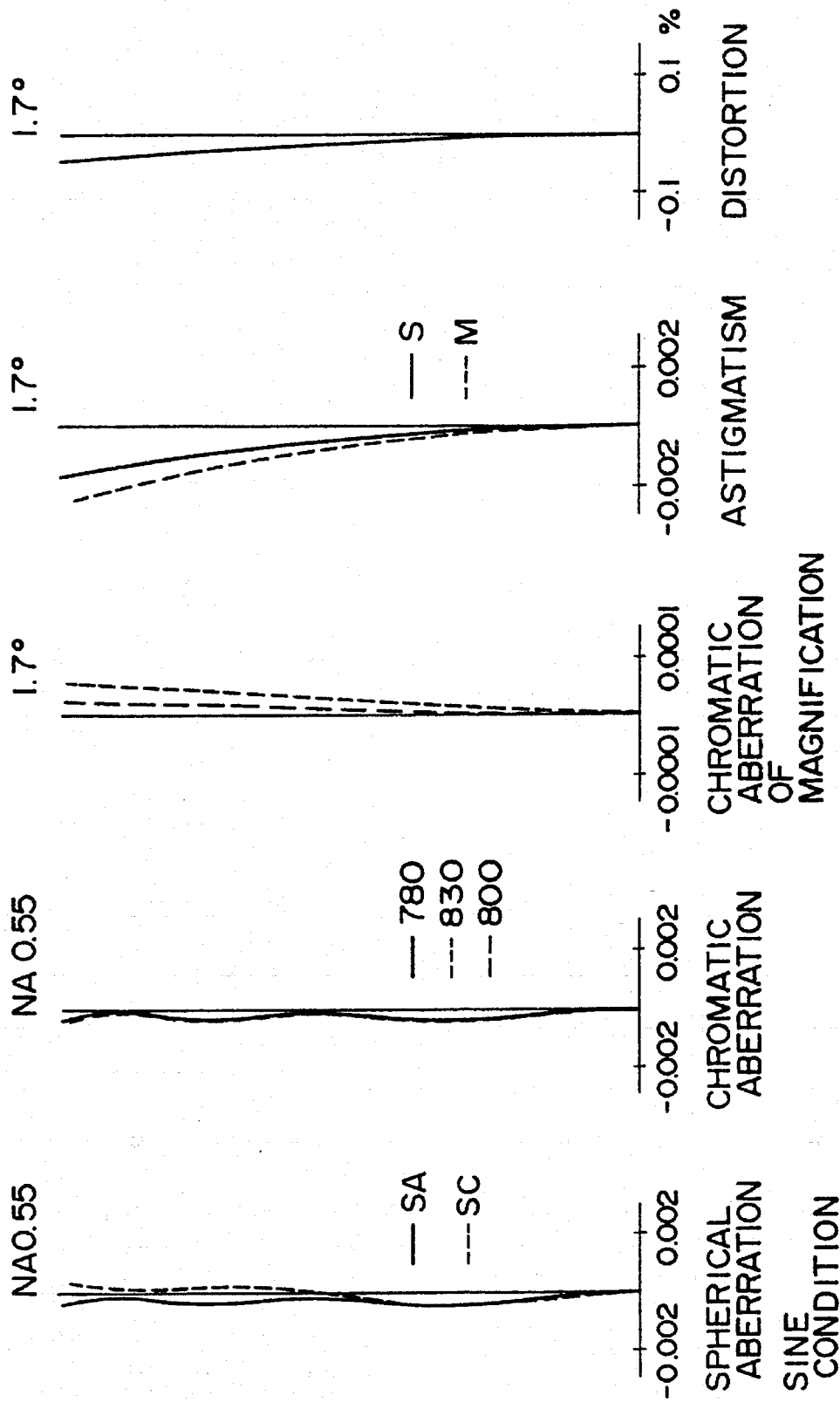
FIG. 6 are various aberration diagrams of the objective lens shown in FIG. 5.
Figure 7:
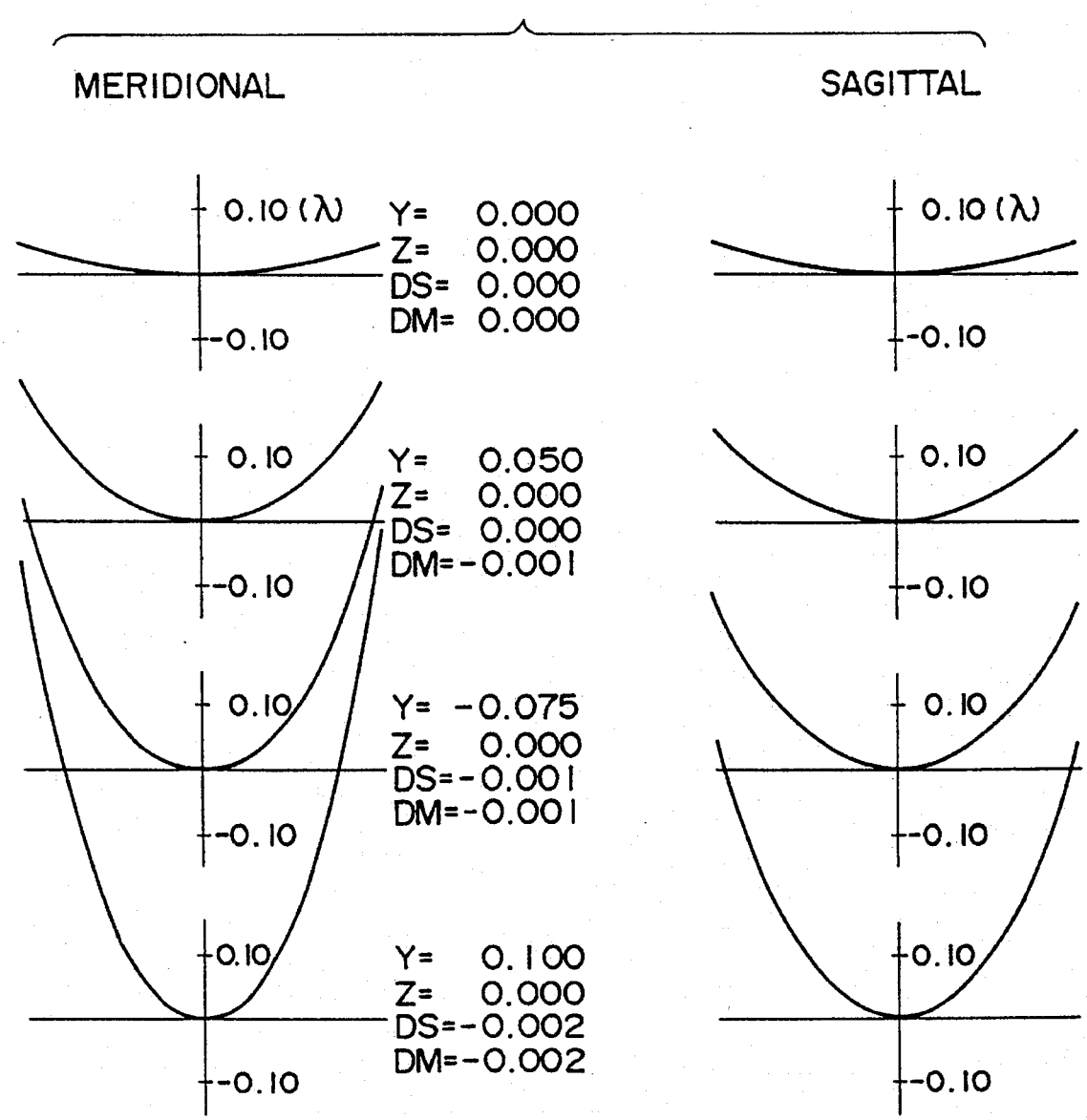
FIG. 7 are wave aberration diagrams of the objective lens shown in FIG. 5.

FIG. 5 shows Embodiment 2 of the objective lens and concrete numerical value of construction are shown in TABLE 3. The aspherical coefficients of the conversing lens are shown in TABLE 4. Various aberrations of this objective lens are shown in FIG. 6 and the wave aberrations are shown in FIG. 7.

TABLE 3

| | NA = 0.55 | f = 3.30 | ω = 1.7° | wd = 1.350 | fcn = 3.70 | Ac = 1.44 | |
|---|---|---|---|---|---|---|---|
| surface | | | | | | glass material | |
| NO. | r | d | n780 | vd | Δn | v780 | name |
| 1 | 59.155 | 1.400 | 1.68442 | 50.8 | $-3.2 \times 10^{-5}$ | 1136 | LaK08 |
| 2 | −3.042 | 0.800 | 1.78565 | 25.4 | $-6.5 \times 10^{-5}$ | 601 | SFL6 |
| 3 | −13.310 | 0.050 | | | | | |
| 4 | 2.032 | 2.000 | 1.43107 | | $-1.2 \times 10^{-5}$ | 2626 | CaFk95 |
| 5 | −5.229 | | | | | | |

TABLE 4

| 4th surface | 5th surface |
|---|---|
| K = −0.6514 | K = −0.1868 × 10 |
| A4 = 0.319 × 10⁻² | A4 = 0.1388 × 10⁻¹ |
| A6 = −0.743 × 10⁻⁴ | A6 = −0.322 × 10⁻² |
| A8 = −0.9645 × 10⁻⁴ | A8 = 0.3918 × 10⁻³ |
| A10 = −0.2868 × 10⁻⁴ | A10 = −0.2037 × 10⁻⁴ |

Embodiment 3

Figure 8:
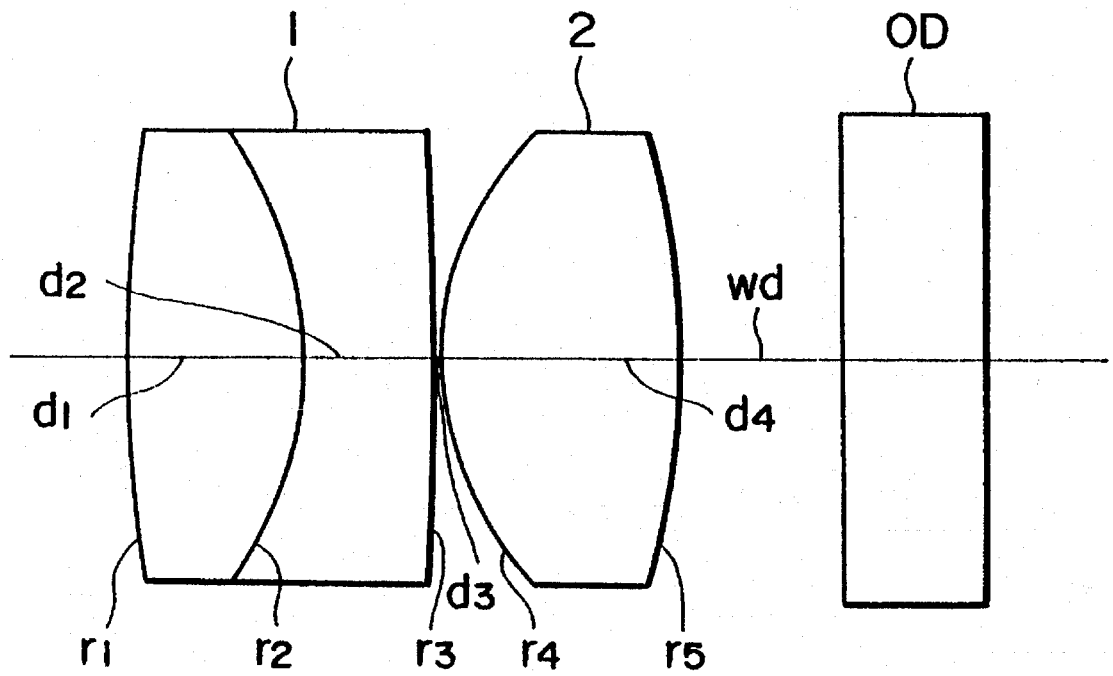
FIG. 8 is a lens diagram showing Embodiment 3 of an objective lens according to the present invention.
Figure 9:
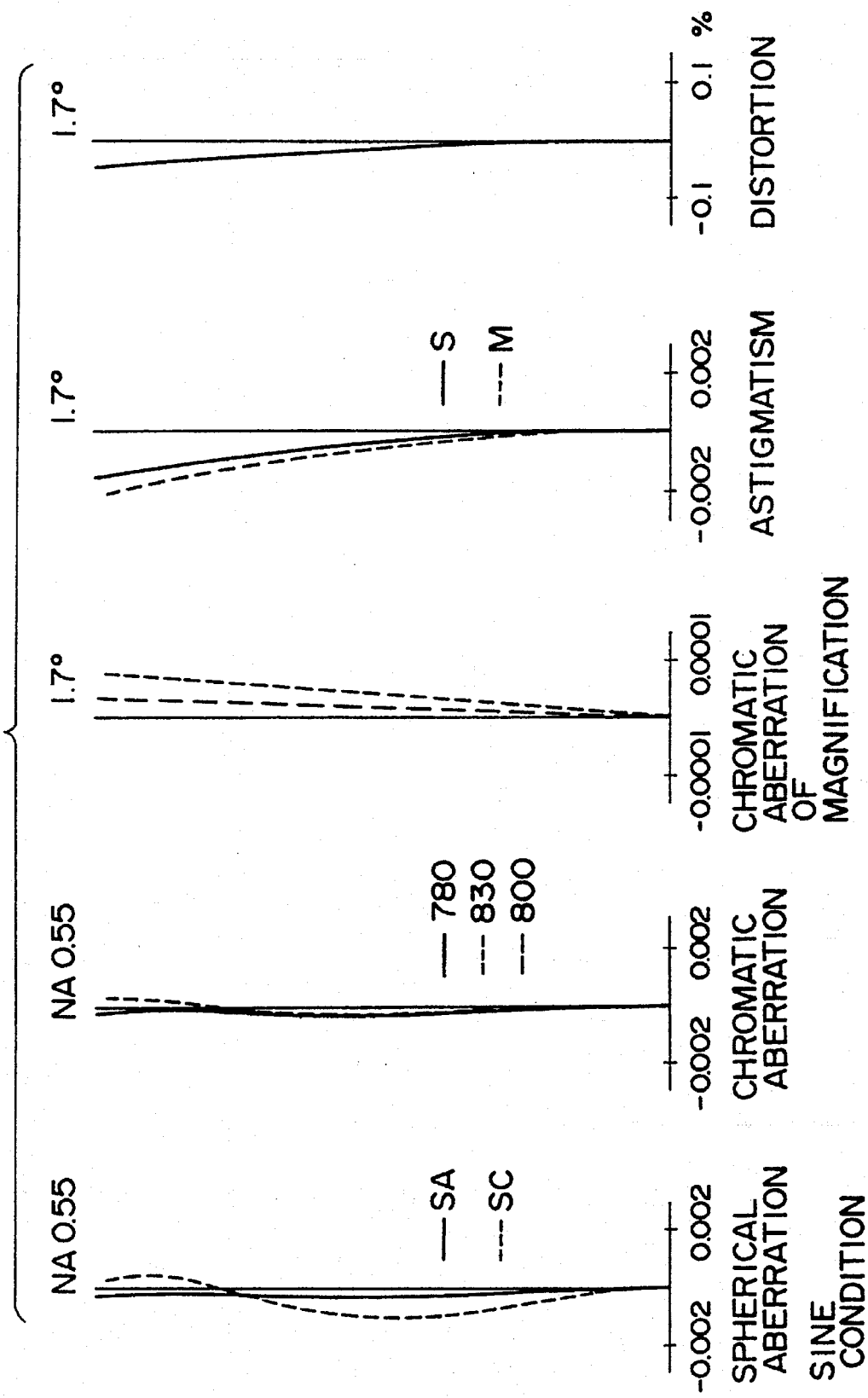
FIG. 9 are various aberration diagrams of the objective lens shown in FIG. 8.
Figure 10:
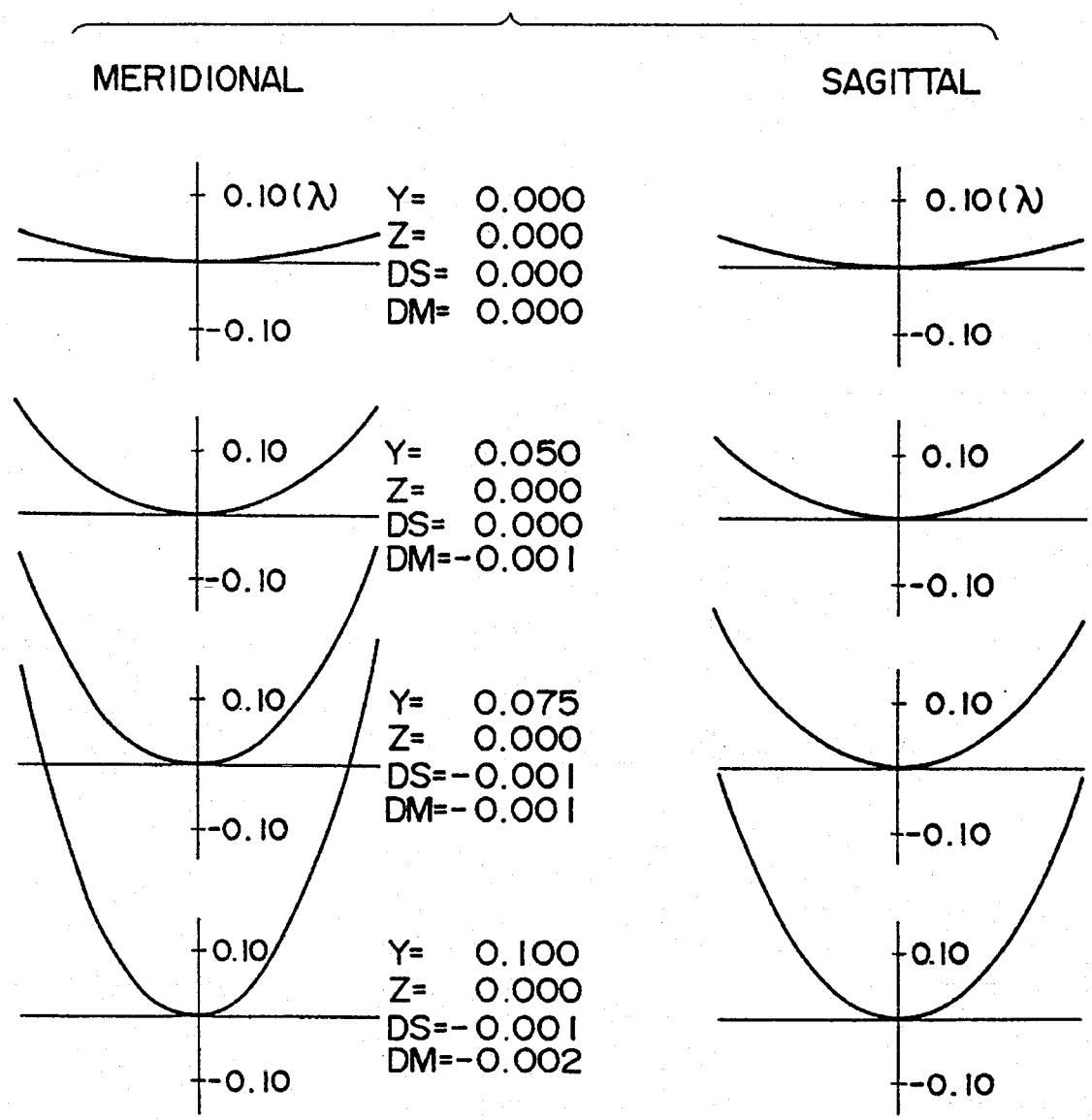
FIG. 10 are wave aberration diagrams of the objective lens shown in FIG. 8.

FIG. 8 shows Embodiment 3 of the objective lens and concrete numerical values for construction are shown in TABLE 5. The aspherical coefficients of the conversing lens are shown in TABLE 6. Various aberrations of this objective lens are shown in FIG. 9 and the wave aberrations are shown in FIG. 10.

TABLE 5

| | NA = 0.55 | f = 3.30 | ω = 1.7° | wd = 1.350 | fcn = 3.32 | Ac = 1.02 | |
|---|---|---|---|---|---|---|---|
| surface | | | | | | glass material | |
| NO. | r | d | n780 | vd | Δn | v780 | name |
| 1 | 11.816 | 1.450 | 1.61139 | 63.4 | $-2.4 \times 10^{-5}$ | 1454 | PSK02 |
| 2 | −3.120 | 1.100 | 1.78565 | 25.4 | $-6.5 \times 10^{-5}$ | 301 | SFL6 |
| 3 | −38.129 | 0.050 | | | | | |
| 4 | 2.378 | 2.000 | 1.53670 | | $-2.3 \times 10^{-5}$ | 1507 | |
| 5 | −5.004 | | | | | | |

TABLE 6

| 4th surface | 5th surface |
|---|---|
| K = −0.6700 | K = −0.1070 × 10 |
| A4 = 0.1489 × 10⁻² | A4 = 0.1175 × 10⁻¹ |
| A6 = −0.3270 × 10⁻⁴ | A6 = −0.2023 × 10⁻² |
| A8 = −0.7407 × 10⁻⁴ | A8 = 0.2206 × 10⁻³ |

TABLE 6-continued

| 4th surface | 5th surface |
|---|---|
| A10 = −0.7601 × 10⁻⁴ | A10 = −0.1196 × 10⁻⁴ |

Embodiment 4

Figure 11:
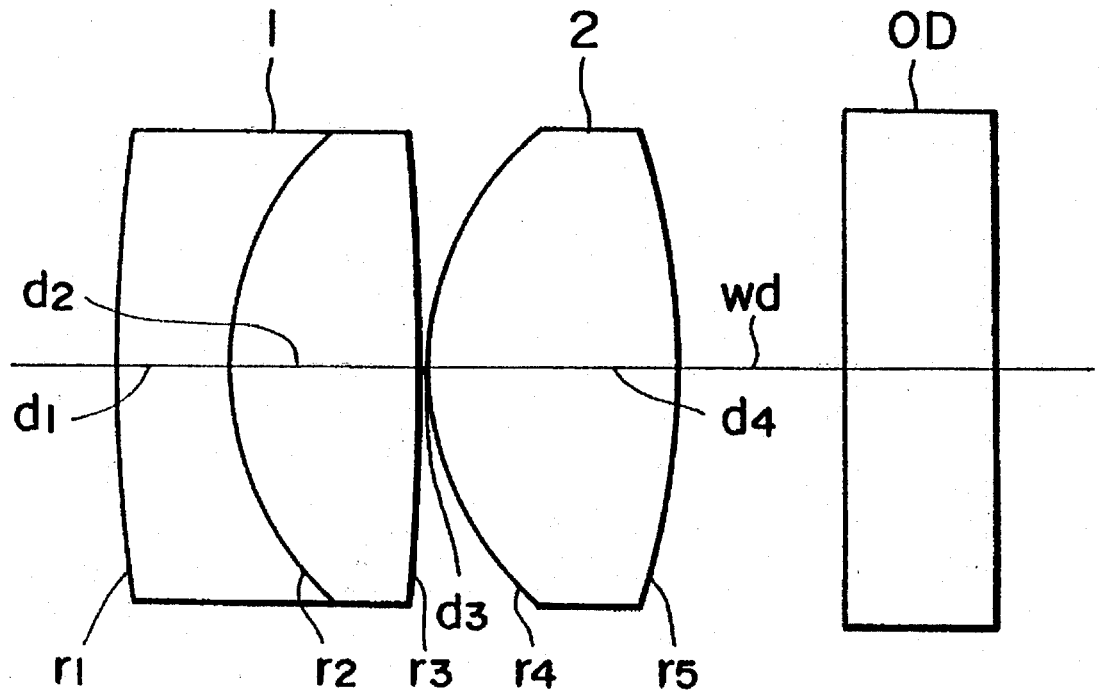
FIG. 11 is a lens diagram showing Embodiment 4 of an objective lens according to the present invention.
Figure 12:
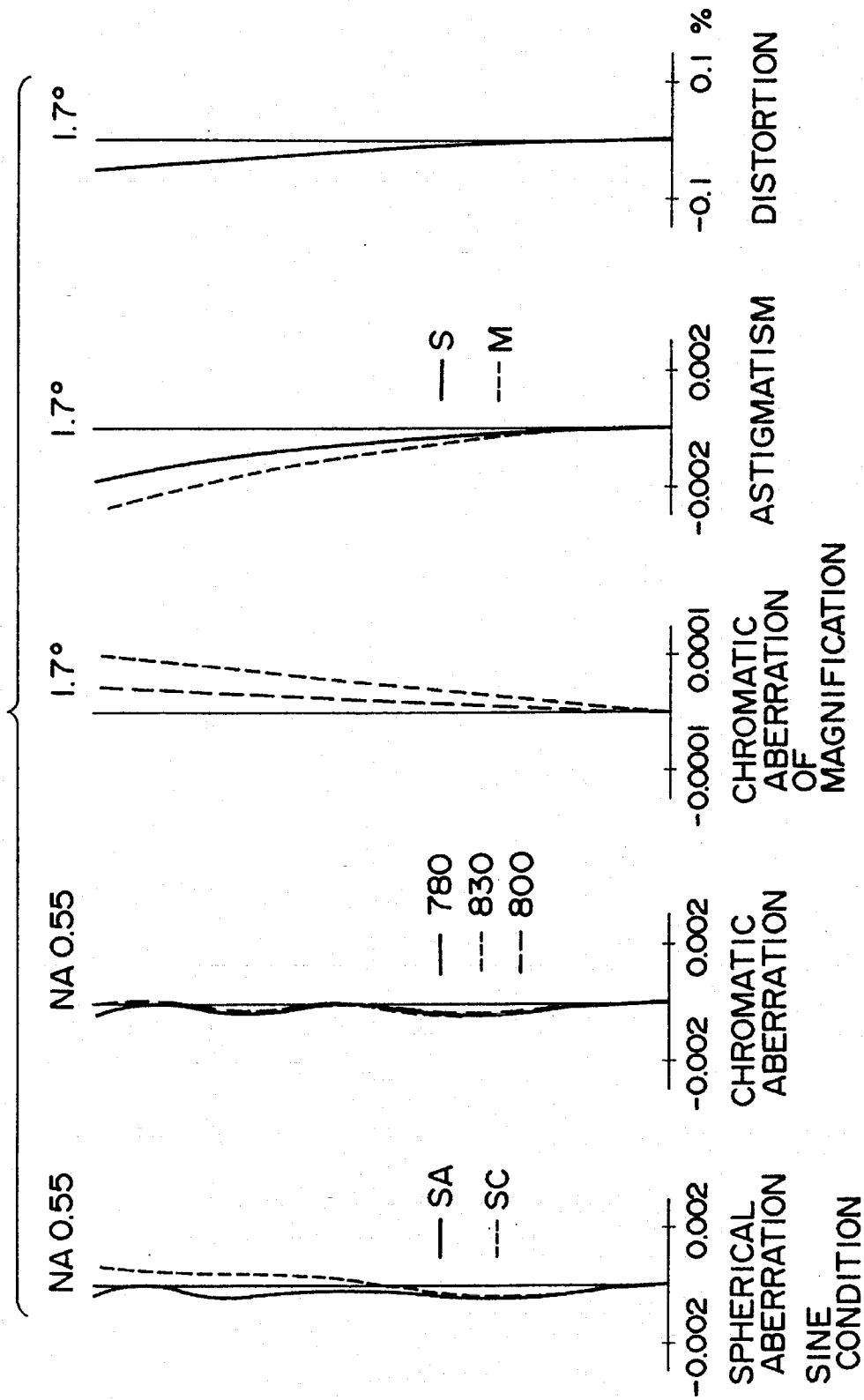
FIG. 12 are various aberration diagrams of the objective lens shown in FIG. 11.
Figure 13:
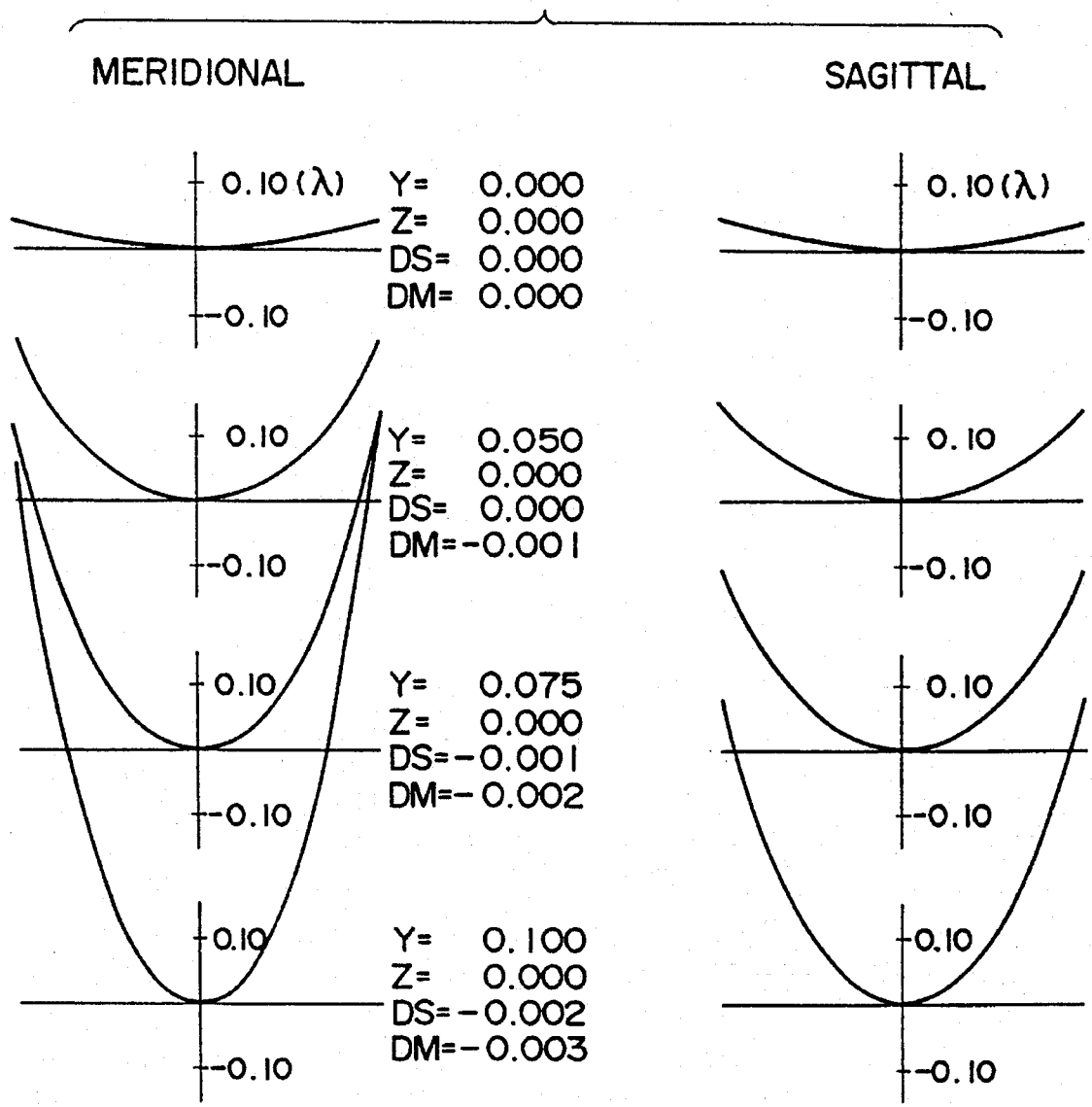
FIG. 13 are wave aberration diagrams of the objective lens shown in FIG. 11.

FIG. 11 shows Embodiment 4 of the objective lens and concrete numerical values for construction are shown in TABLE 7. The aspherical coefficients of the converging lens are shown in TABLE 8. Various aberrations of this objective lens are shown in FIG. 11 and the wave aberrations are shown in FIG. 13.

TABLE 7

| | NA = 0.55 | f = 3.30 | ω = 1.7° | wd = 1.350 | fcn = 3.34 | Ac = 1.15 | |
|---|---|---|---|---|---|---|---|
| surface | | | | | | glass material | |
| NO. | r | d | n780 | vd | Δn | v780 | name |
| 1 | 12.000 | 0.900 | 1.78565 | 25.4 | $-6.5 \times 10^{-5}$ | 601 | SFL6 |
| 2 | 2.400 | 1.500 | 1.61139 | 63.4 | $-2.4 \times 10^{-5}$ | 1454 | PSK02 |
| 3 | −32.300 | 0.050 | | | | | |
| 4 | 2.091 | 2.000 | 1.48479 | | $-2.4 \times 10^{-5}$ | 1461 | |

TABLE 7-continued

| NA = 0.55 | f = 3.30 | ω = 1.7° | wd = 1.350 | fcn = 3.34 | Ac = 1.15 | |
|---|---|---|---|---|---|---|
| surface | | | | | | glass material |
| NO. | r | d | n780 | vd | Δn | v780 name |
| 5 | −4.915 | | | | | |

TABLE 8

| 4th surface | 5th surface |
|---|---|
| K = −0.6557 | K = −0.4790 |
| A4 = 0.2626 × $10^{-2}$ | A4 = 0.1031 × $10^{-1}$ |
| A6 = −0.1800 × $10^{-3}$ | A6 = −0.2770 × $10^{-2}$ |
| A8 = −0.8103 × $10^{-4}$ | A8 = 0.3247 × $10^{-3}$ |
| A10 = −0.4767 × $10^{-4}$ | A10 = −0.2010 × $10^{-4}$ |

Embodiment 5

Figure 14:
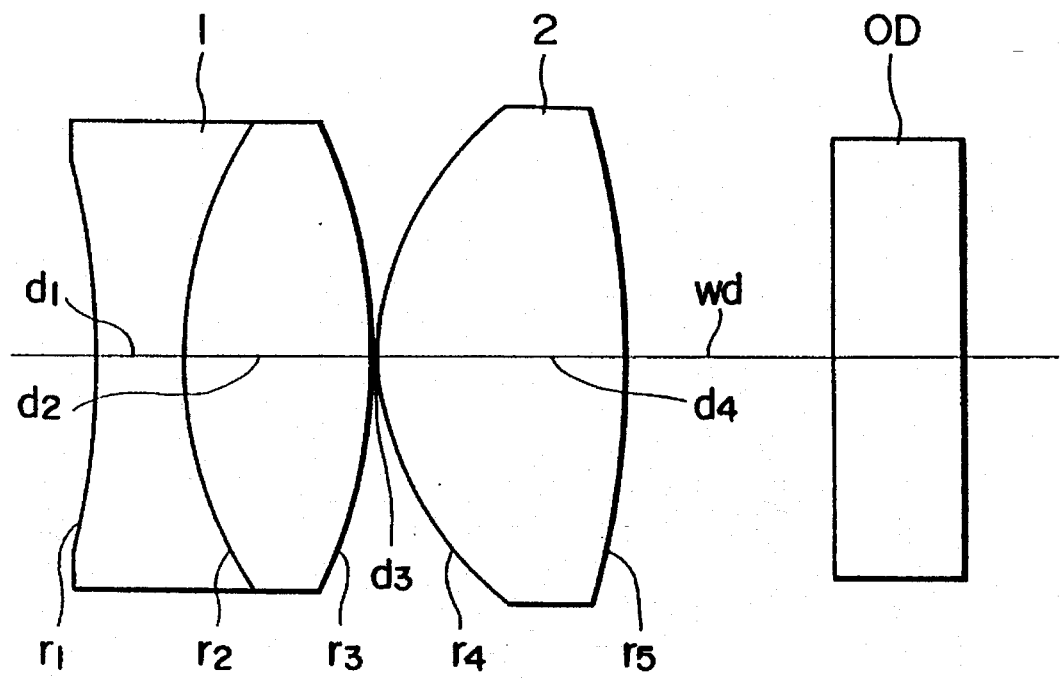
FIG. 14 is a lens diagram showing Embodiment 5 of an objective lens according to the present invention.
Figure 15:
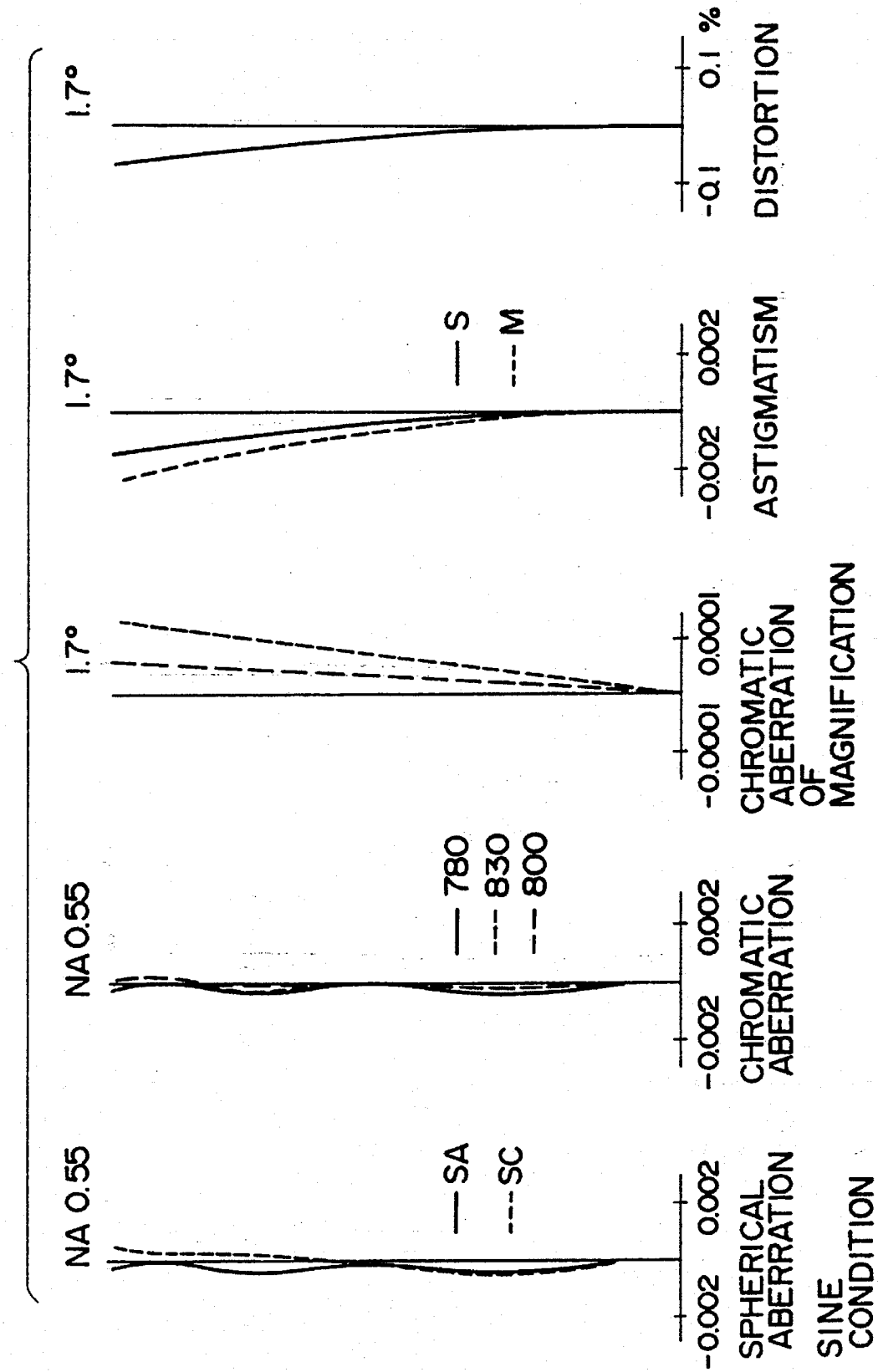
FIG. 15 are various aberration diagrams of the objective lens shown in FIG. 14.
Figure 16:
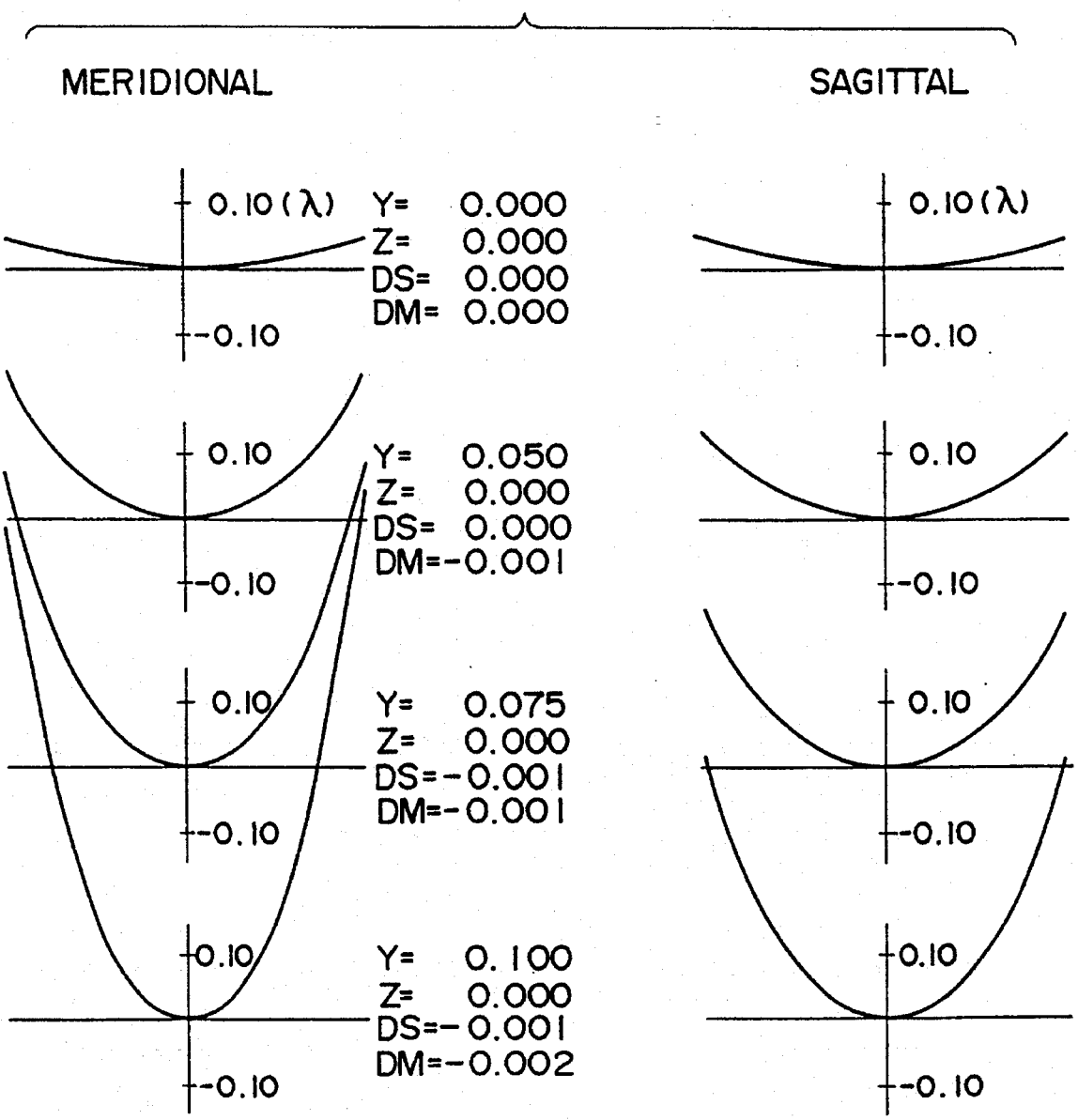
FIG. 16 are wave aberration diagrams of the objective lens shown in FIG. 14.

FIG. 14 shows Embodiment 5 of the objective lens and concrete numerical values construction are shown in TABLE 9. The aspherical coefficients of the converging lens are shown in TABLE 10. Various aberrations of this objective lens are shown in FIG. 15 and the wave aberrations are shown in FIG. 16.

TABLE 9

| NA = 0.55 | f = 3.31 | ω = 1.7° | wd = 1.937 | fcn = 3.98 | Ac = 0.84 | |
|---|---|---|---|---|---|---|
| surface | | | | | | glass material |
| NO. | r | d | n780 | vd | Δn | v780 name |
| 1 | −7.640 | 0.800 | 1.78565 | 25.4 | −6.5 × $10^{-5}$ | 601 SFL6 |
| 2 | 3.894 | 1.750 | 1.61139 | 63.4 | −2.4 × $10^{-5}$ | 1454 PSK02 |
| 3 | −5.000 | 0.050 | | | | |
| 4 | 2.352 | 2.300 | 1.48479 | | −2.4 × $10^{-5}$ | 1461 |
| 5 | −7.269 | | | | | |

TABLE 10

| 4th surface | 5th surface |
|---|---|
| K = −0.7522 | K = −0.0000 |
| A4 = 0.1876 × $10^{-2}$ | A4 = 0.5351 × $10^{-2}$ |
| A6 = −01244 × $10^{-4}$ | A6 = −0.8424 × $10^{-3}$ |

TABLE 10-continued

| 4th surface | 5th surface |
|---|---|
| A8 = −0.2321 × $10^{-4}$ | A8 = 0.5166 × $10^{-4}$ |
| A10 = −0.7525 × $10^{-5}$ | A10 = −0.7905 × $10^{-6}$ |

Embodiment 6

Figure 17:
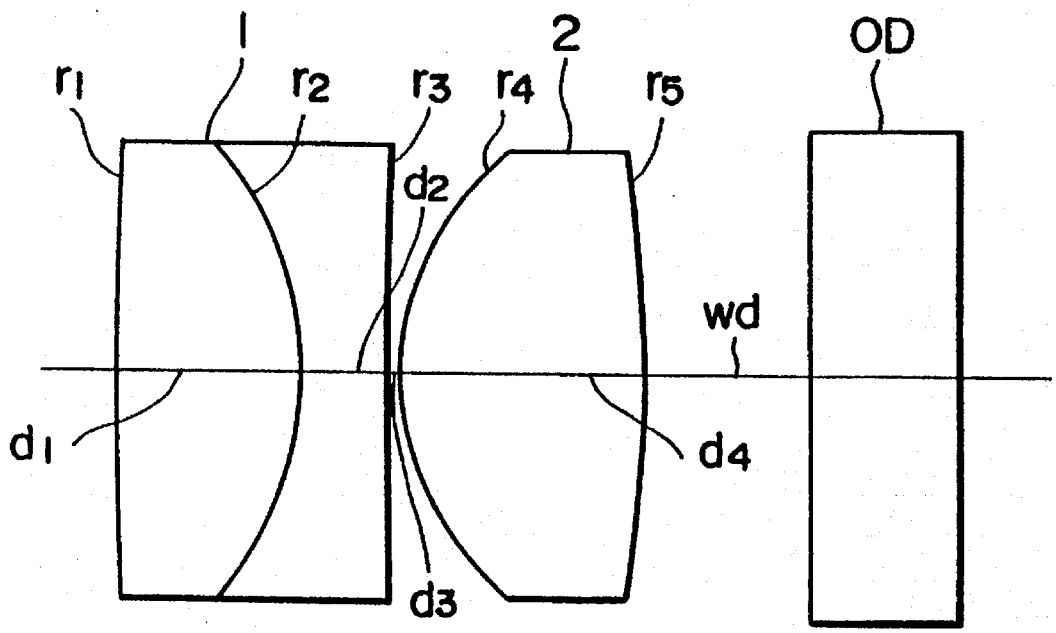
FIG. 17 is a lens diagram showing Embodiment 6 of an objective lens according to the present invention.
Figure 18:
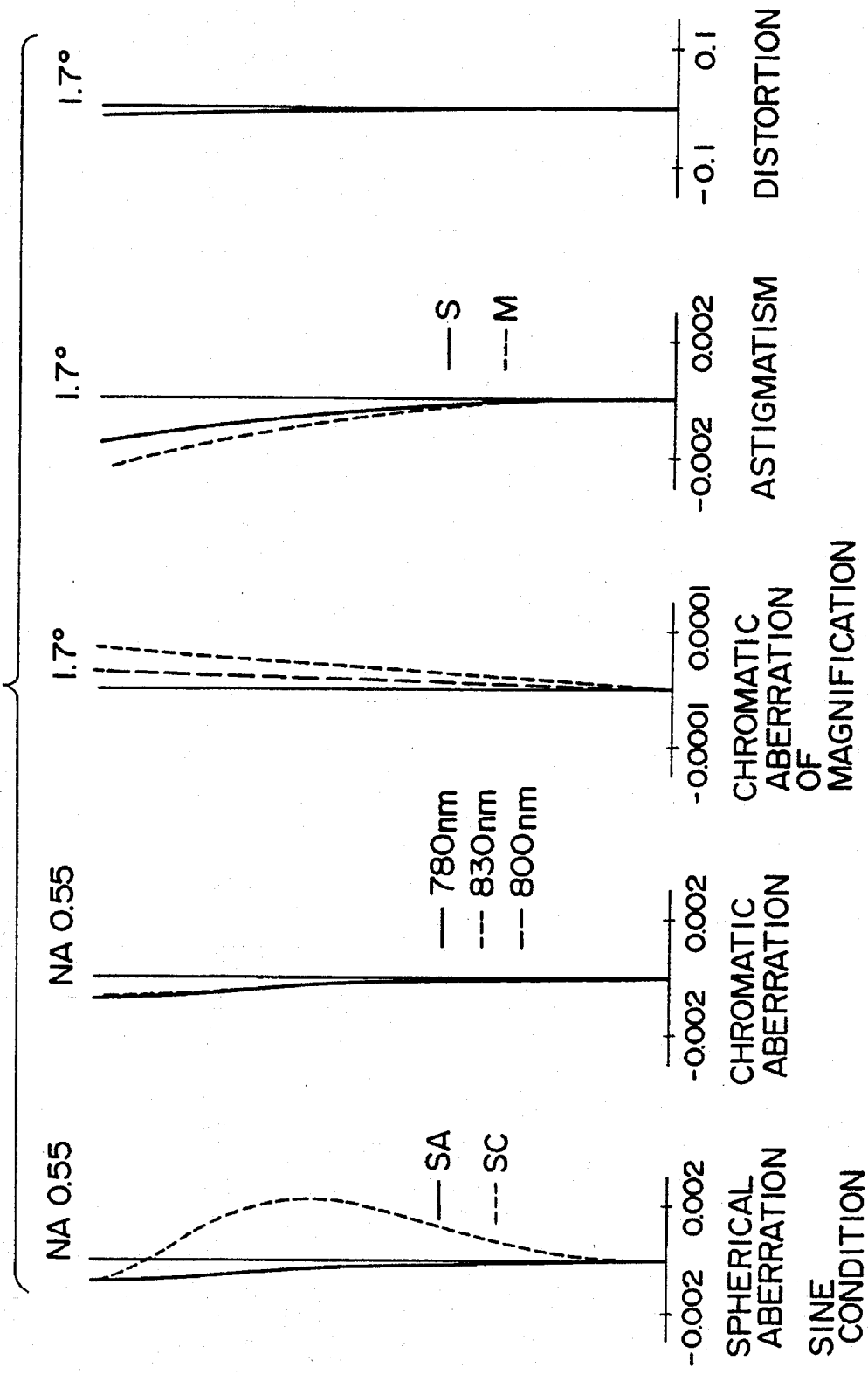
FIG. 18 are various aberration diagrams of the objective lens shown in FIG. 17.
Figure 19:
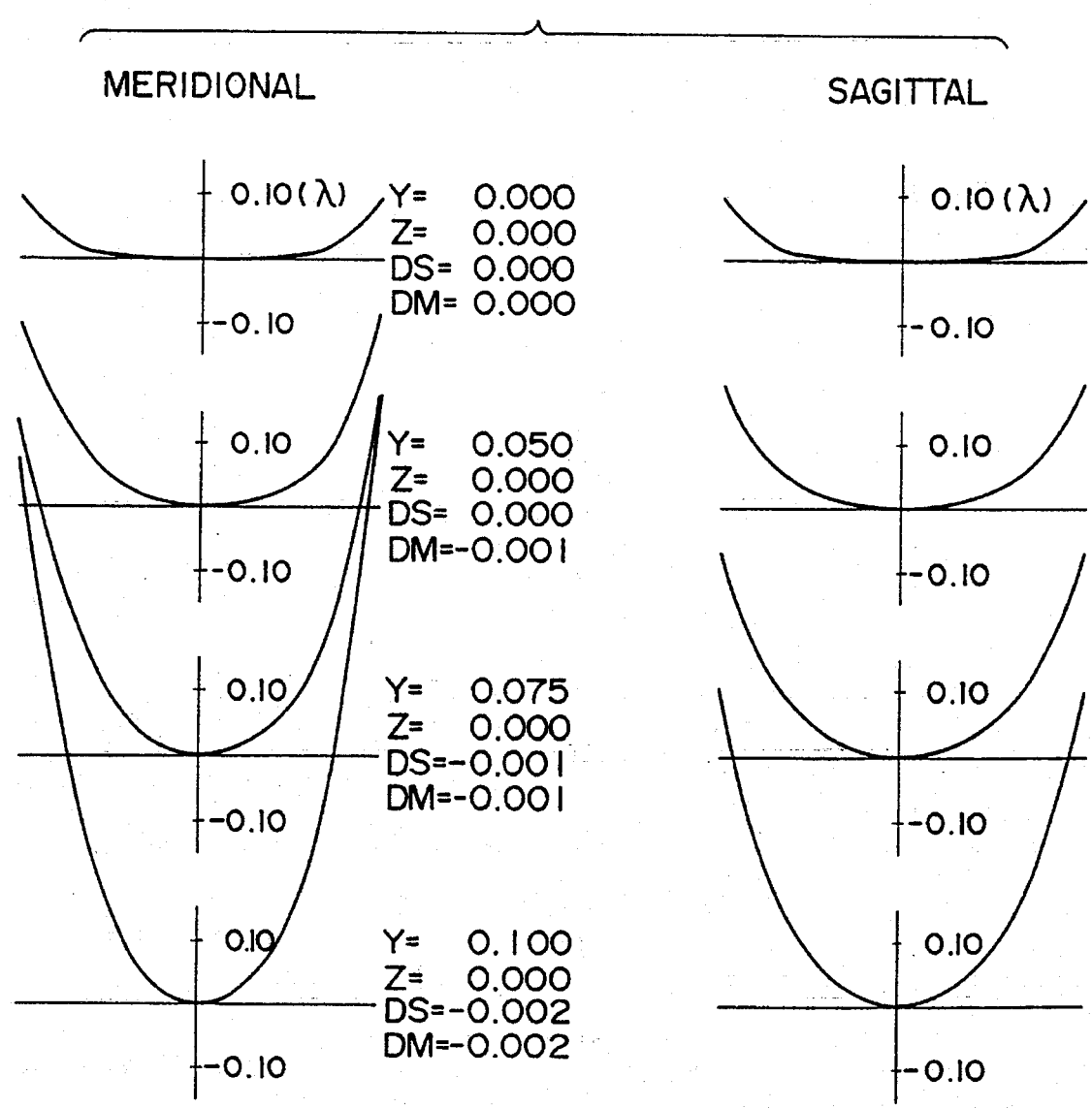
FIG. 19 are wave aberration diagrams of the objective lens shown in FIG. 17.

FIG. 17 shows Embodiment 6 of the objective lens, and concrete numerical values of construction are shown in TABLE 11. The aspherical coefficients of the converging lens are shown in TABLE 12. Various aberrations of this objective lens are shown in FIG. 18 and the wave aberrations are shown in FIG. 19.

TABLE 11

| NA = 0.55 | f = 3.30 | ω = 1.7° | wd = 1.36 | fcn = 3.23 | Ac = 0.72 | |
|---|---|---|---|---|---|---|
| surface | | | | | | glass material |
| NO. | r | d | n780 | vd | Δn | v780 name |
| 1 | 50.000 | 1.50 | 1.82195 | 42.7 | −4.5 × $10^{-5}$ | 875 LaSF05 |
| 2 | −2.822 | 0.70 | 1.82484 | 23.8 | −7.2 × $10^{-5}$ | 553 SFL03 |
| 3 | 50.000 | 0.10 | | | | |
| 4 | 2.089 | 2.00 | 1.53670 | | −2.3 × $10^{-5}$ | 1507 |
| 5 | −6.770 | | | | | |

TABLE 12

| 4th surface | 5th surface |
|---|---|
| K = −0.4168 | K = −0.5220 |
| A4 = −0.9556 × $10^{-3}$ | A4 = 0.1663 × $10^{-1}$ |
| A6 = −0.1979 × $10^{-3}$ | A6 = −0.3824 × $10^{-2}$ |
| A8 = −0.3396 × $10^{-5}$ | A8 = 0.5343 × $10^{-3}$ |
| A10 = −0.1894 × $10^{-4}$ | A10 = −0.3071 × $10^{-4}$ |

Embodiment 7

Figure 20:
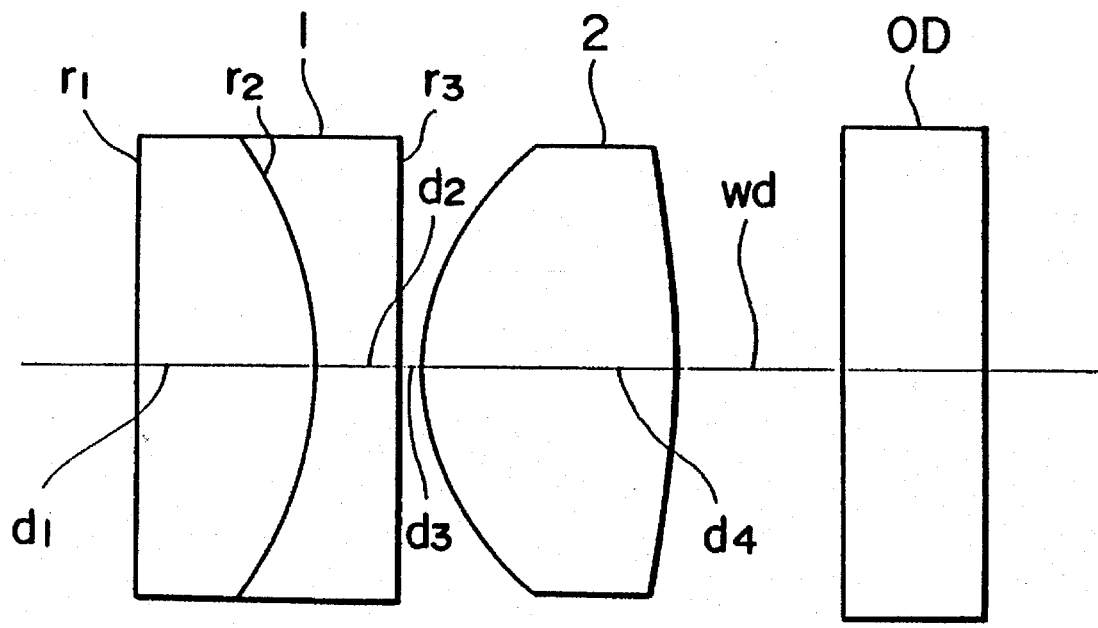
FIG. 20 is a lens diagram showing Embodiment 7 of an objective lens according to the present invention.
Figure 21:
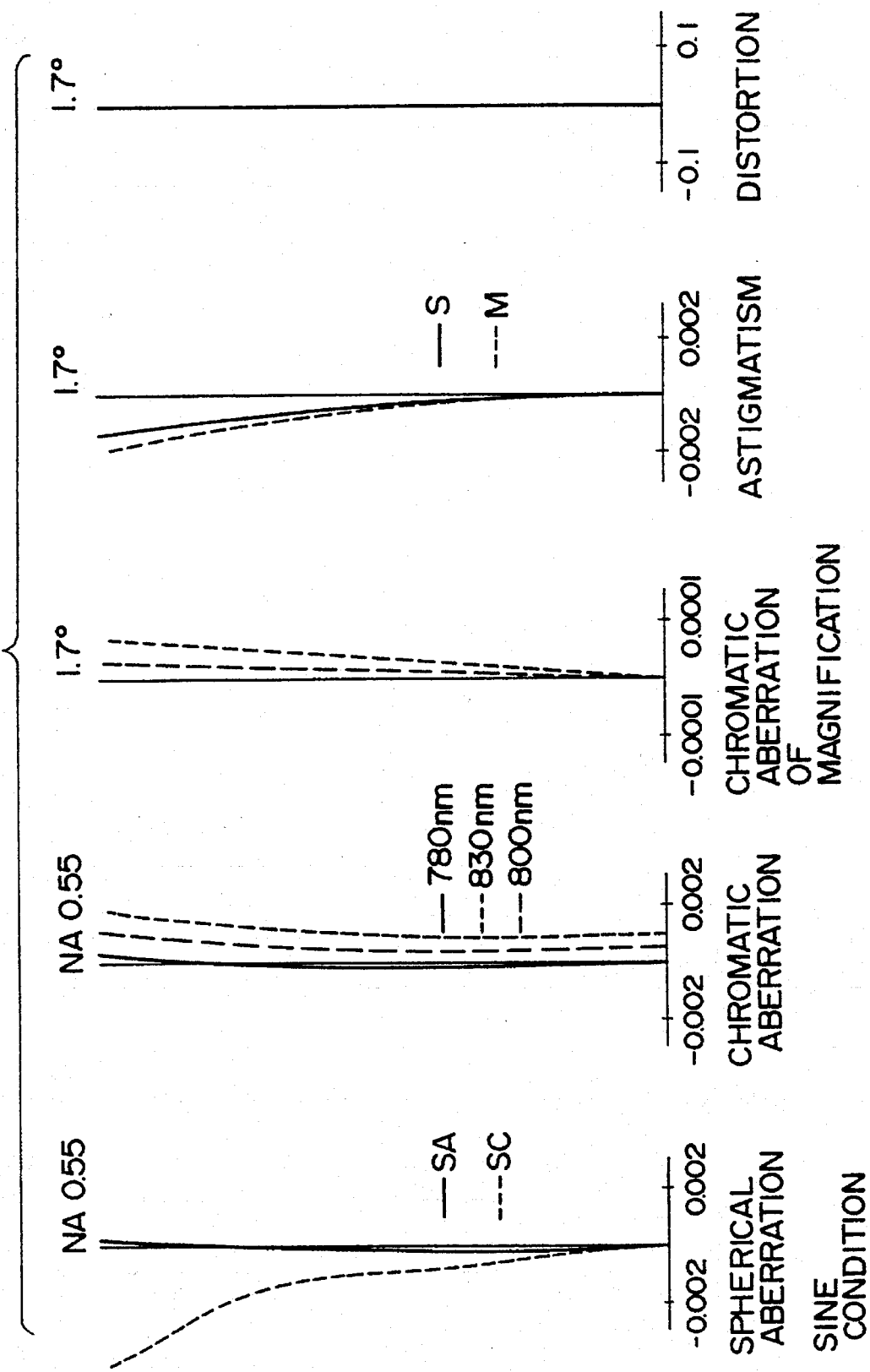
FIG. 21 are various aberration diagrams of the objective lens shown in FIG. 20.
Figure 22:
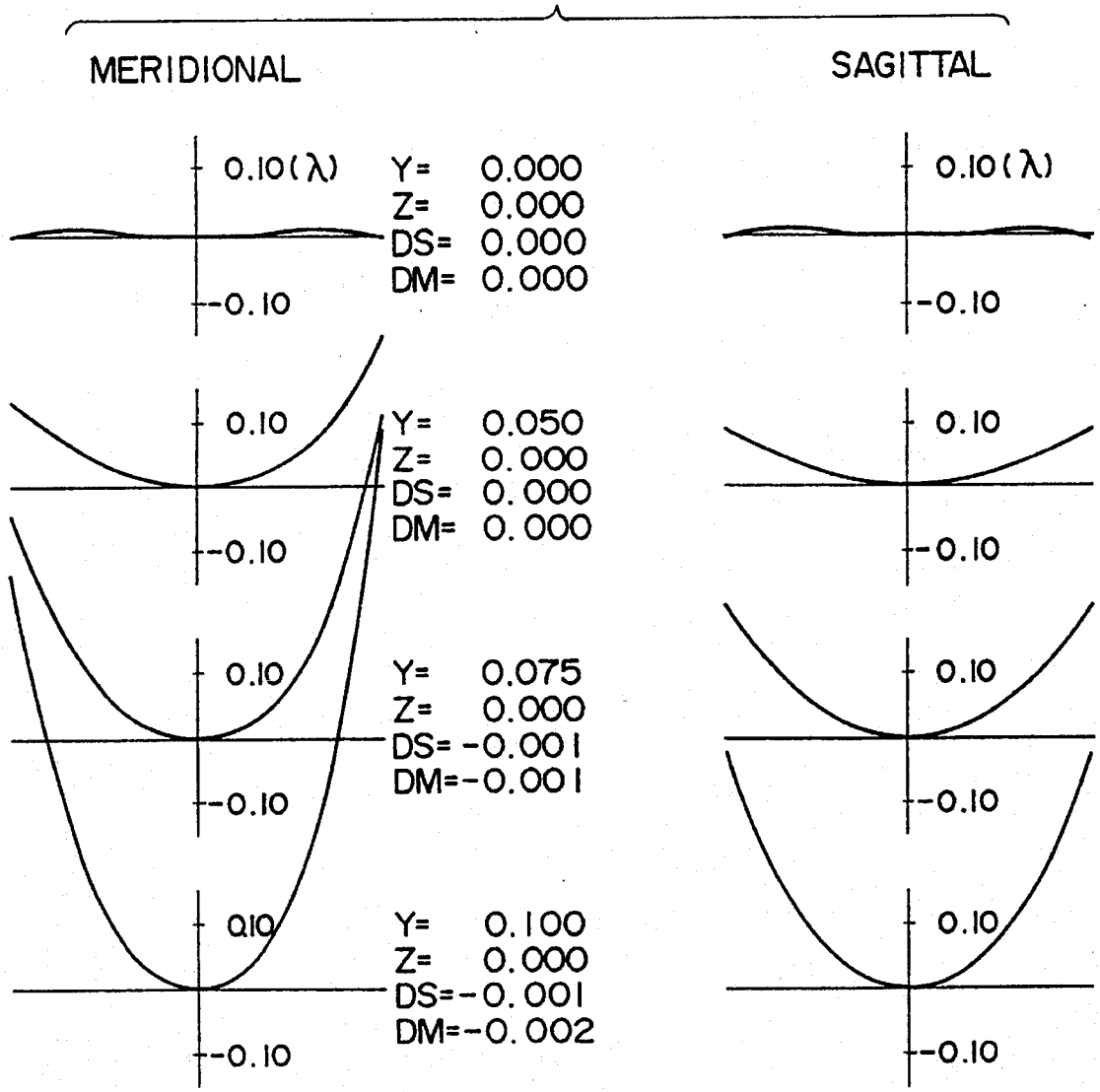
FIG. 22 are wave aberration diagrams of the objective lens shown in FIG. 20.
Figure 23:
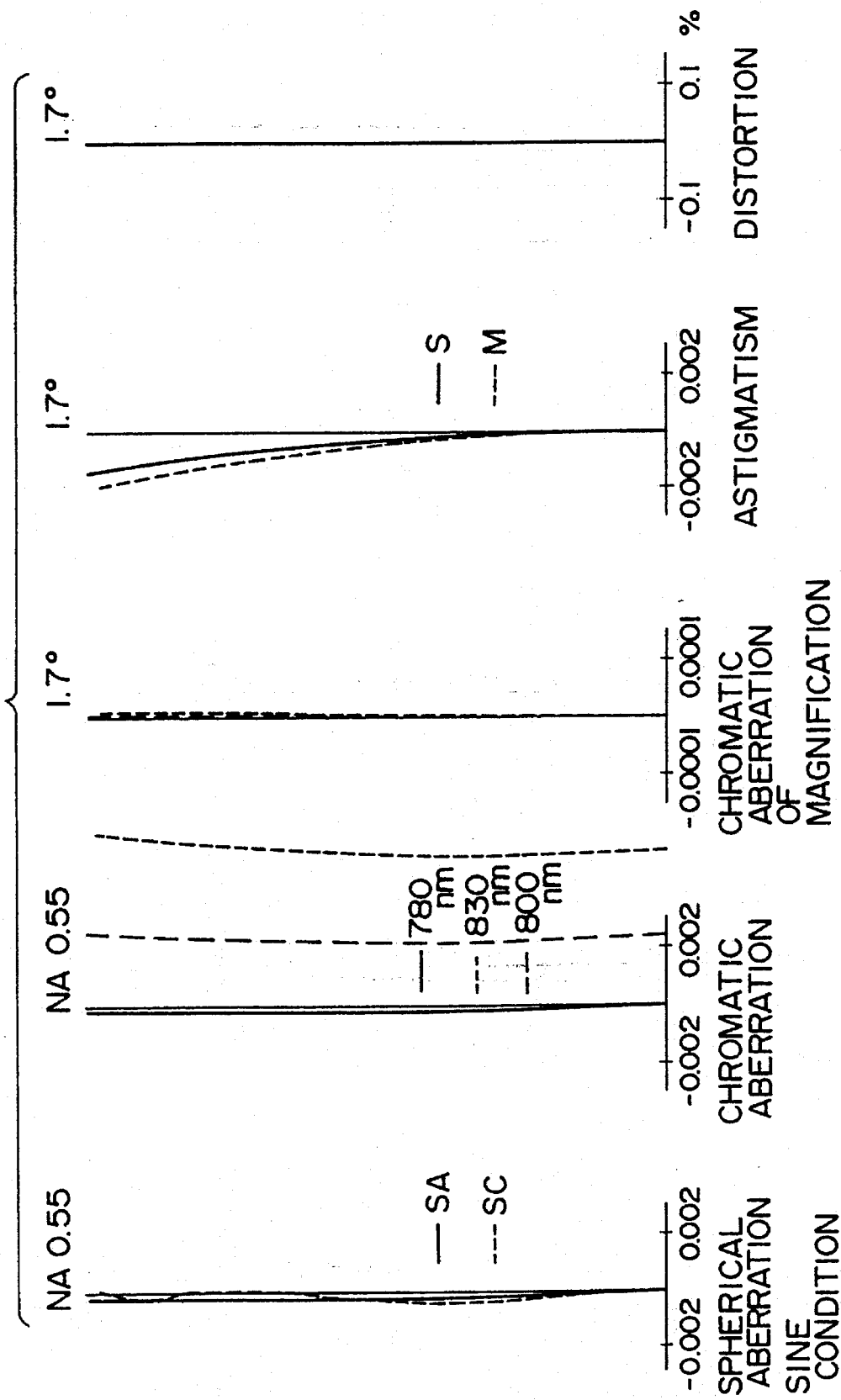
FIG. 23 are various aberration diagrams of a single unit of the converging lens shown in FIG. 20.
Figure 24:
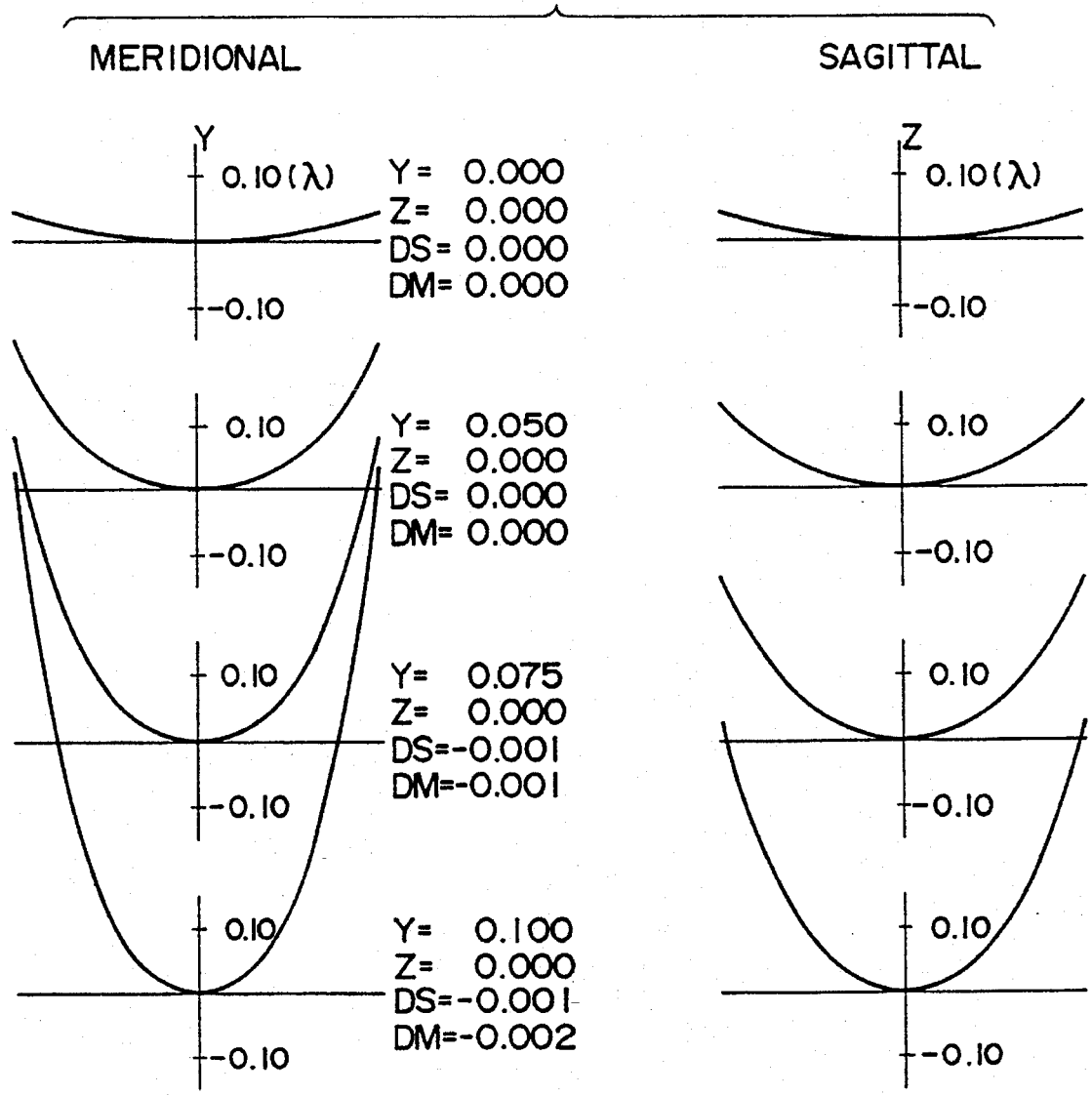
FIG. 24 are wave aberration diagrams of a single unit of the converging lens shown in FIG. 20.

FIG. 20 shows embodiment 7 of the objective lens and concrete numerical values of construction are shown in TABLE 13. The aspherical coefficients of the converging lens are shown in TABLE 14. Various aberrations of this objective lens are shown in FIG. 21 and the wave aberrations are shown in FIG. 22. Also, in order to determine the effect of the chromatic aberration correction element, various aberrations and the wave aberrations by a single unit of the converging lens are shown in FIGS. 23 and 24.

TABLE 13

NA = 0.55   f = 3.31   ω = 1.7°   wd = 1.40   fcn = 3.30   Ac = 0.60

| surface NO. | r | d | n780 | vd | Δn | v780 | glass material name |
|---|---|---|---|---|---|---|---|
| 1 | ∞ | 1.50 | 1.82195 | 42.7 | −4.5 × $10^{-5}$ | 875 | LaSF05 |
| 2 | −3.000 | 0.70 | 1.82484 | 23.8 | −7.2 × $10^{-5}$ | 553 | SFL03 |
| 3 | ∞ | 0.20 | | | | | |
| 4 | 2.005 | 2.080 | 1.48479 | | −2.4 × $10^{-5}$ | 1461 | |
| 5 | −5.231 | | | | | | |

TABLE 14

| 4th surface | 5th surface |
|---|---|
| K = −0.5223 | K = −0.3168 × 10 |
| A4 = −0.1400 × $10^{-3}$ | A4 = 0.1740 × $10^{-1}$ |
| A6 = −0.4966 × $10^{-4}$ | A6 = −0.4011 × $10^{-2}$ |
| A8 = 0.1654 × $10^{-4}$ | A8 = 0.5593 × $10^{-3}$ |
| A10 = −0.1292 × $10^{-4}$ | A10 = −0.3494 × $10^{-4}$ |

Embodiment 8

Figure 25:
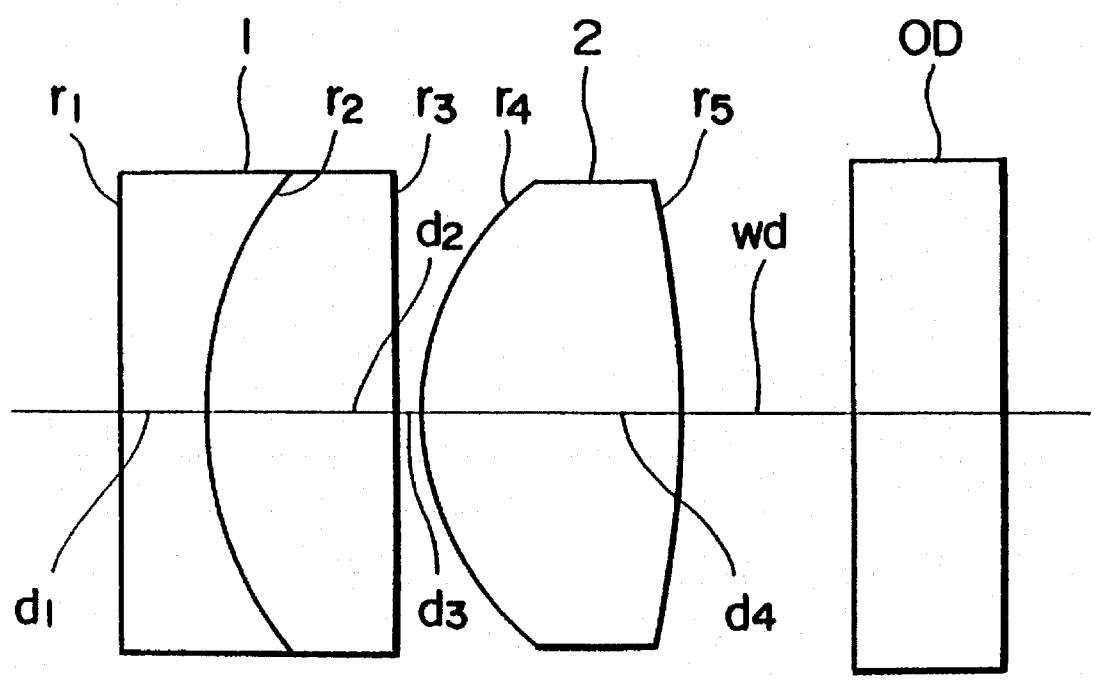
FIG. 25 is a lens diagram showing Embodiment 8 of an objective lens according to the present invention.

FIG. 25 shows Embodiment 8 of the objective lens and concrete numerical value construction is shown in TABLE 15. The converging lens is the same to that of Embodiment 7.

Figure 26:
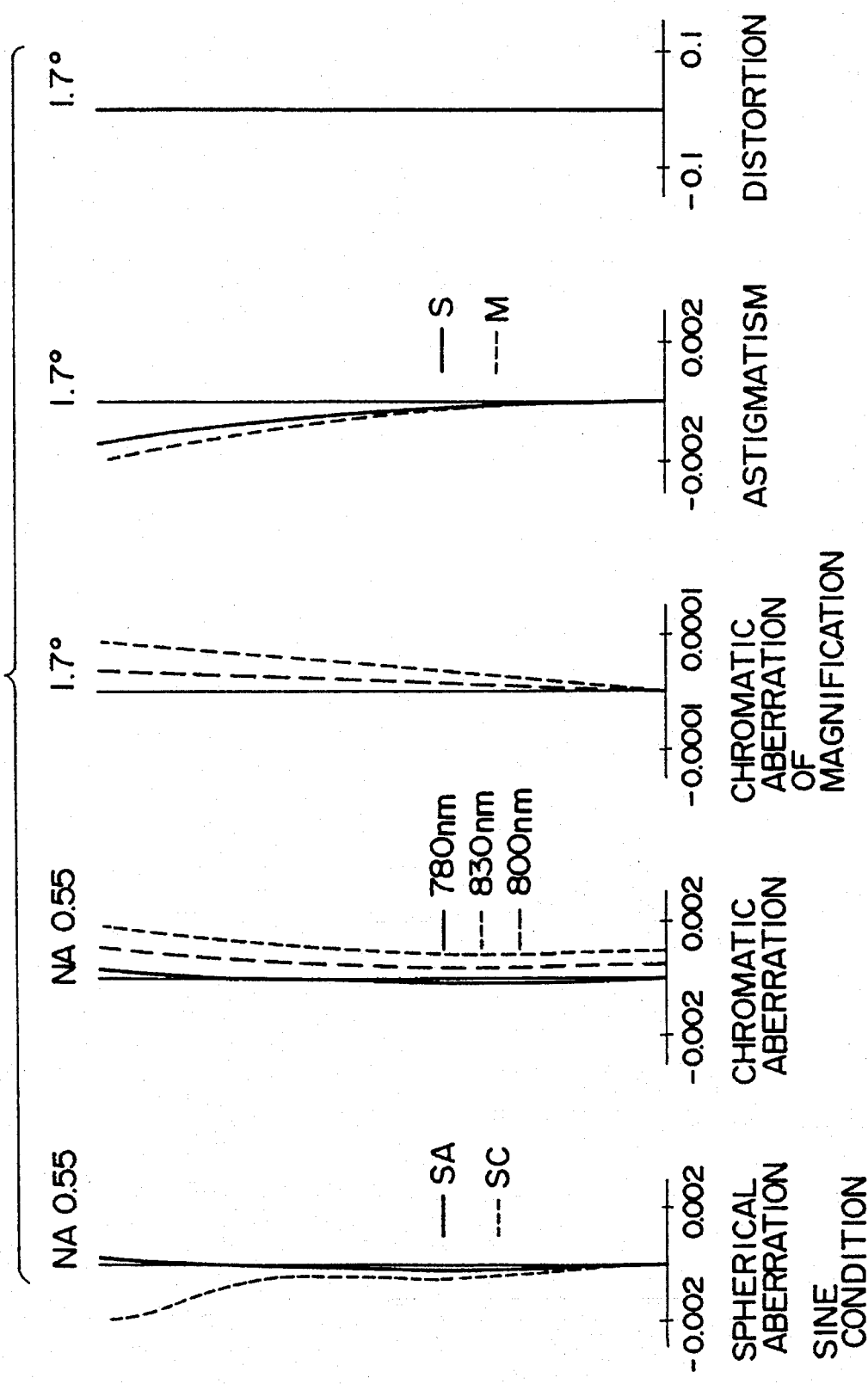
FIG. 26 are various aberration diagrams of the objective lens shown in FIG. 25.
Figure 27:
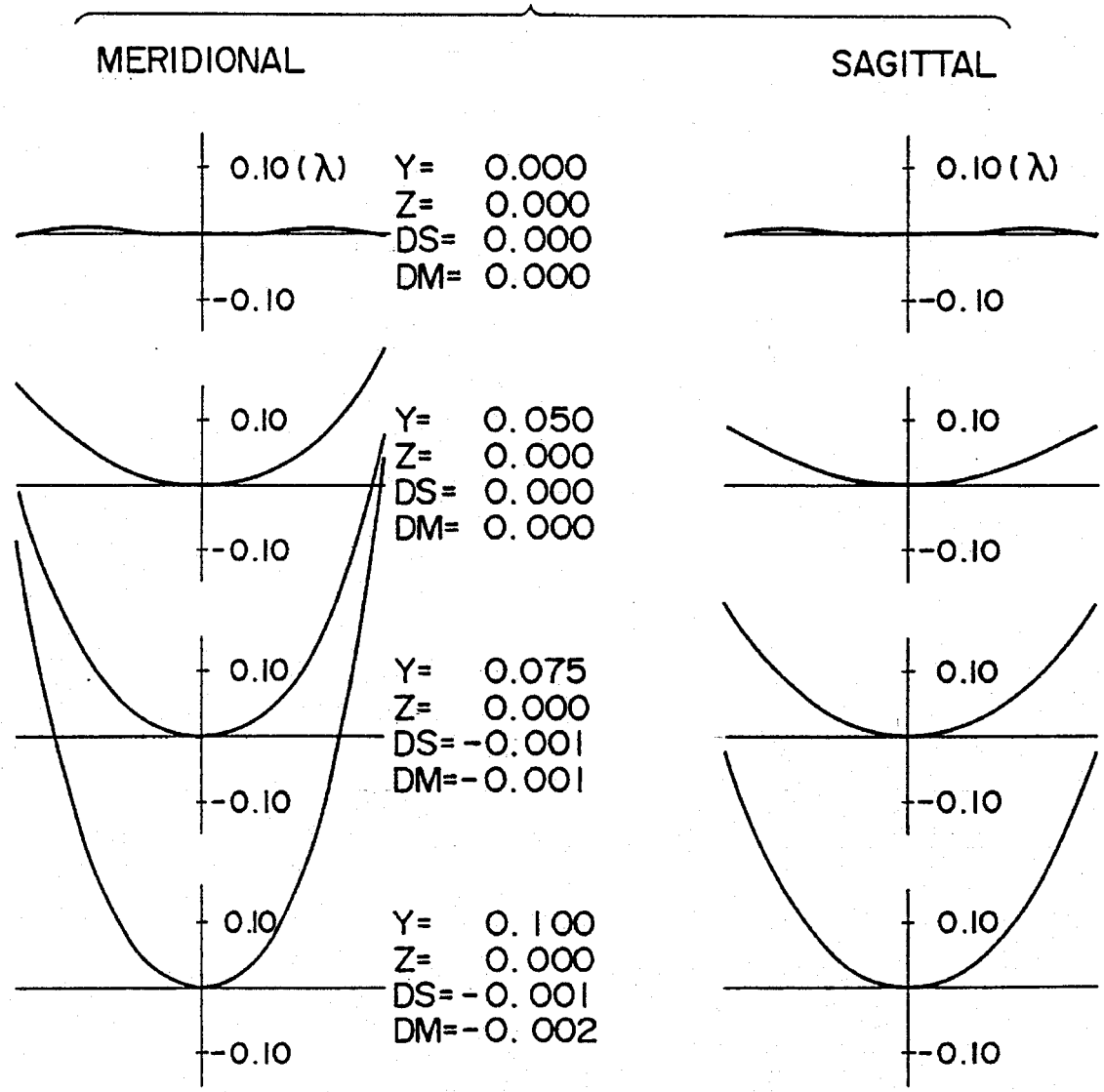
FIG. 27 are wave aberration diagrams of the objective lens shown in FIG. 26.

Various aberrations of this objective lens are shown in FIG. 26 and the wave aberrations are shown in FIG. 27.

TABLE 15

NA = 0.55   f = 3.31   ω = 1.7°   wd = 1.40   fcn = 3.30   Ac = 0.60

| surface NO. | r | d | n780 | vd | Δn | v780 | glass material name |
|---|---|---|---|---|---|---|---|
| 1 | ∞ | 0.70 | 1.82484 | 23.8 | −7.2 × $10^{-5}$ | | SFL03 |
| 2 | 3.000 | 1.50 | 1.82195 | 42.7 | −4.5 × $10^{-5}$ | | LaSF05 |
| 3 | ∞ | 0.20 | | | | | |
| 4 | 2.005 | 2.080 | 1.48479 | | −2.4 × $10^{-5}$ | | |
| 5 | −5.231 | | | | | | |

Embodiment 9

Figure 28:
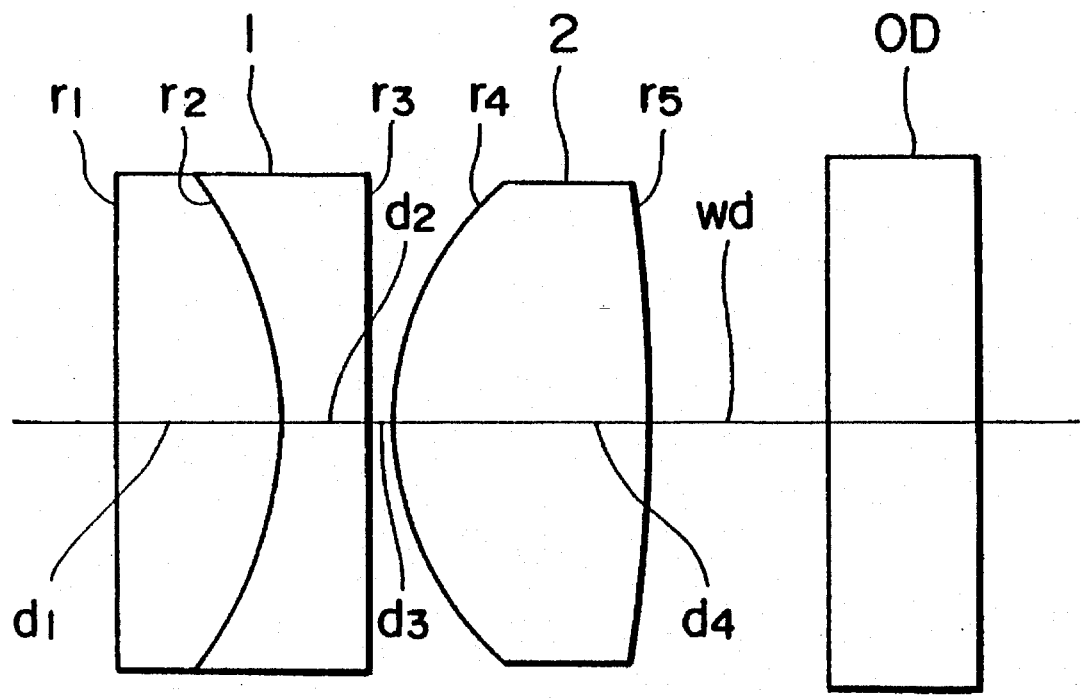
FIG. 28 is a lens diagram showing Embodiment 9 of an objective lens according to the present invention.
Figure 29:
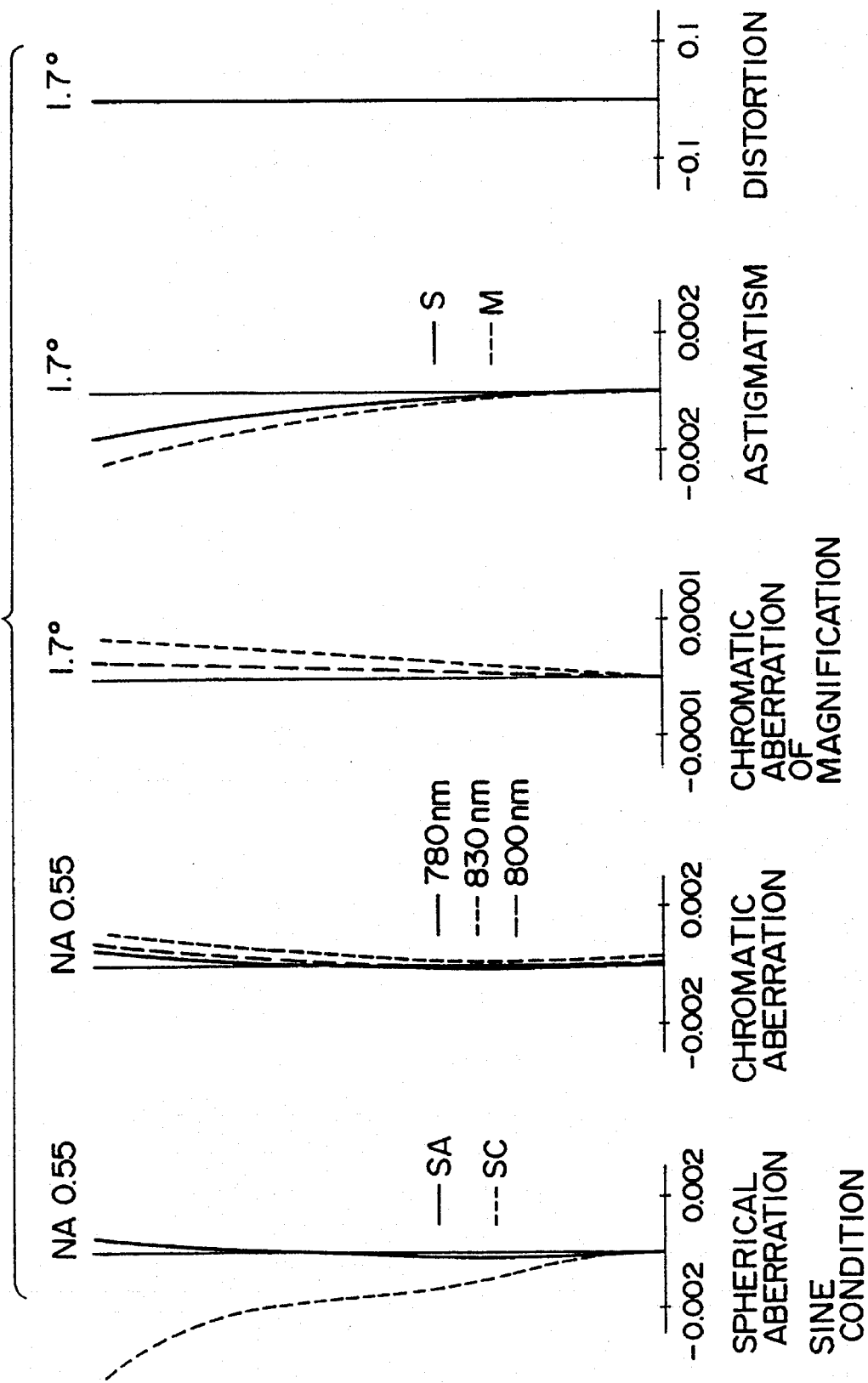
FIG. 29 are various aberration diagrams of the objective lens shown in FIG. 28.
Figure 31:
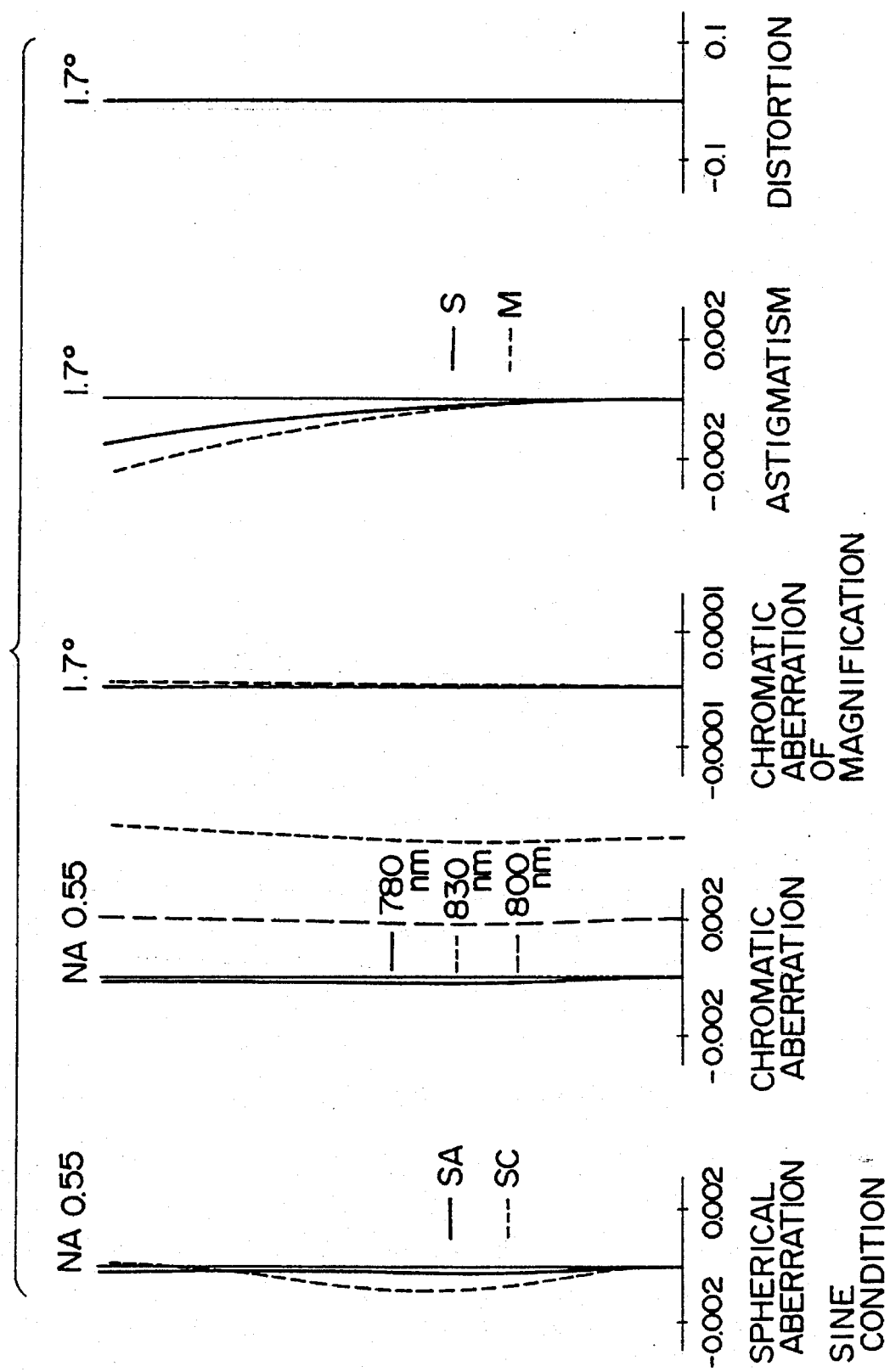
FIG. 31 are various aberration diagrams of a single unit of the converging lens shown in FIG. 28.
Figure 32:
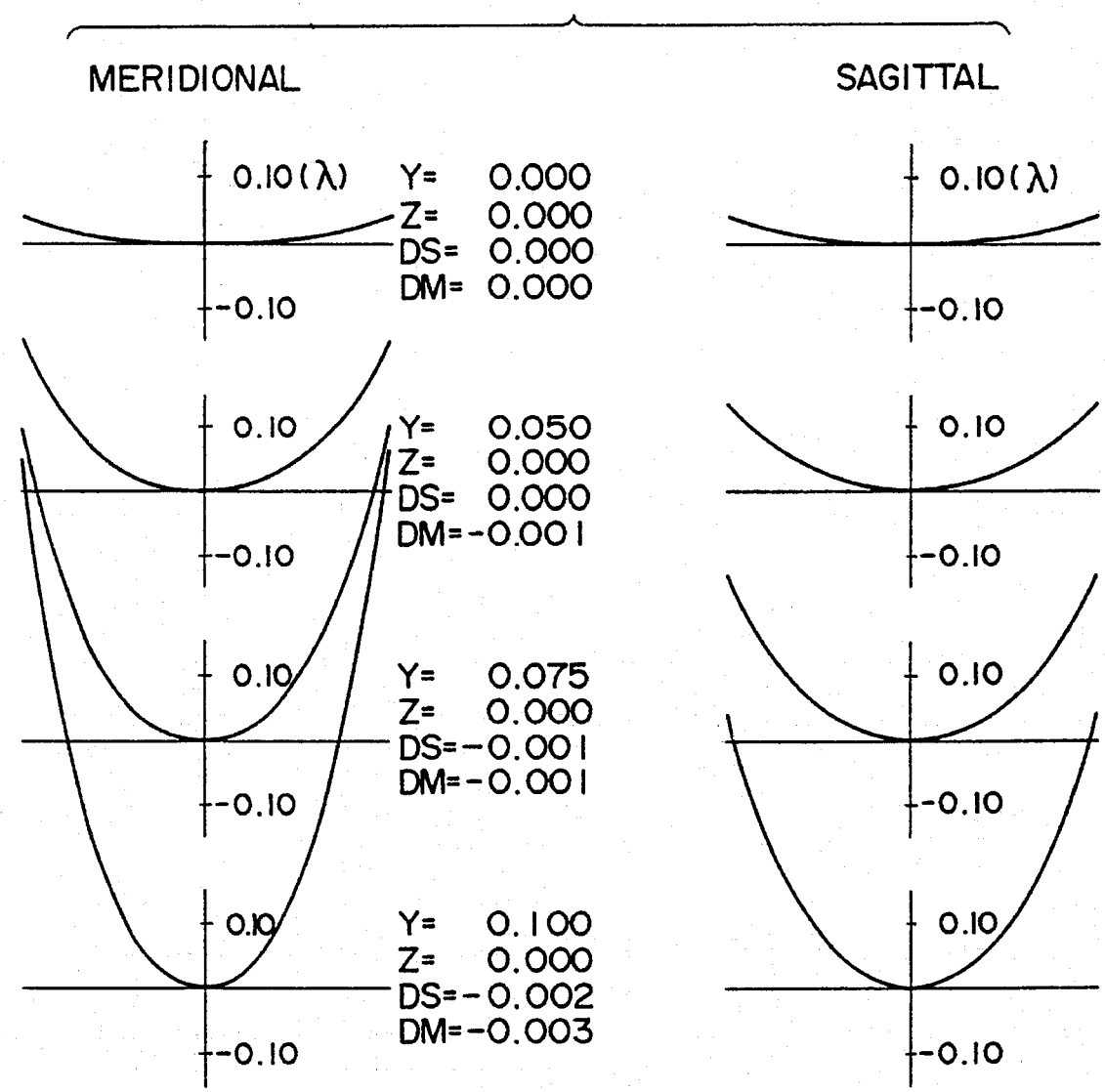
FIG. 32 are wave aberration diagrams of a single unit of the converging lens shown in FIG. 28.

FIG. 28 shows Embodiment 9 of the objective lens and concrete numerical values of construction are shown in TABLE 16. The aspherical coefficients of the converging lens are shown in TABLE 17. Various aberrations of this objective lens are shown in FIG. 29 and the wave aberrations are shown in FIG. 30. Also, in order to determine the effect of the chromatic aberration correction element, various aberrations and the wave aberrations by a single unit of the converging lens are shown in FIGS. 31 and 32.

TABLE 16

| | NA = 0.55 | f = 3.31 | ω = 1.7° | wd = 1.42 | fcn = 3.30 | Ac = 0.72 | |
|---|---|---|---|---|---|---|---|
| surface | | | | | | glass material | |
| NO. | r | d | n780 | vd | Δn | v780 | name |
| 1 | ∞ | 1.30 | 1.82195 | 42.2 | $-4.5 \times 10^{-5}$ | 875 | LaSF05 |
| 2 | −2.900 | 0.70 | 1.82484 | 23.8 | $-7.2 \times 10^{-5}$ | 553 | SFL03 |
| 3 | ∞ | 0.20 | | | | | |
| 4 | 2.116 | 2.00 | 1.53670 | | $-2.3 \times 10^{-5}$ | 1507 | |
| 5 | −7.278 | | | | | | |

TABLE 17

| 4th surface | 5th surface |
|---|---|
| K = −5086 | K = −0.9722 |
| A4 = $0.5580 \times 10^{-4}$ | A4 = $0.1344 \times 10^{-1}$ |
| A6 = $-0.1938 \times 10^{-4}$ | A6 = $-0.2130 \times 10^{-2}$ |
| A8 = $0.3046 \times 10^{-4}$ | A8 = $0.1502 \times 10^{-3}$ |
| A10 = $-0.1039 \times 10^{-4}$ | A10 = $-0.2659 \times 10^{-5}$ |

Embodiment 10

Figure 33:
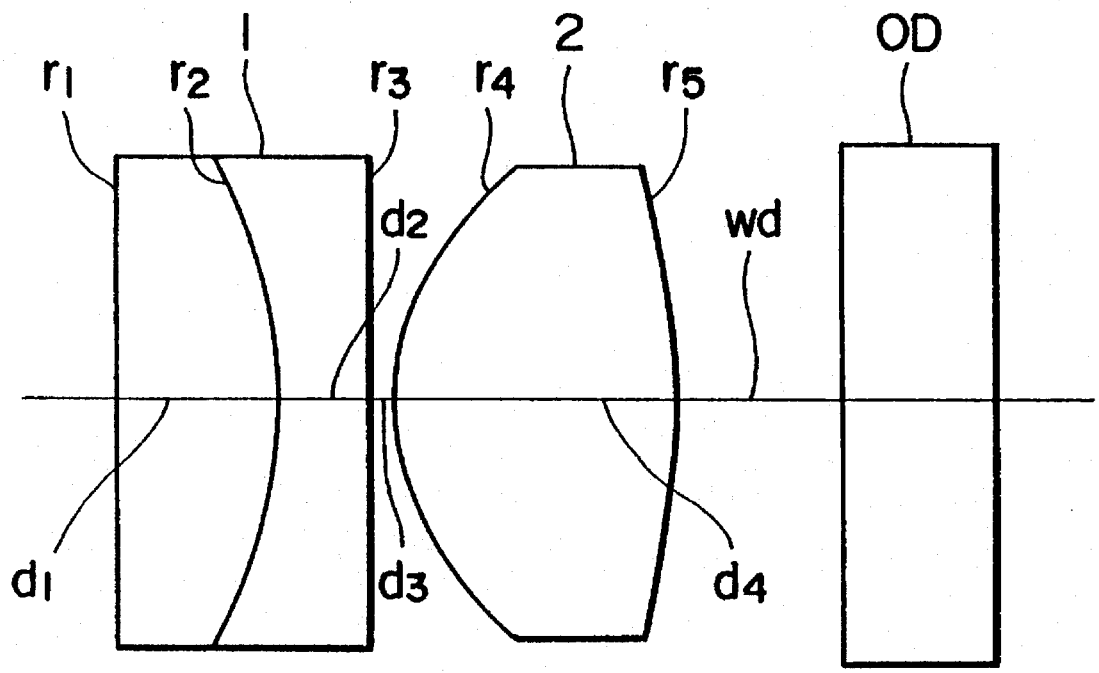
FIG. 33 is a lens diagram showing Embodiment 10 of an objective lens according to the present invention.
Figure 34:
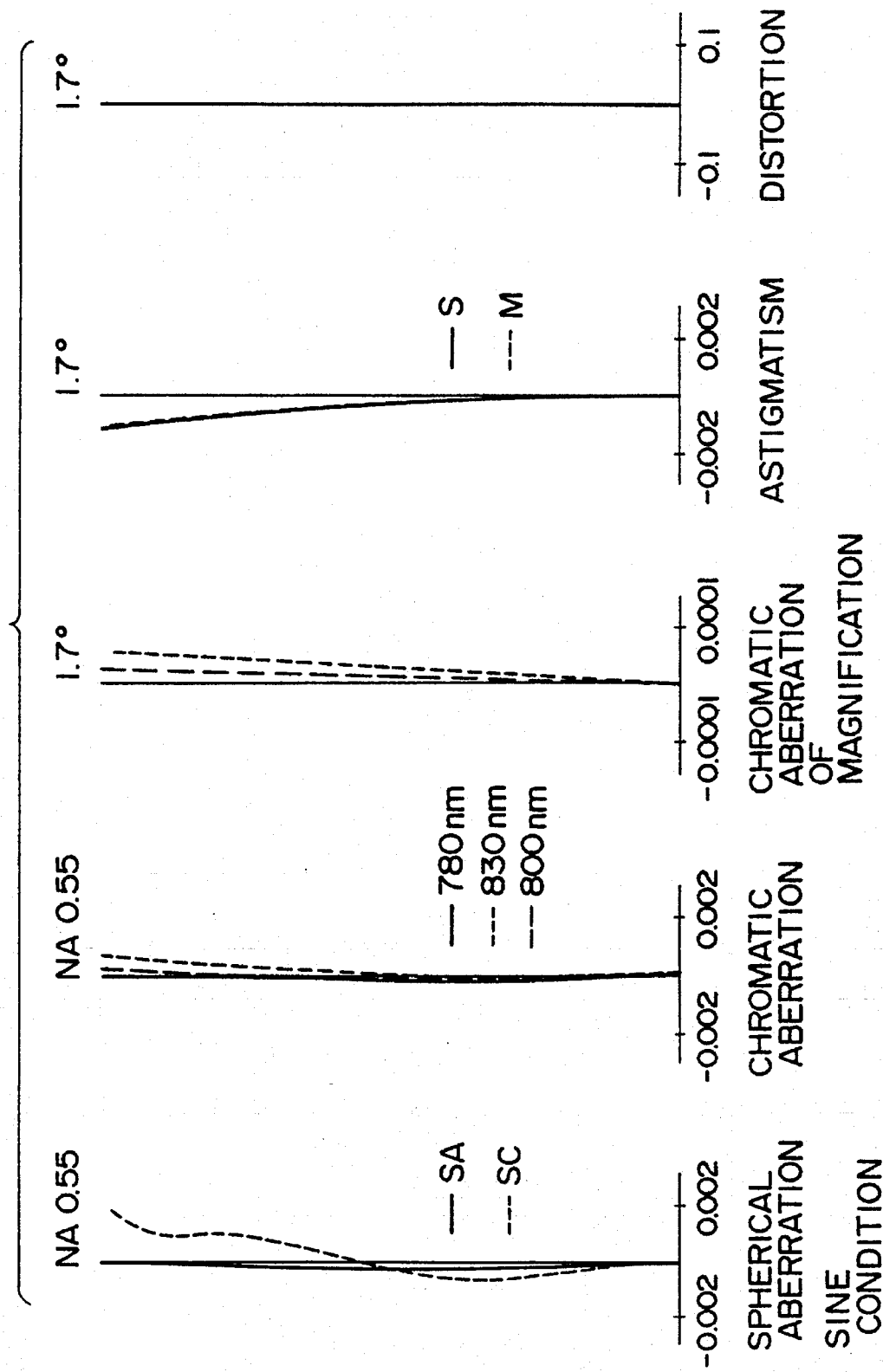
FIG. 34 are various aberration diagrams of the objective lens shown in FIG. 33.
Figure 36:
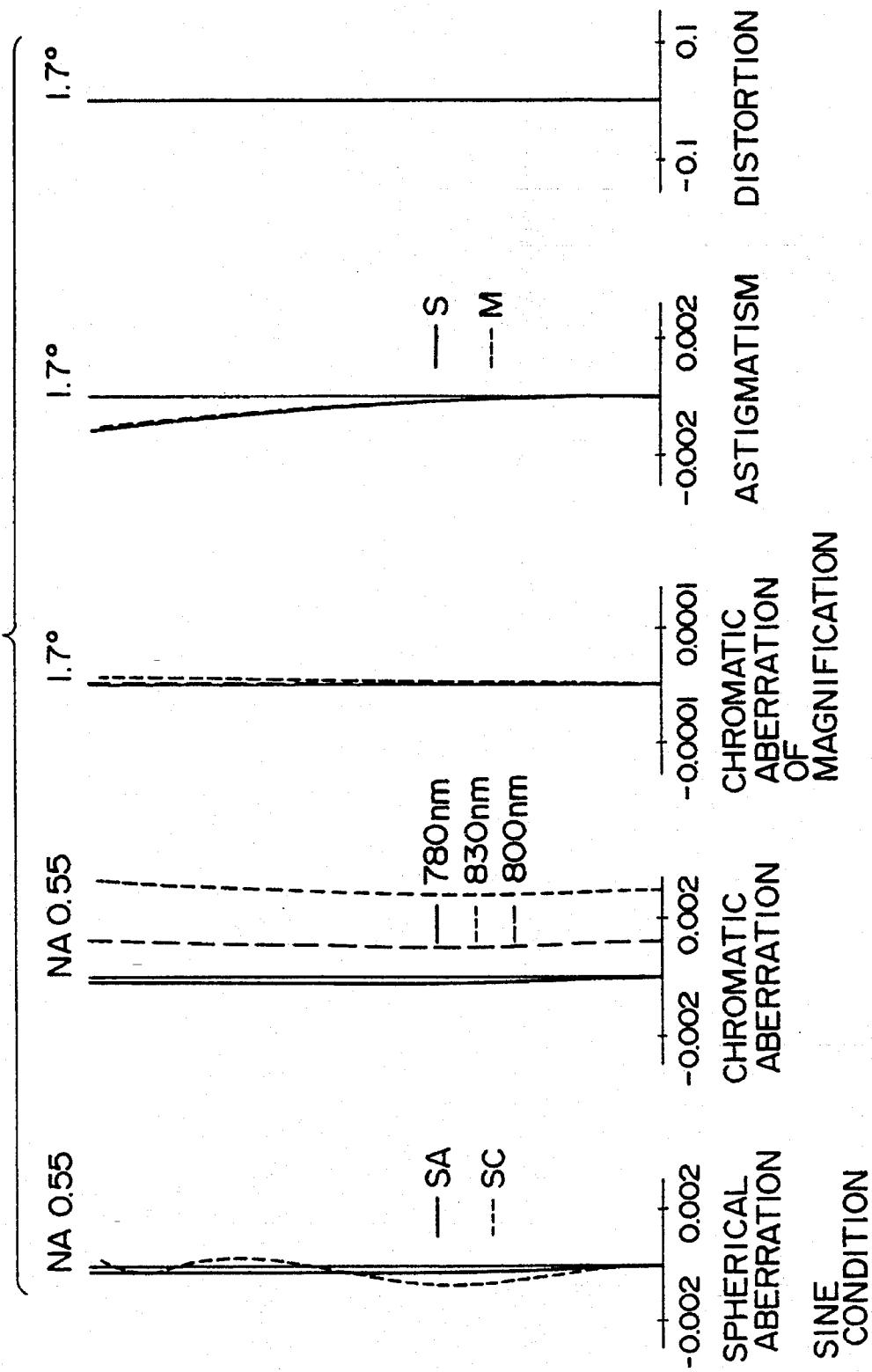
FIG. 36 are various aberration diagrams of a single unit of the converging lens shown in FIG. 33.
Figure 37:
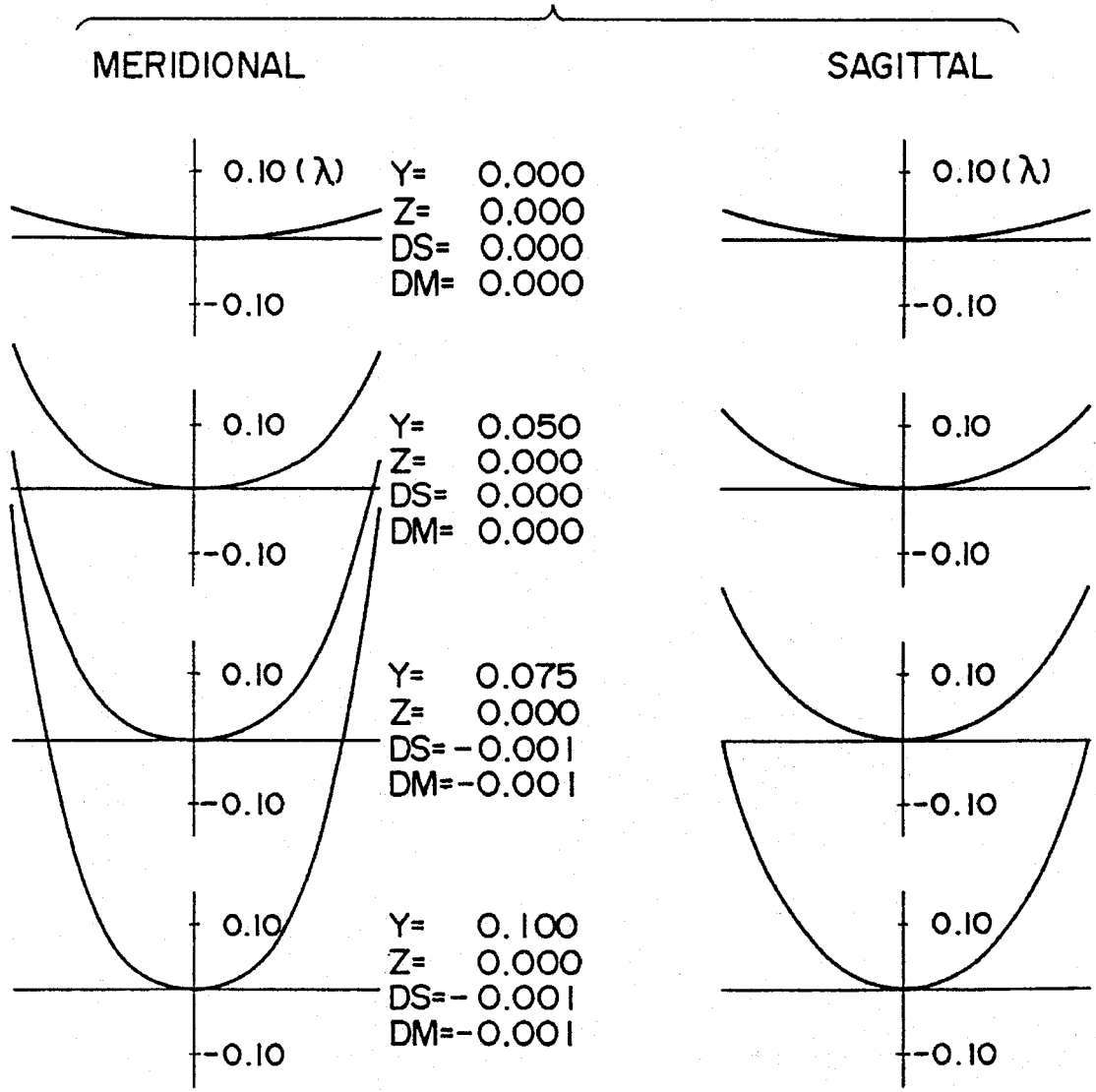
FIG. 37 are wave aberration diagrams of a single unit of the converging lens shown in FIG. 33.

FIG. 33 shows Embodiment 10 of the objective lens, with concrete numerical values of construction being shown in TABLE 18 and the coefficients of the aspherical surface of the conversing lens are shown in, TABLE 19. Various aberrations of this objective lens are shown in FIG. 34 and the wave aberrations are shown in FIG. 35. Also, in order to determine the effect of the chromatic aberration correction element, various aberrations and the wave aberrations by a single unit of the converging lens are shown in FIGS. 36 and 37.

TABLE 18

| | NA = 0.55 | f = 3.30 | ω = 1.7° | wd = 1.32 | fcn = 3.30 | Ac = 0.71 | |
|---|---|---|---|---|---|---|---|
| surface | | | | | | glass material | |
| NO. | r | d | n780 | vd | Δn | v780 | name |
| 1 | ∞ | 1.30 | 1.78705 | 42.2 | $-4.4 \times 10^{-5}$ | 880 | LaSF02 |
| 2 | −3.600 | 0.70 | 1.78565 | 25.4 | $-6.5 \times 10^{-5}$ | 601 | SFL6 |
| 3 | ∞ | 0.20 | | | | | |
| 4 | 1.883 | 2.24 | 1.43107 | | $-1.2 \times 10^{-5}$ | 1461 | |
| 5 | −3.732 | | | | | | |

TABLE 19

| 4th surface | 5th surface |
|---|---|
| K = −562723 | K = $-0.4708 \times 10$ |
| A4 = $-0.1402 \times 10^{-3}$ | A4 = $0.2011 \times 10^{-1}$ |
| A6 = $-0.6290 \times 10^{-4}$ | A6 = $-0.5946 \times 10^{-2}$ |
| A8 = $0.4357 \times 10^{-4}$ | A8 = $0.9448 \times 10^{-3}$ |
| A10 = $-0.2548 \times 10^{-4}$ | A10 = $-0.6470 \times 10^{-4}$ |

A relation between above-mentioned embodiment (EX.) and conditional expressions (1) to (7) are shown in TABLES 20 and 21 as follows:

TABLE 20

| Condition | EX. 1 | EX. 2 | EX. 3 | EX. 4 | EX. 5 |
|---|---|---|---|---|---|
| (1) | 0.0878 | 0.1242 | 0.0599 | 0.0451 | 0.0062 |
| (2) | 0.834 | 0.922 | 0.945 | 0.727 | 1.176 |
| (3) | 601 | 601 | 601 | 601 | 601 |
| (4) | 1454 | 1136 | 1454 | 1454 | 1454 |
| (5) | 1.61139 | 1.68442 | 1.61139 | 1.61139 | 1.61139 |
| (6) | 17436 | 10123 | 17426 | 17426 | 17426 |
| (7) | 0.359 | 0.322 | 0.359 | 0.359 | 0.359 |

TABLE 21

| Condition | EX. 6 | EX. 7 | EX. 8 | EX. 9 | EX. 10 |
|---|---|---|---|---|---|
| (1) | 0.00247 | 0.00319 | 0.00319 | 0.00330 | 0.00128 |
| (2) | 0.856 | 0.906 | 0.906 | 0.878 | 1.090 |
| (3) | 553 | 553 | 553 | 601 | 553 |
| (4) | 875 | 875 | 875 | 875 | 880 |
| (5) | 1.82195 | 1.82195 | 1.82195 | 1.82195 | 1.78705 |
| (6) | 289 | 289 | 289 | 289 | 140 |

TABLE 21-continued

| Condition | EX. 6 | EX. 7 | EX. 8 | EX. 9 | EX. 10 |
|---|---|---|---|---|---|
| (7) | 0.302 | 0.302 | 0.302 | 0.302 | 0.250 |

Figure 38:
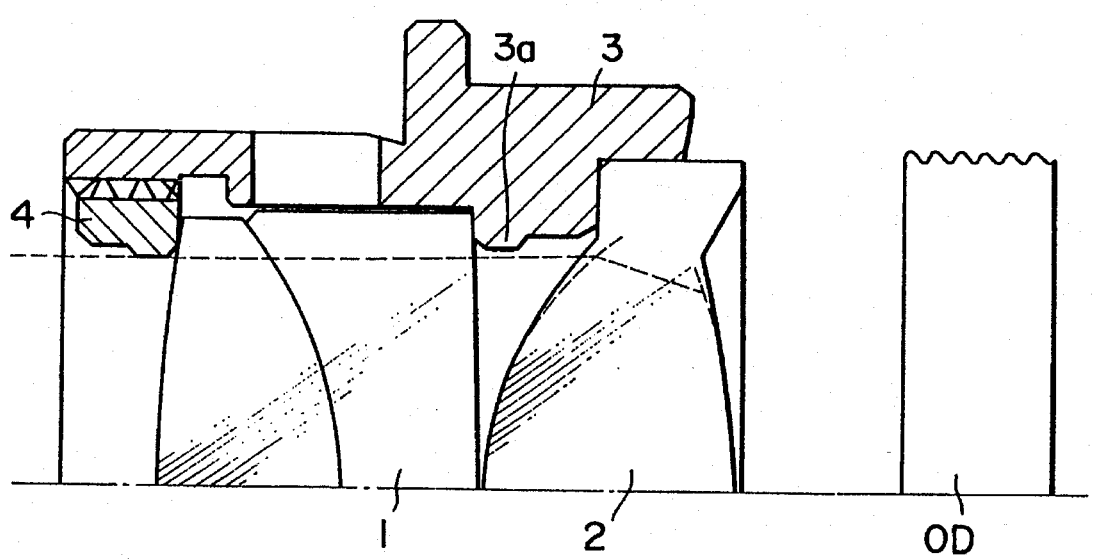
FIG. 38 is a sectional diagram showing one example of lens barrel in which an objective lens is mounted.

FIG. 38 shows one example of the assembly of the abovementioned objective lens in a lens barrel. In the lens barrel 3, an inner flange 3a is formed. The chromatic aberration correction element 1 is butted into the inner flange 3a from a left side in the figure and fixed by a ring nut 4.

On the other hand, the converging lens 2 is inserted in the lens barrel 3 from right side in figure, and is positioned by butting into the inner flange 3a.

Figure 39:
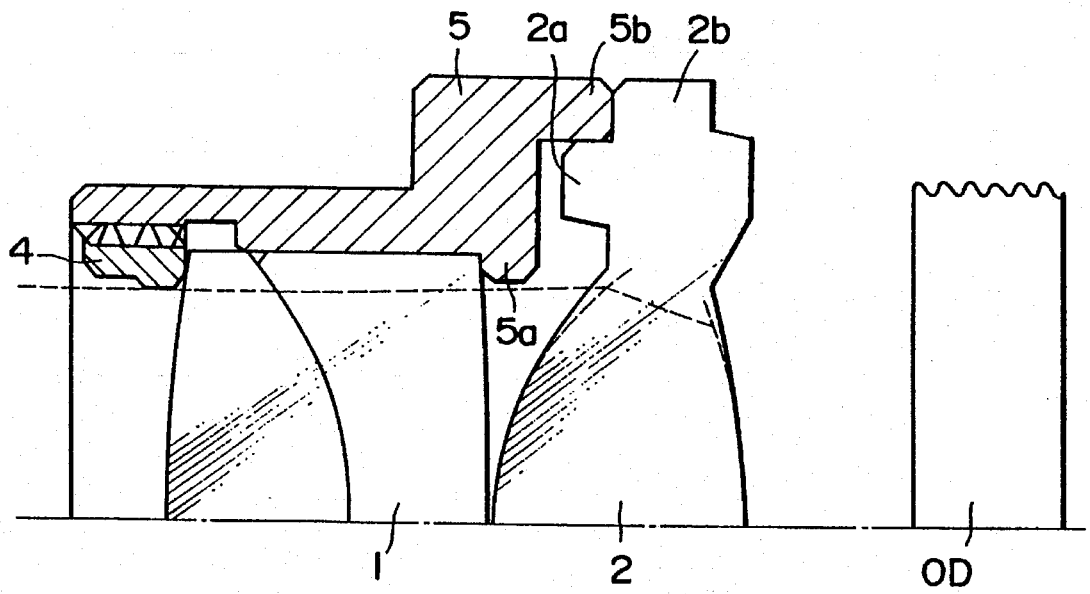
FIG. 39 is a sectional diagram showing other example of lens barrel in which an objective lens is mounted.

FIG. 39 shows another example of the assembly of the objective lens. In this example, the chromatic aberration correction element I is butted into the inner flange 5a from left side in the figure, and fixed by the ring nut 4, same as above explained example.

The converging lens 2 has a rib 2a which is projected along the optical axis direction and an edge portion 2b which is projected to the outer direction. The rib 2a is set in a frame portion 5b of the lens barrel 5, and the edge portion 2b is butted into the frame portion 5b. In this case, the converging lens 2 is made of plastic, and this lens is formed integral with the rib 2a and the edge portion 2b. Moreover, it is possible that the converging lens 2 formed integral with the lens barrel 5.

The following embodiments 11 to 20 disclose the present invention applied to a collimator lens for collimating at divergent light of beam.

The collimator lens of each embodiment consists of a converging lens which has enough power for collimating a divergent light beam or converging a parallel light beam and a chromatic aberration correction element which consists of a convex lens and a concave lens cemented with each other.

In the embodiments 11–20 in which lenses are used for wavelength 780 nm, material of the converging lens is C&FES5 (Merchandise Name: Sumida Kogaku), FKO1(Merchandise Name: Ohara),, BK7(Merchandise Name: Ohara), SK5(Merchandise Name: Ohara). or LaFB-(Merchandise Name: Ohara).

Material of the negative lens of the chromatic aberration correction element is SFS53(Merchandise Name: Minolta Camera), and material of the positive lens is LaKO11(Merchandise Name: Ohara).

Embodiment 11

Figure 40:
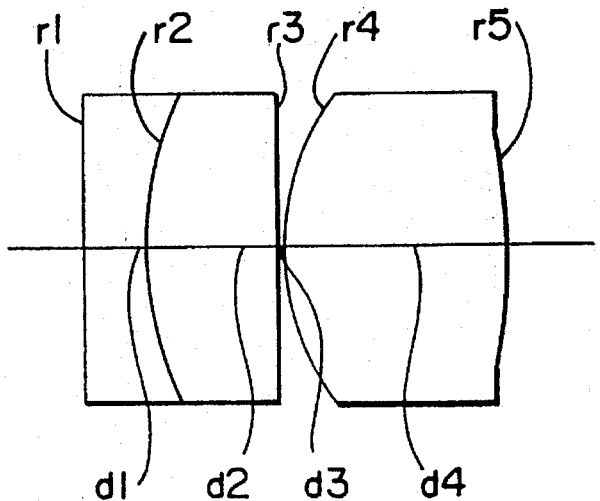
FIG. 40 is a lens diagram showing Embodiment 11 of an collimator lens according to the present invention.
Figure 41:
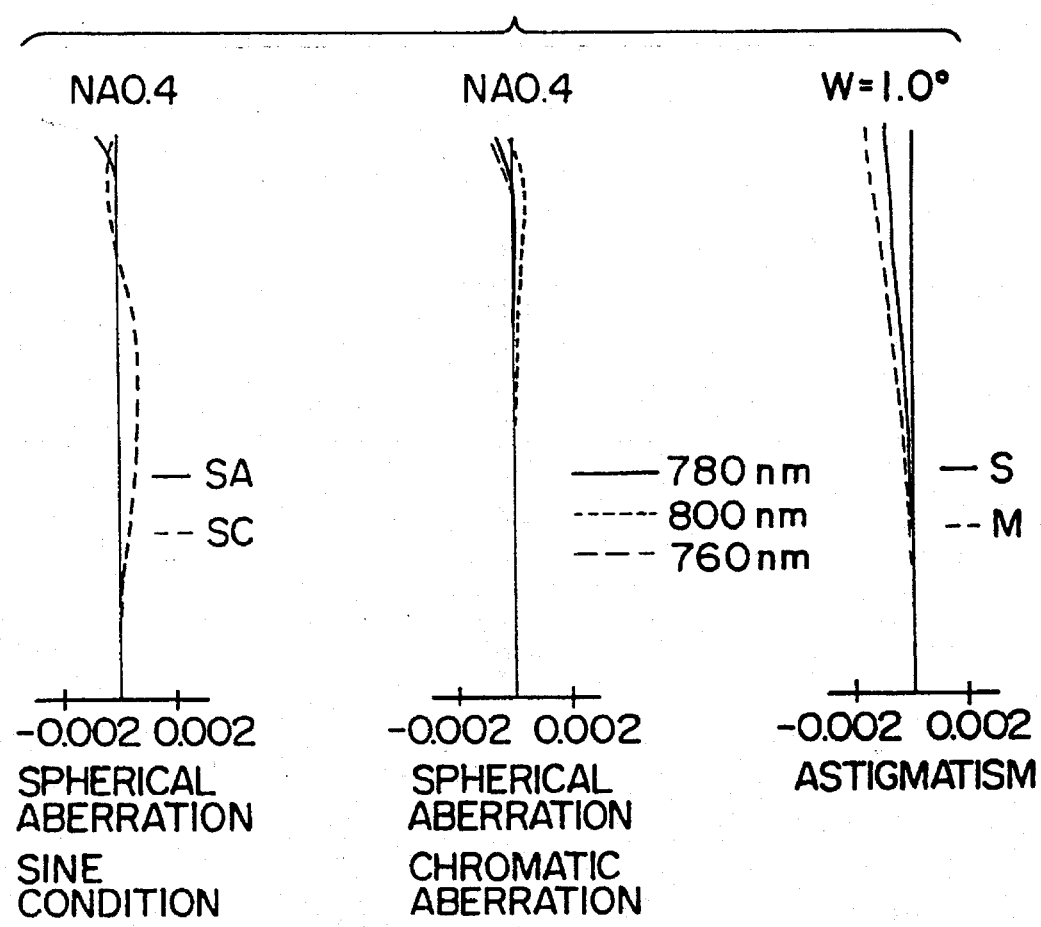
FIG. 41 are various aberration diagrams of the collimator lens shown in FIG. 40.

FIG. 40 shows Embodiment 11 of the collimator lens, with concrete numerical values for construction are shown in TABLE 22 and the coefficients of the aspherical surface of the converging lens are shown in TABLE 23. Various aberrations of this collimator lens are shown in TABLE 23. shown in FIG. 41.

TABLE 22

NA = 0.4 f = 6.00 ω = 1.0 fb = 4.10 fcn = 6.00 Ac = 0.85

| surface number | r | d | nd | vd | Δn | glass material n780 | name |
| --- | --- | --- | --- | --- | --- | --- | --- |
| 1 | ∞ | 1.000 | 1.75000 | 25.1 | $-6.0 \times 10^{-5}$ | 1.73166 | SFS53 |
| 2 | 6.000 | 2.000 | 1.74100 | 52.6 | $-3.4 \times 10^{-5}$ | 1.73145 | LaK011 |
| 3 | ∞ | 0.100 | | | | | |
| 4 | 3.654 | 3.500 | 1.49700 | 81.6 | $-1.5 \times 10^{-5}$ | 1.49282 | FK01 |
| 5 | -10.586 | | | | | | |

TABLE 23

| 4th surface | 5th surface |
| --- | --- |
| K = -0.1590 | K = 0.0000 |
| A4 = $-0.1307 \times 10^{-2}$ | A4 = $0.1906 \times 10^{-2}$ |
| A6 = $-0.8879 \times 10^{-4}$ | A6 = $-0.3060 \times 10^{-3}$ |
| A8 = $-0.4208 \times 10^{-5}$ | A8 = $0.1357 \times 10^{-4}$ |

TABLE 23-continued

| 4th surface | 5th surface |
| --- | --- |
| A10 = $-0.5122 \times 10^{-6}$ | A10 = 0.0000 |

Figure 42:
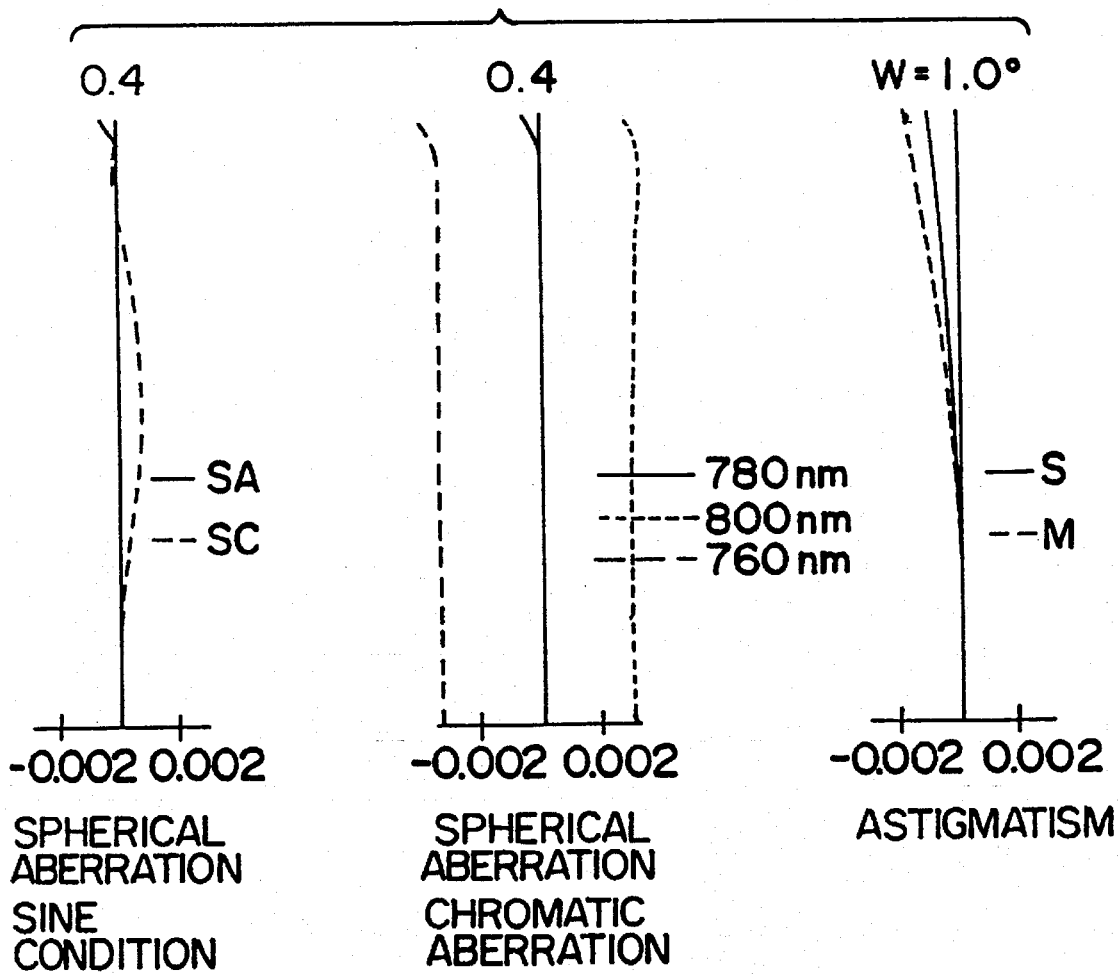
FIG. 42 are various aberration diagrams of single unit of the converging lens shown in FIG. 40.

FIG. 42 shows various aberrations of the converging lens as a single element. It can be understood that the chromatic aberration correction element sets of chromatic aberration of the converging lens by comparing FIG. 41 and FIG. 42.

Embodiment 12

Figure 43:
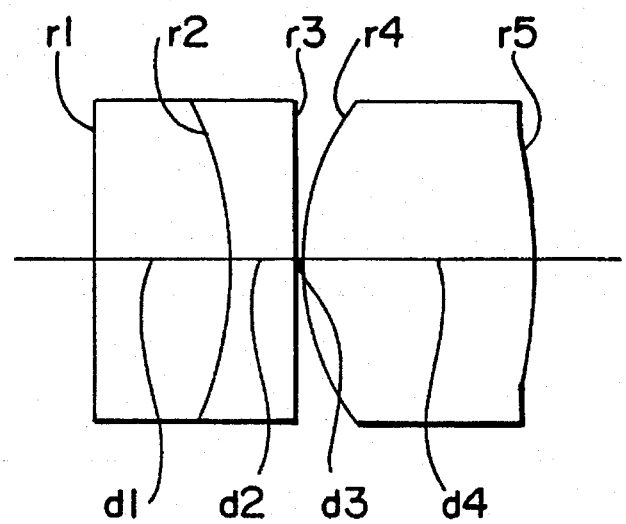
FIG. 43 is a lens diagram showing Embodiment 12 of an collimator lens according to the present invention.
Figure 44:
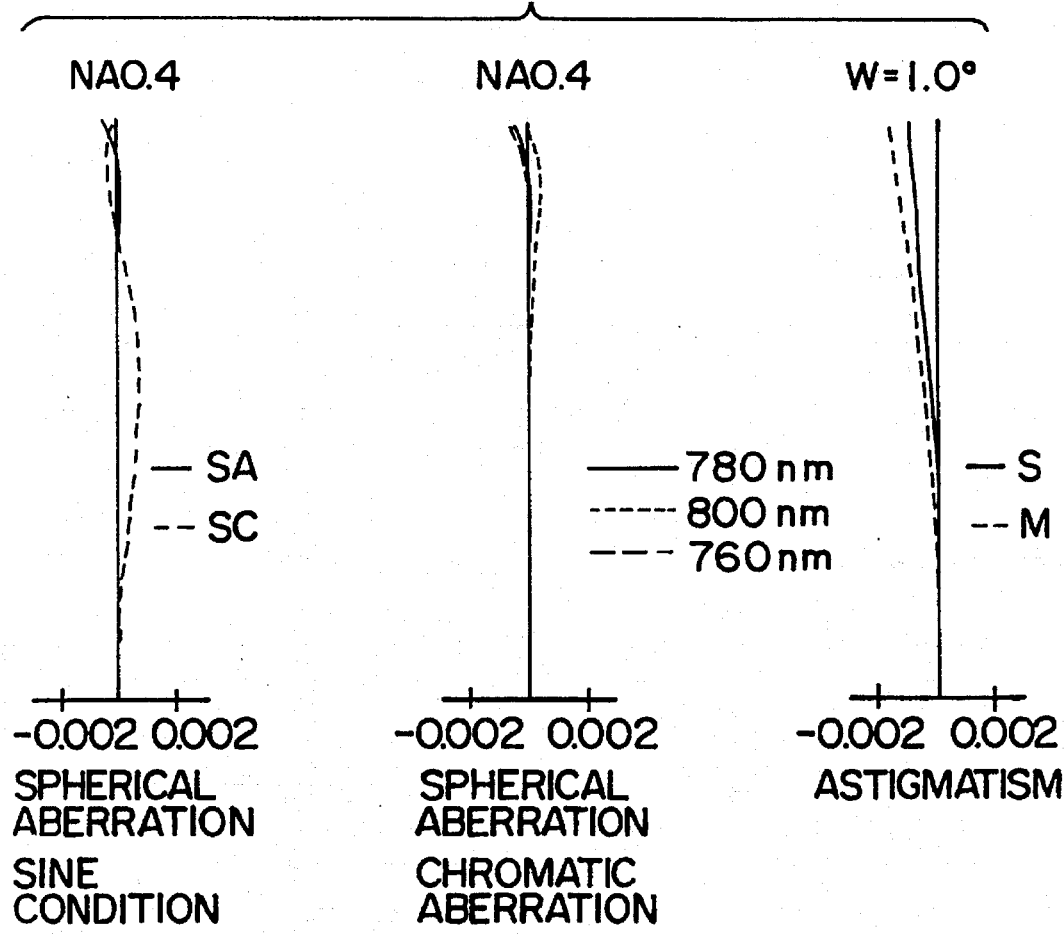
FIG. 44 are various aberration diagrams of the collimator lens shown in FIG. 43.

FIG. 43 shows Embodiment 12 of the collimator lens, with concrete numerical values for construction are shown in TABLE 24. The coefficients of the aspherical surface are omitted, because a conversing lens of this Embodiment is the same as Embodiment 11. Various aberrations of this collimator lens are shown in FIG. 44.

TABLE 24

NA = 0.4 f = 6.00 ω = −1.0 fb = 4.10 fcn = 6.00 Ac = 0.85

| surface number | r | d | nd | vd | Δn | glass material n780 | name |
|---|---|---|---|---|---|---|---|
| 1 | ∞ | 2.000 | 1.74100 | 52.6 | $-3.4 \times 10^{-5}$ | 1.73145 | LaK011 |
| 2 | −6.000 | 1.000 | 1.75000 | 25.1 | $-6.0 \times 10^{-5}$ | 1.73166 | SFS53 |
| 3 | ∞ | 0.100 | | | | | |
| 4 | 3.654 | 3.500 | 1.49700 | 81.6 | $-1.5 \times 10^{-5}$ | 1.49282 | FK01 |
| 5 | −10.586 | | | | | | |

Embodiment 13

Figure 45:
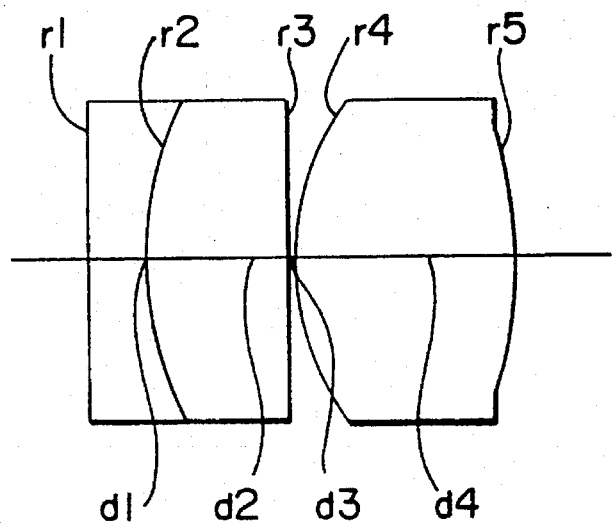
FIG. 45 is a lens diagram showing Embodiment 13 of an collimator lens according to the present invention.
Figure 46:
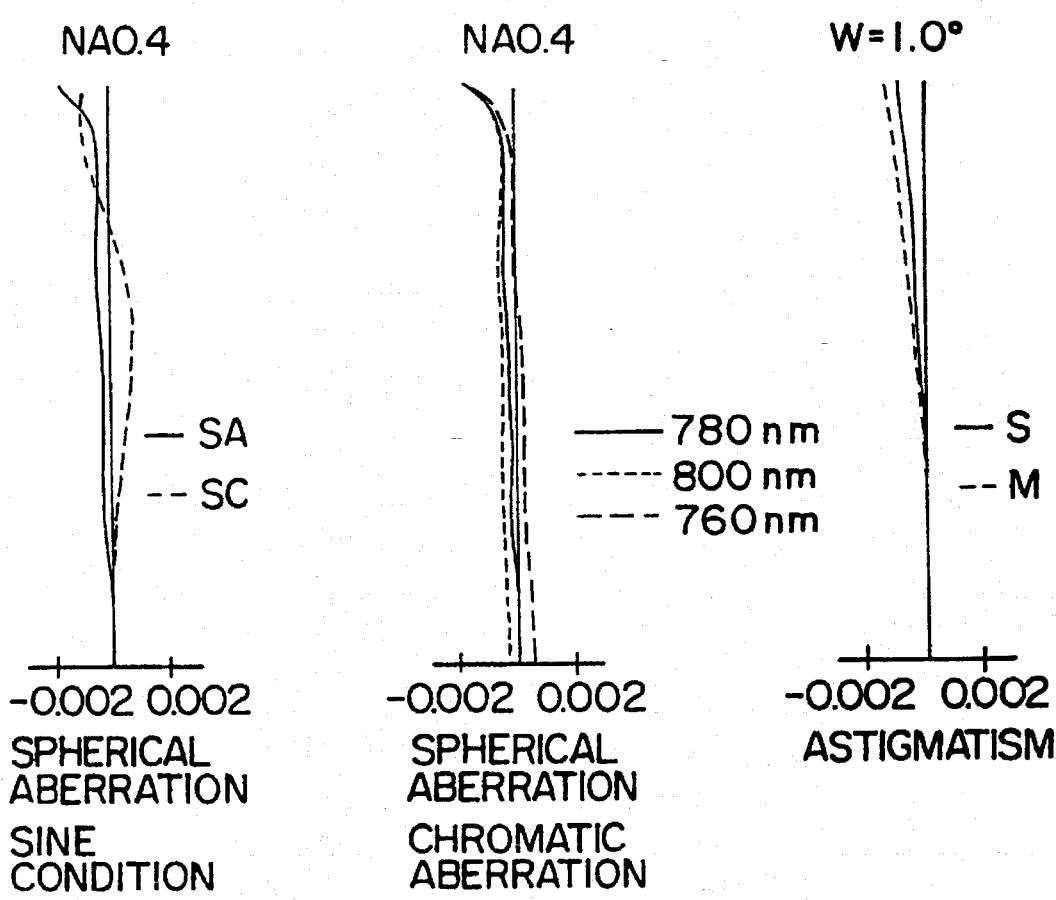
FIG. 46 are various aberration diagrams of the collimator lens shown in FIG. 45.

FIG. 45 shows Embodiment 13 of the collimator lens, with concrete numerical values for construction are shown in TABLE 25 and the coefficients of the aspherical surface of the converging lens are Various aberrations of this collimator lens are shown in TABLE 26. Various aberrations of this collimator lens are shown in FIG. 46.

TABLE 25

NA = 0.4 f = 6.00 ω = −1.0 fb = 4.24 fcn = 6.00 Ac = 0.93

| surface number | r | d | nd | vd | Δn | glass material n780 | name |
|---|---|---|---|---|---|---|---|
| 1 | ∞ | 1.000 | 1.75000 | 25.1 | $-6.0 \times 10^{-5}$ | 1.73166 | SFS53 |
| 2 | 6.0000 | 2.000 | 1.74100 | 52.6 | $-3.4 \times 10^{-5}$ | 1.73145 | LaK011 |
| 3 | ∞ | 0.100 | | | | | |
| 4 | 3.596 | 3.500 | 1.43425 | 95.0 | $-1.2 \times 10^{-5}$ | 1.43107 | CaFK95 |
| 5 | −6.507 | | | | | | |

TABLE 26

| 4th surface | 5th surface |
|---|---|
| K = −0.2170 | K = 0.0000 |
| A4 = $-0.1819 \times 10^{-2}$ | A4 = $0.2314 \times 10^{-2}$ |
| A6 = $-0.1488 \times 10^{-3}$ | A6 = $-0.4510 \times 10^{-3}$ |
| A8 = $0.5707 \times 10^{-5}$ | A8 = $0.1565 \times 10^{-4}$ |

TABLE 26-continued

| 4th surface | 5th surface |
|---|---|
| A10 = $-0.1425 \times 10^{-5}$ | A10 = 0.0000 |

Embodiment 14

Figure 47:
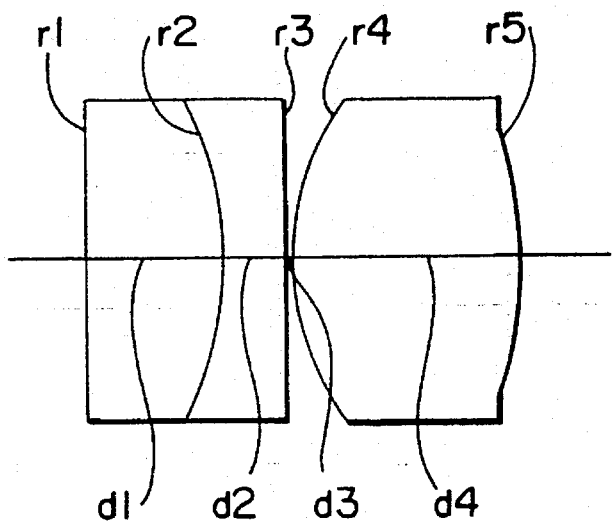
FIG. 47 is a lens diagram showing Embodiment 14 of an collimator lens according to the present invention.
Figure 48:
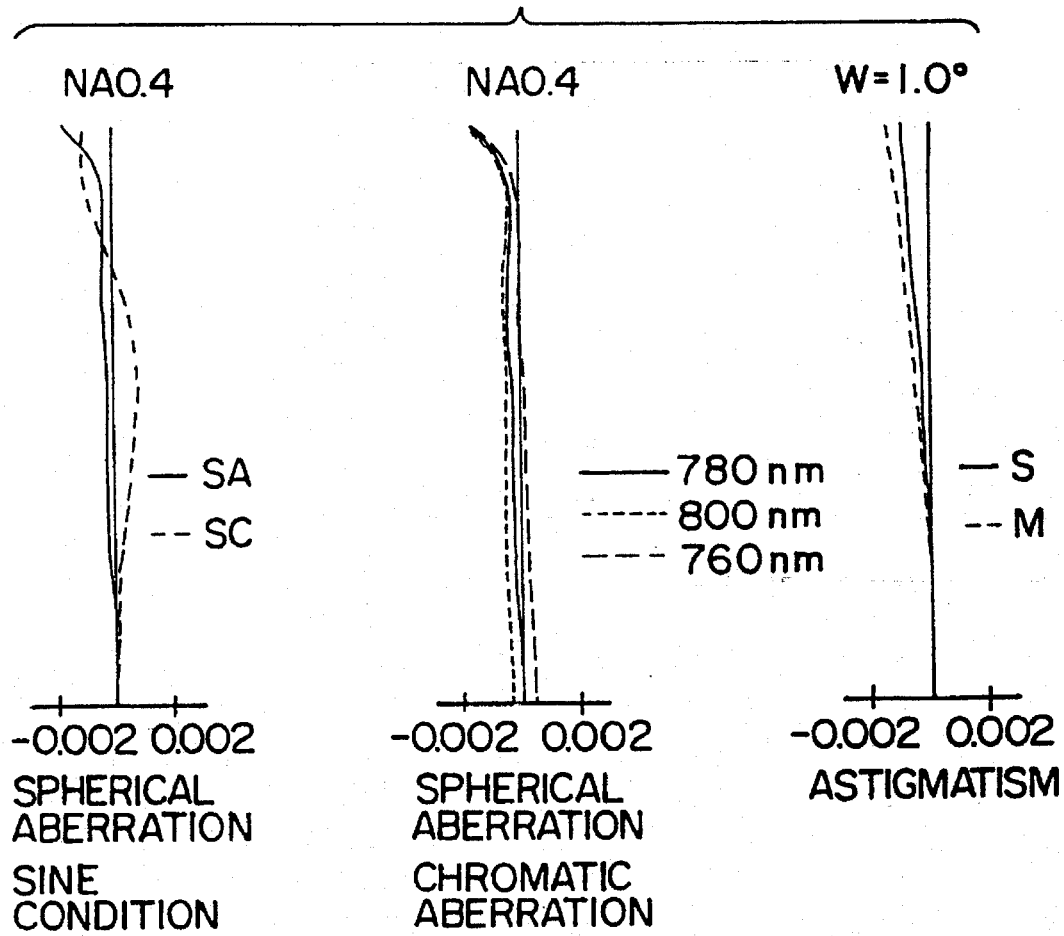
FIG. 48 are various aberration diagrams of the collimator lens shown in FIG. 47.

FIG. 47 shows Embodiment 14 of the collimator lens, with concrete numerical values for construction are shown in TABLE 27. The coefficients of the aspherical surface are omitted, because a converging lens of this Embodiment is the same as Embodiment 13. Various aberrations of this collimator lens are shown in FIG. 48.

TABLE 27

NA = 0.4 f = 6.00 ω = −1.0 fb = 4.24 fcn = 6.00 Ac = 0.93

| surface number | r | d | nd | vd | Δn | glass material n780 | name |
|---|---|---|---|---|---|---|---|
| 1 | ∞ | 2.000 | 1.74100 | 52.6 | $-3.4 \times 10^{-5}$ | 1.73145 | LaK011 |
| 2 | −6.000 | 1.000 | 1.75000 | 25.1 | $-6.0 \times 10^{-5}$ | 1.73166 | SFS53 |
| 3 | ∞ | 0.100 | | | | | |
| 4 | 3.596 | 3.500 | 1.43425 | 95.0 | $-1.2 \times 10^{-5}$ | 1.43107 | CaFK95 |
| 5 | −6.507 | | | | | | |

Embodiment 15

Figure 49:
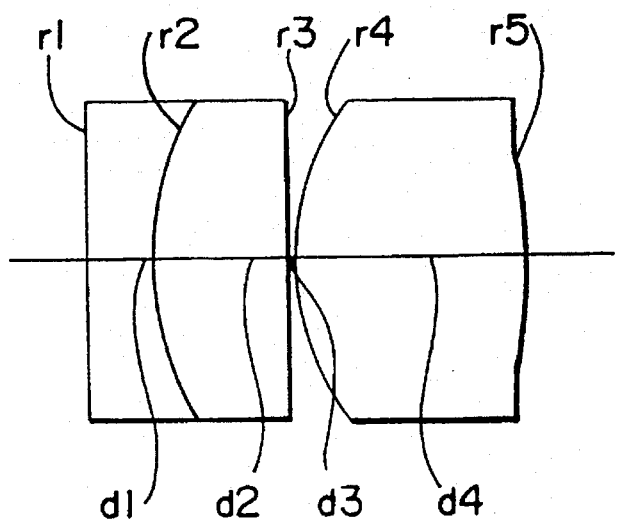
FIG. 49 is a lens diagram showing Embodiment 15 of an collimator lens according to the present invention.
Figure 50:
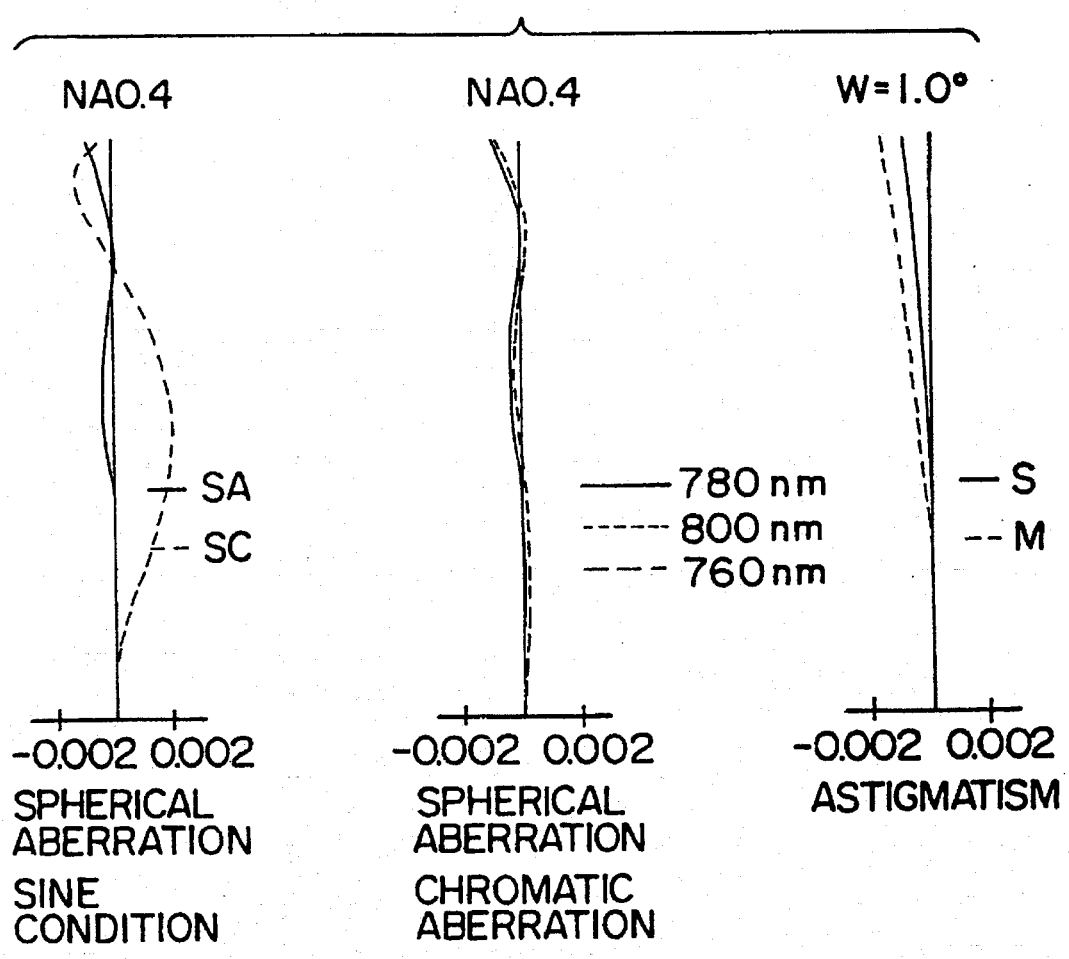
FIG. 50 are various aberration diagrams of the collimator lens shown in FIG. 49.

FIG. 49 shows Embodiment 15 of the collimator lens, with concrete numerical values for construction being shown in TABLE 28 and the coefficients of the aspherical surface of the converting lens are shown in TABLE 29. Various aberrations of this collimator lens are shown in FIG.

50.

TABLE 28

NA = 0.4 f = 6.00 ω = −1.0 fb = 4.08 fcn = 6.00 Ac = 0.82

| surface number | r | d | nd | vd | Δn | glass material n780 | name |
|---|---|---|---|---|---|---|---|
| 1 | ∞ | 1.000 | 1.75000 | 25.1 | $-6.0 \times 10^{-5}$ | 1.73166 | SFS53 |
| 2 | 4.600 | 2.000 | 1.74100 | 52.6 | $-3.4 \times 10^{-5}$ | 1.73145 | LaK011 |
| 3 | ∞ | 0.100 | | | | | |
| 4 | 3.705 | 3.500 | 1.51633 | 64.1 | $-1.5 \times 10^{-5}$ | 1.51072 | BK7 |
| 5 | −12.051 | | | | | | |

TABLE 29

| 4th surface | 5th surface |
|---|---|
| $K = -0.1430$ | $K = 0.0000$ |
| $A4 = -0.1196 \times 10^{-2}$ | $A4 = 0.1956 \times 10^{-2}$ |
| $A6 = -0.7676 \times 10^{-4}$ | $A6 = -0.3997 \times 10^{-3}$ |
| $A8 = -0.8174 \times 10^{-5}$ | $A8 = 0.3033 \times 10^{-4}$ |
| $A10 = 0.2441 \times 10^{-7}$ | $A10 = 0.0000$ |

TABLE 32

| 4th surface | 5th surface |
|---|---|
| $K = -0.9800 \times 10^{-1}$ | $K = 0.0000$ |
| $A4 = -0.8706 \times 10^{-3}$ | $A4 = 0.1911 \times 10^{-2}$ |
| $A6 = -0.5242 \times 10^{-4}$ | $A6 = -0.3666 \times 10^{-3}$ |
| $A8 = -0.6444 \times 10^{-5}$ | $A8 = 0.4334 \times 10^{-4}$ |
| $A10 = 0.2924 \times 10^{-6}$ | $A10 = 0.0000$ |

Embodiment 18

Figure 51:
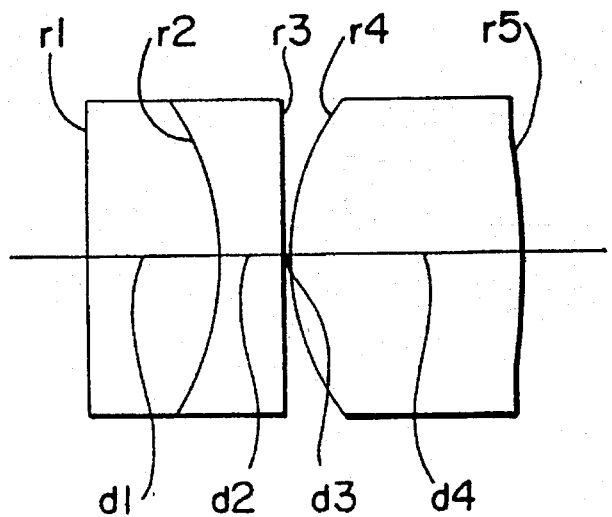
FIG. 51 is a lens diagram showing Embodiment 16 of an collimator lens according to the present invention.
Figure 52:
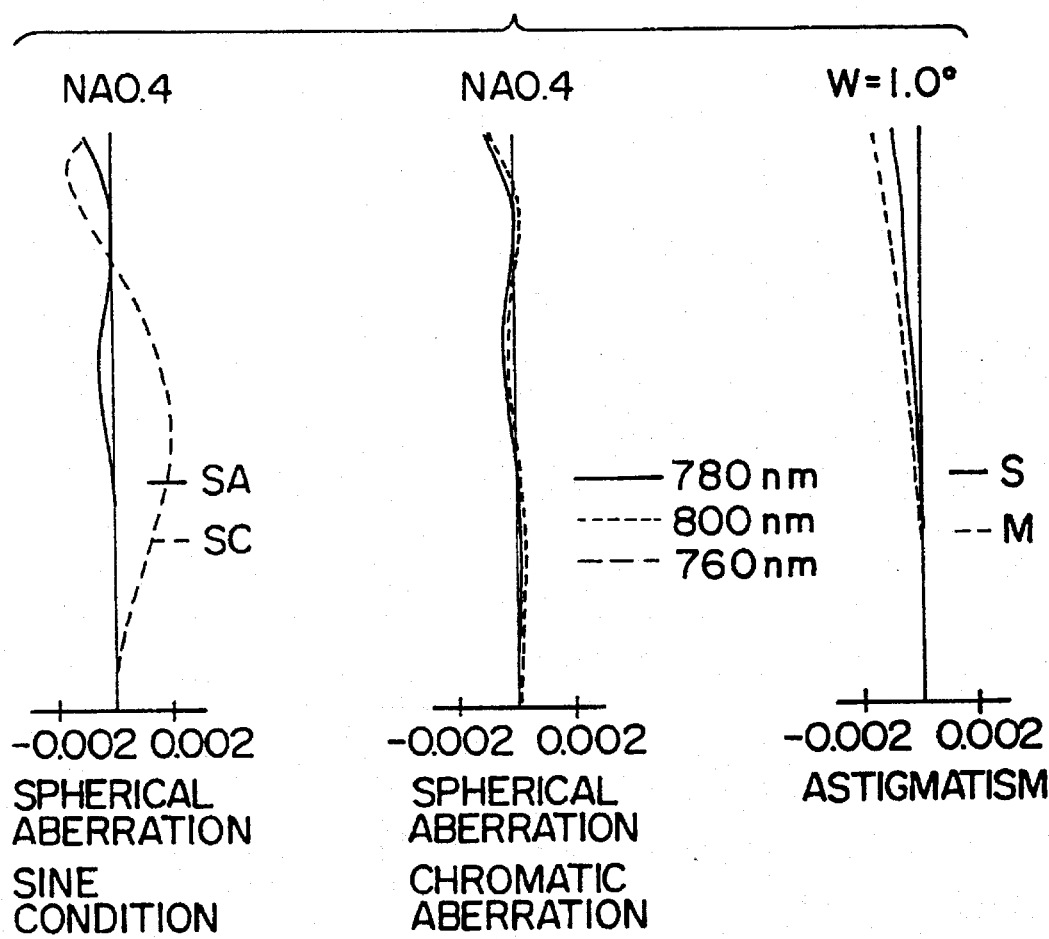
FIG. 52 are various aberration diagrams of the collimator lens shown in FIG. 51.

FIG. 51 shows Embodiment 18 of the collimator lens, with concrete numerical values of construction being shown in TABLE 30. The coefficients of the aspherical surface are omitted, because a converging lens of this Embodiment is the same as Embodiment 15. Various aberrations of this collimator lens are shown in FIG. 52.

Embodiment 18

Figure 55:
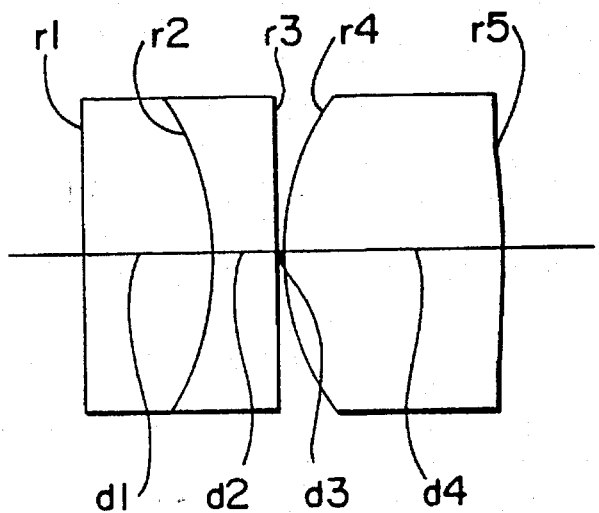
FIG. 55 is a lens diagram showing Embodiment 18 of an collimator lens according to the present invention.
Figure 56:
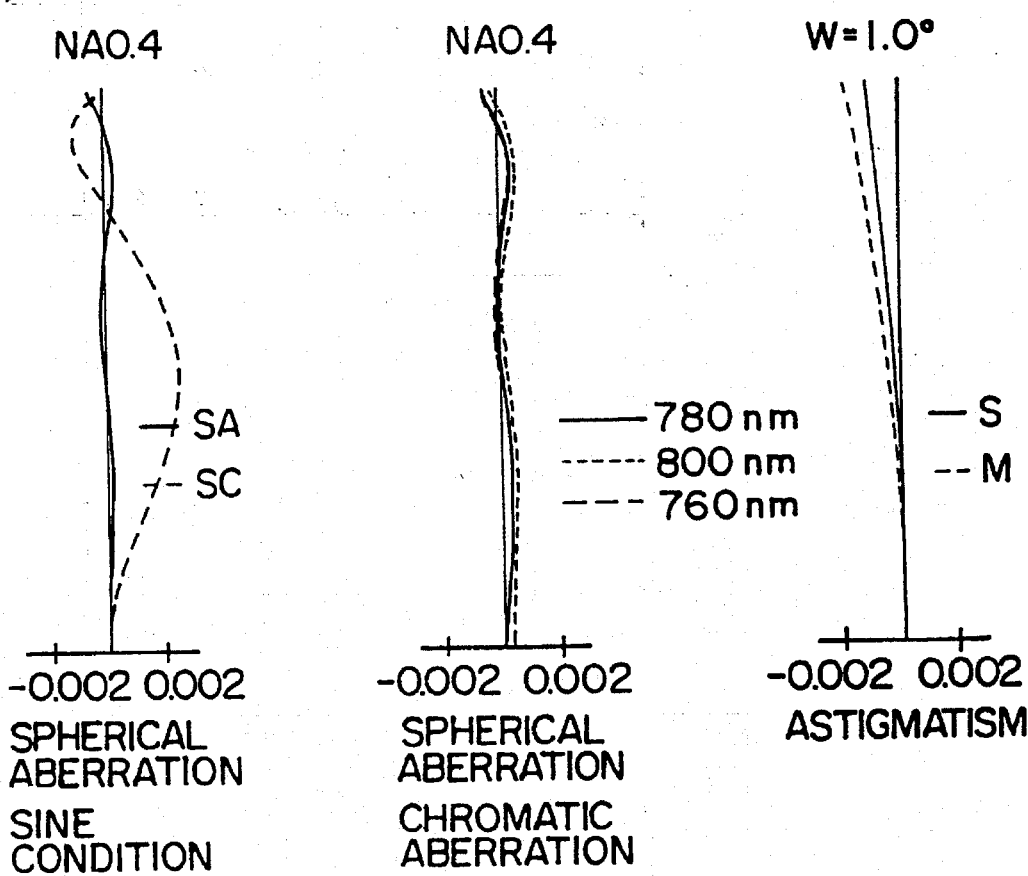
FIG. 56 are various aberration diagrams of the collimator lens shown in FIG. 55.

FIG. 55 shows Embodiment IS of the collimator lens with concrete numerical values for construction being shown in TABLE 33. The coefficients of the spherical surface are omitted, because a converging lens of this Embodiment is the same as Embodiment 17. Various aberrations of this collimator lens are shown in FIG. 56.

TABLE 30

NA = 0.4 f = 6.00 ω = −1.0 fb = 4.09 fcn = 6.00 Ac = 0.82

| surface number | r | d | nd | vd | Δn | glass material n780 | name |
|---|---|---|---|---|---|---|---|
| 1 | ∞ | 2.000 | 1.74100 | 52.6 | $-3.4 \times 10^{-5}$ | 1.73145 | LaK011 |
| 2 | −4.600 | 1.000 | 1.75000 | 25.1 | $-6.0 \times 10^{-5}$ | 1.73166 | SFS53 |
| 3 | ∞ | 0.100 | | | | | |
| 4 | 3.705 | 3.500 | 1.51633 | 64.1 | $-2.1 \times 10^{-5}$ | 1.51072 | BK7 |
| 5 | −12.051 | | | | | | |

Embodiment 17

Figure 53:
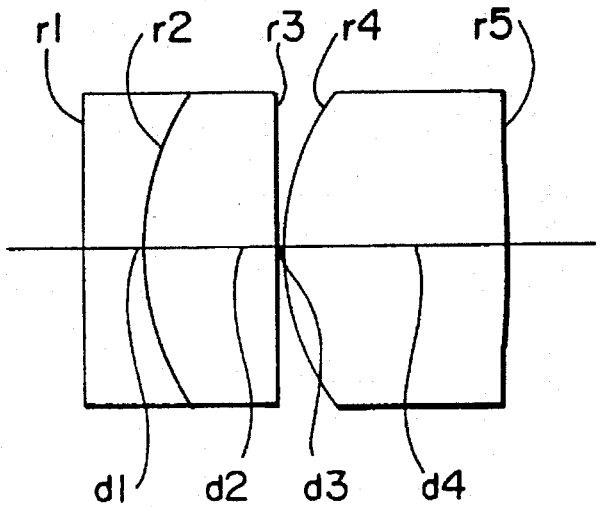
FIG. 53 is a lens diagram showing Embodiment 17 of an collimator lens according to the present invention.
Figure 54:
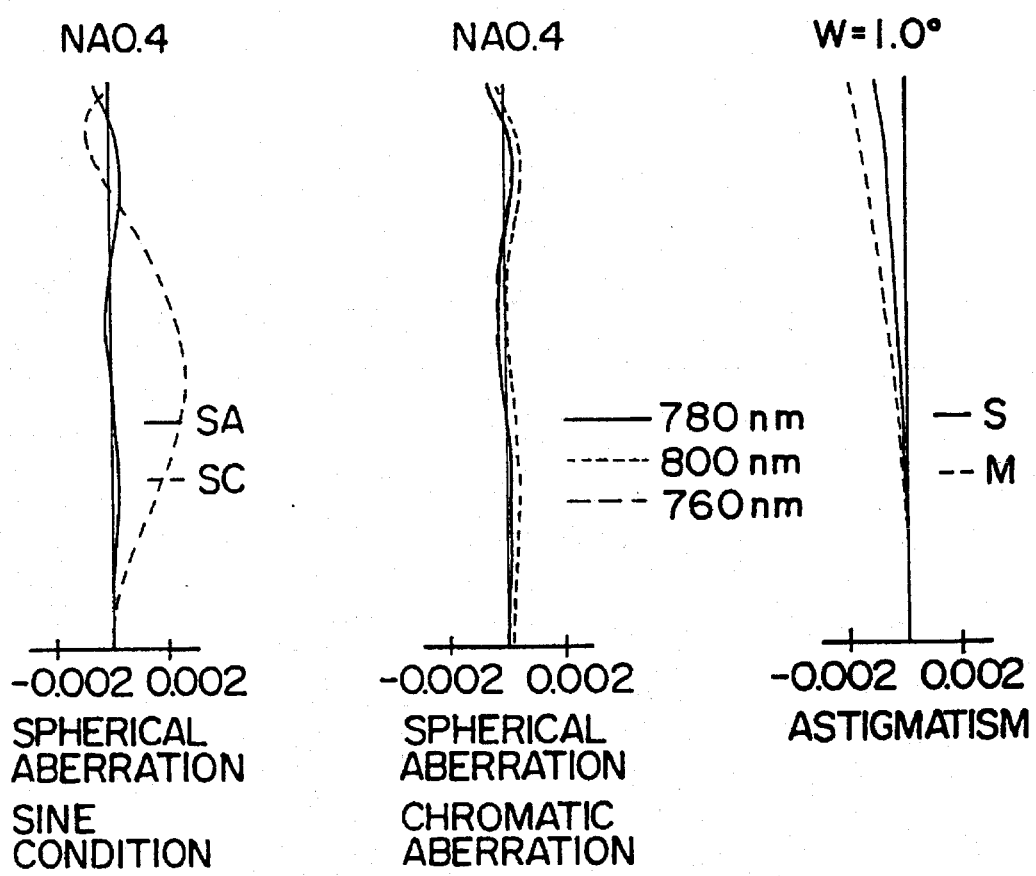
FIG. 54 are various aberration diagrams of the collimator lens shown in FIG. 53.

FIG. 53 shows Embodiment 17 of the collimator lens, with concrete numerical values of construction being shown in TABLE 31 and the coefficients of the aspherical surface of the converging lens are shown in TABLE 32. Various aberrations of this collimator lens are shown in FIG. 54.

TABLE 31

NA = 0.4 f = 6.00 ω = −1.0 fb = 3.97 fcn = 6.00 Ac = 0.82

| surface number | r | d | nd | vd | Δn | glass material n780 | name |
|---|---|---|---|---|---|---|---|
| 1 | ∞ | 1.000 | 1.75000 | 25.1 | $-6.0 \times 10^{-5}$ | 1.73166 | SFS53 |
| 2 | 4.600 | 2.000 | 1.74100 | 52.6 | $-3.4 \times 10^{-5}$ | 1.73145 | LaK011 |
| 3 | ∞ | 0.100 | | | | | |
| 4 | 3.804 | 3.500 | 1.58913 | 61.2 | $-2.4 \times 10^{-5}$ | 1.58252 | SK5 |
| 5 | −28.382 | | | | | | |

TABLE 33

| | NA = 0.4 f = 6.00 ω = −1.0 fb = 3.97 fcn = 6.00 Ac = 0.82 | | | | | | |
|---|---|---|---|---|---|---|---|
| surface | | | | | | glass material | |
| number | r | d | nd | vd | Δn | n780 | name |
| 1 | ∞ | 2.000 | 1.74100 | 52.6 | $-3.4 \times 10^{-5}$ | 1.73145 | LaK011 |
| 2 | −4.600 | 1.000 | 1.75000 | 25.1 | $-6.0 \times 10^{-5}$ | 1.73166 | SFS53 |
| 3 | ∞ | 0.100 | | | | | |
| 4 | 3.804 | 3.500 | 1.58913 | 61.2 | $-2.4 \times 10^{-5}$ | 1.58252 | SK5 |
| 5 | −28.382 | | | | | | |

Embodiment 19

Figure 57:
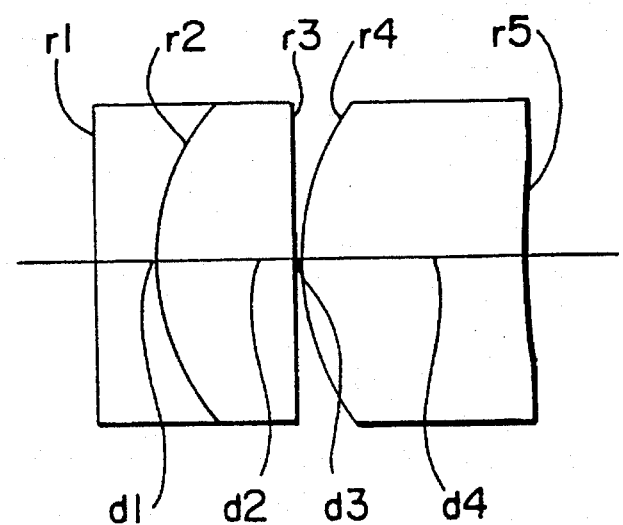
FIG. 57 is a lens diagram showing Embodiment 18 of an collimator lens according to the present invention.
Figure 58:
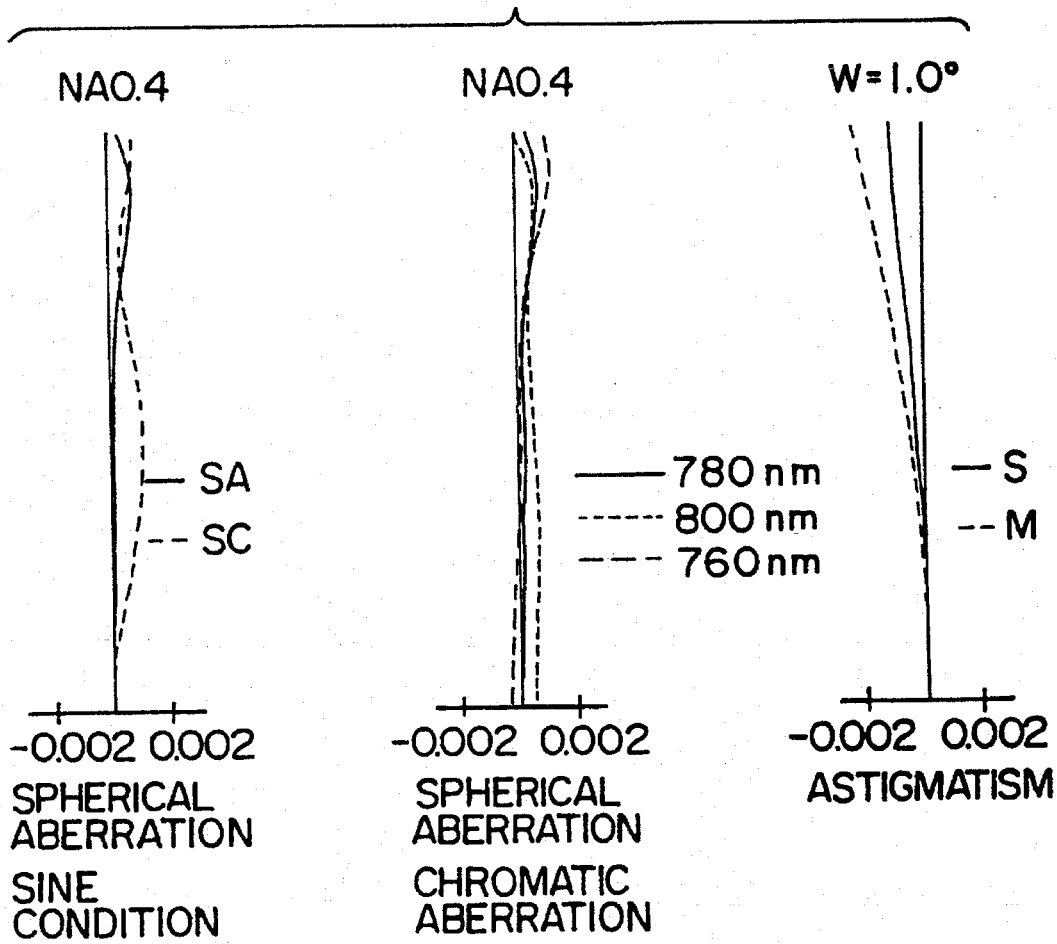
FIG. 58 are various aberration diagrams of the collimator lens shown in FIG. 57.

FIG. 57 shows Embodiment 19 of the collimator lens, with concrete numerical values of construction being shown in TABLE 34 and the coefficients of the aspherical surface of the converging lens are shown in TABLE 35. Various aberrations of this collimator lens are shown in FIG. 58.

TABLE 34

| | NA = 0.4 f = 6.00 ω = −1.0 fb = 3.63 fcn = 6.00 Ac = 0.81 | | | | | | |
|---|---|---|---|---|---|---|---|
| surface | | | | | | glass material | |
| number | r | d | nd | vd | Δn | n780 | name |
| 1 | ∞ | 1.000 | 1.75000 | 25.1 | $-6.0 \times 10^{-5}$ | 1.73166 | SFS53 |
| 2 | 3.500 | 2.000 | 1.74100 | 52.6 | $-3.4 \times 10^{-5}$ | 1.73145 | LaK011 |
| 3 | ∞ | 0.100 | | | | | |
| 4 | 3.724 | 3.500 | 1.73520 | 41.1 | $-4.0 \times 10^{-5}$ | 1.72359 | LaF8 |
| 5 | 15.895 | | | | | | |

TABLE 35

| 4th surface | 5th surface |
|---|---|
| $K = -0.2700 \times 10^{-1}$ | $K = 0.0000$ |
| $A4 = -0.4927 \times 10^{-3}$ | $A4 = 0.3254 \times 10^{-2}$ |
| $A6 = -0.2263 \times 10^{-4}$ | $A6 = -0.4674 \times 10^{-4}$ |
| $A8 = -0.1166 \times 10^{-5}$ | $A8 = 0.75947 \times 10^{-4}$ |
| $A10 = 0.1245 \times 10^{-5}$ | $A10 = 0.0000$ |

Embodiment 20

Figure 59:
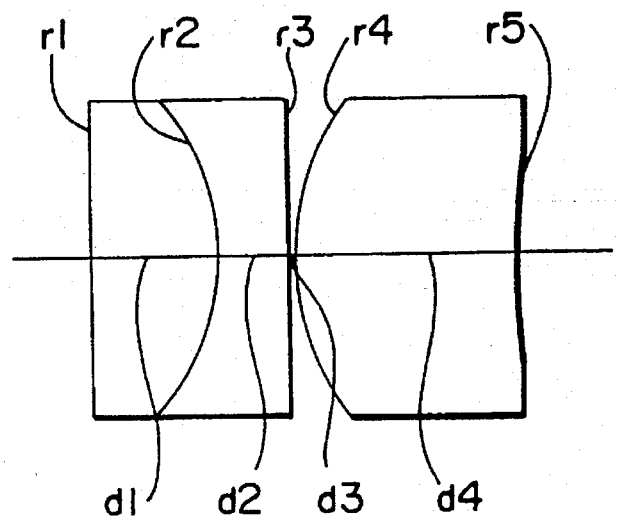
FIG. 59 is a lens diagram showing Embodiment 20 of all collimator lens according to the present invention.
Figure 60:
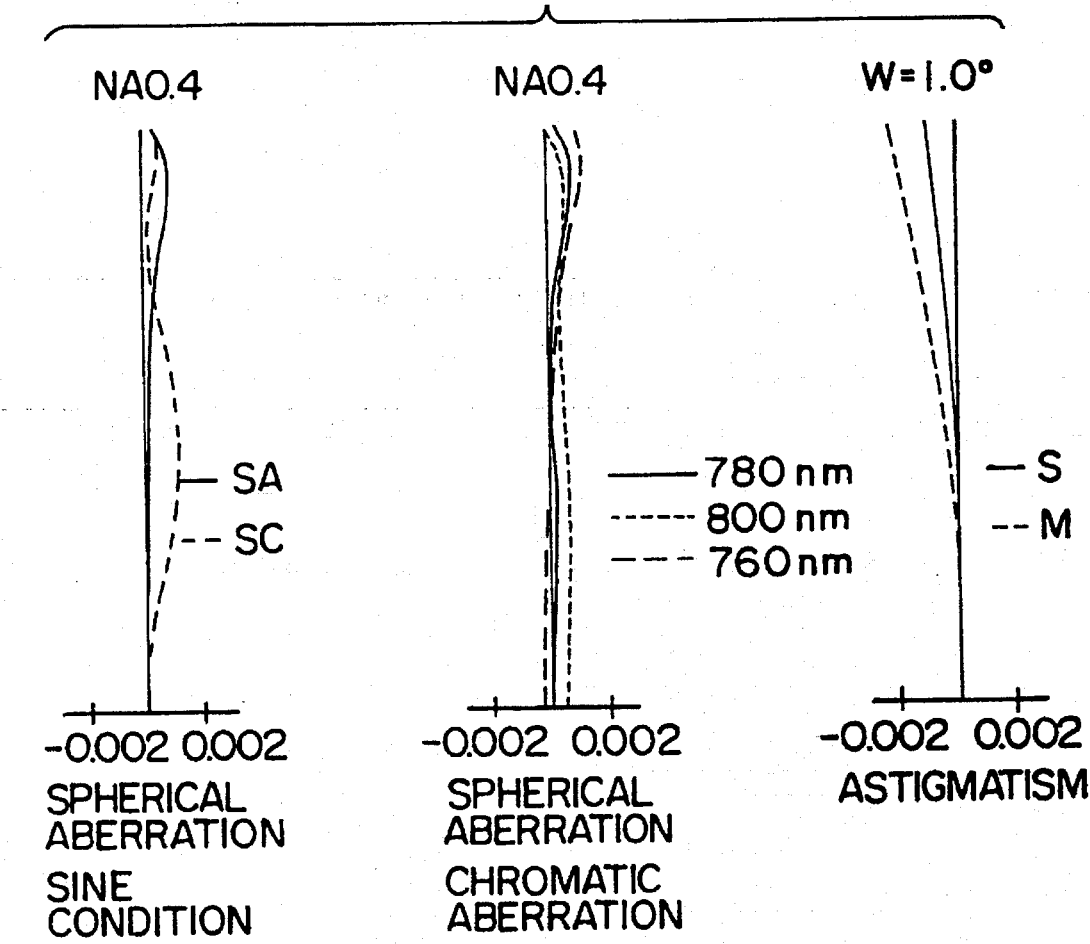
FIG. 60 are various aberration diagrams of the collimator lens shown in FIG. 59.

FIG. 59 shows Embodiment 20 of the collimator lens with concrete numerical values of construction being shown in TABLE 36. The coefficients of the aspherical surface are omitted, because a converging lens of this Embodiment is the same as Embodiment 19. Various aberrations of this collimator lens are shown in FIG. 60.

TABLE 36

| | NA = 0.4 f = 6.00 ω = −1.0 fb = 3.63 fcn = 6.00 Ac = 0.81 | | | | | | |
|---|---|---|---|---|---|---|---|
| surface | | | | | | glass material | |
| number | r | d | nd | vd | Δn | n780 | name |
| 1 | ∞ | 2.000 | 1.74100 | 52.6 | $-3.4 \times 10^{-5}$ | 1.73145 | LaK011 |
| 2 | −3.500 | 1.000 | 1.75000 | 25.1 | $-6.0 \times 10^{-5}$ | 1.73166 | SFS53 |
| 3 | ∞ | 0.100 | | | | | |
| 4 | 3.724 | 3.500 | 1.73520 | 41.1 | $-2.4 \times 10^{-5}$ | 1.72359 | LaF8 |
| 5 | 15.895 | | | | | | |

The present invention is not limited to the material combinations shown in the above mentioned embodiments, SP13(Merchandise Name:Ohara), SF854(Merchandise Name: Minolta Camera) and SFL14(Merchandise Name: Ohara) can be used as a negative lens and LaKO9(Merchandise Name: Ohara), LaSK02(Merchandise Name: Ohara). LaFO4(Merchandise Name: Ohara) and LaSKO1(Merchandise Name: Ohara) can be used as a positive lens. Material data of these materials are as follows.

TABLE 37

| | Glass material name | λ | nλ | vd | Δn |
|---|---|---|---|---|---|
| (A) negative lens | SF13 | 780 nm | 1.72421 | 27.80 | $-5.5 \times 10^{-5}$ |
| positive lens | LaK09 | | 1.72437 | 51.50 | $-3.4 \times 10^{-5}$ |
| (B) negative lens | SFS54 | 830 nm | 1.77372 | 22.60 | $-6.5 \times 10^{-5}$ |
| positive lens | LaSK02 | | 1.77419 | 50.00 | $-3.2 \times 10^{-5}$ |
| (C) negative lens | SFL14 | 670 nm | 1.75224 | 26.50 | $-9.4 \times 10^{-5}$ |
| positive lens | LaF04 | | 1.75145 | 47.80 | $-5.6 \times 10^{-5}$ |
| (D) negative lens | SFS53 | 670 nm | 1.74009 | 25.14 | $-9.6 \times 10^{-5}$ |
| positive lens | LaSK01 | | 1.74990 | 52.30 | $-5.1 \times 10^{-5}$ |

If both side surfaces are plane, and a converging lens is formed of FK01, above combinations make lenses which have the following characteristics.

TABLE 38

| Combination | \|rs\| | Δnn–Δnp | fcn | ncn | Δncn | Ac |
|---|---|---|---|---|---|---|
| (A) | 4.624 | $-2.1 \times 10^{-5}$ | 6.00 | 1.49282 | $-1.5 \times 10^{-5}$ | 0.90 |
| (B) | 6.800 | $-2.8 \times 10^{-5}$ | 6.01 | 1.49282 | $-1.4 \times 10^{-5}$ | 0.87 |
| (C) | 6.000 | $-3.8 \times 10^{-5}$ | 5.98 | 1.49483 | $-2.2 \times 10^{-5}$ | 0.85 |
| (D) | 7.300 | $-4.5 \times 10^{-5}$ | 5.98 | 1.49483 | $-2.2 \times 10^{-5}$ | 0.83 |

Figure 61:
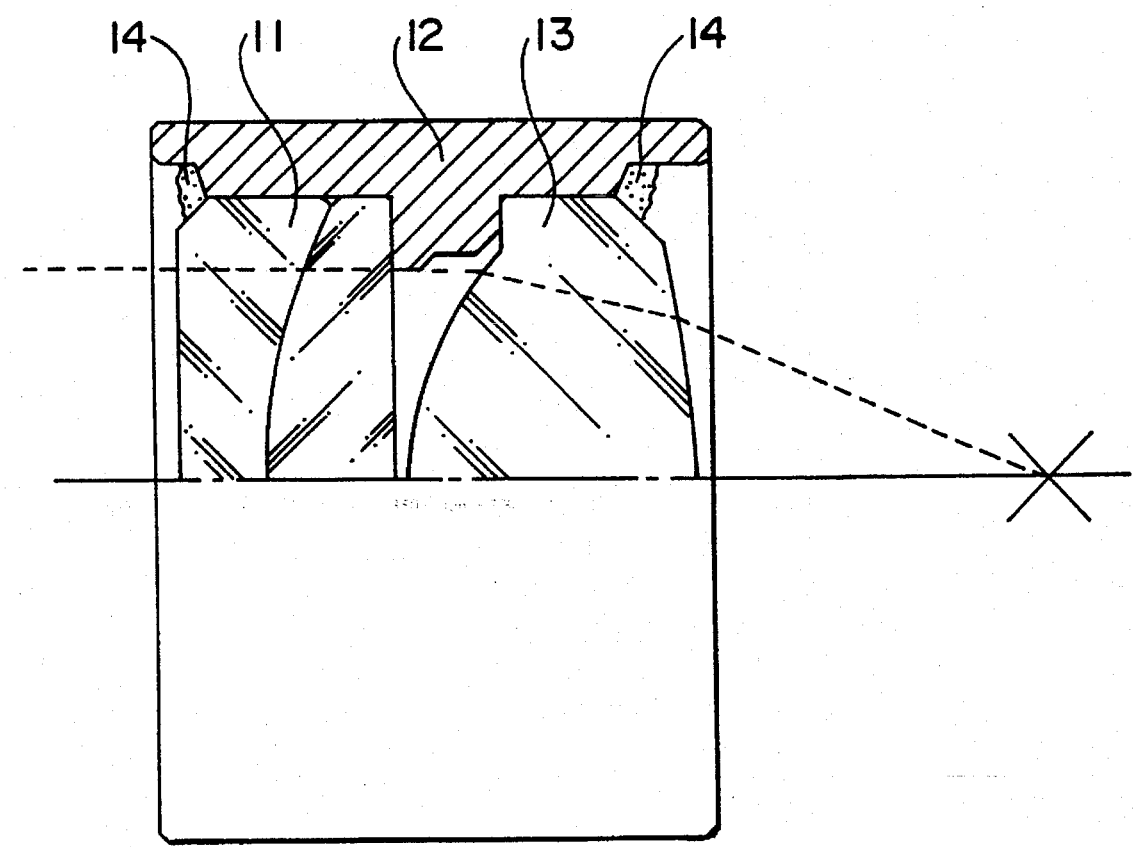
FIG. 61 is a sectional view of the chromatic aberration correction element and the converging lens installed in a lens barrel.

FIG. 61 shows the example of 1 composition in the case of containing a collimator lens to a lens barrel. The chromatic aberration correction element 11 is inserted in lens barrel 12 from the left-hand side in the figure. The converging lens 13 is inserted in lens barrel 12 from the right-hand side in the figure. These elements and lens are attached to the inner direction flange prepared in the central part in an optical axis direction of lens barrel 12, and are fixed to lens barrel 12 by adhesives 14.

In addition, since chromatic aberration correction element 11 has almost no power, even if the chromatic aberration correction element 11 is decentered from the converting lens 13, deterioration of aberration is small. Therefore, it is not necessary that these element and lens are fixed to the lens barrel 12 accurately.

Figure 62:
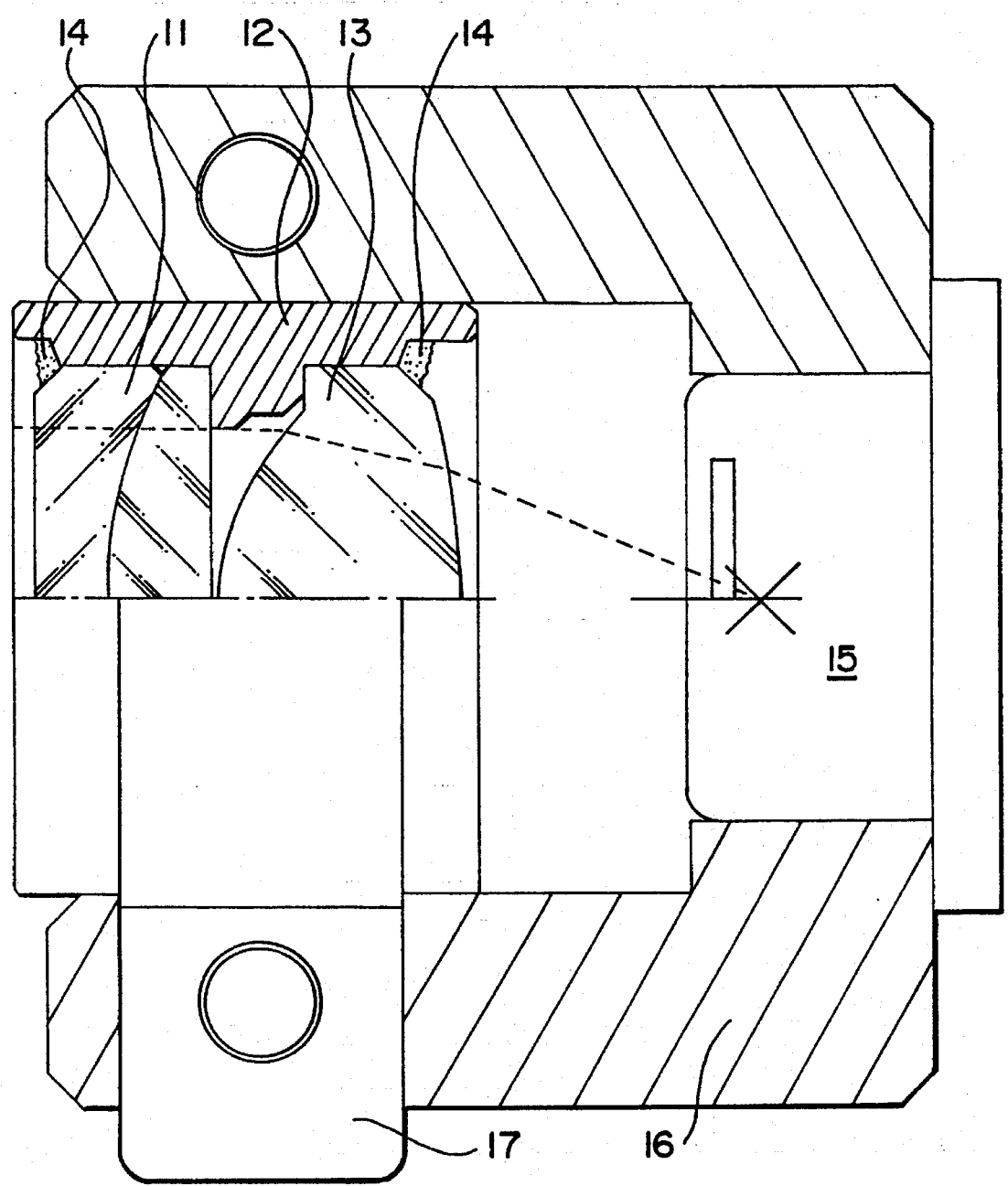
FIG. 62 is a sectional view of the collimator lens and the semiconductor laser installed in a holder.

FIG. 62 shows the composition which attached the collimator lens unit as mentioned above in holder 16 holding semiconductor laser 15. Since it needs to regulate the distance between a collimator lens and semiconductor laser according to variation in the light emitting point for every product of semiconductor laser, the lens barrel 12 of a collimator lens is fixed by a leaf spring 17 and can be slide in the direction of an optical axis.

The converging lens of the embodiments are corrected in any aberrations except for a chromatic aberration, when a chromatic aberration does not need to be corrected fully, it can be used by the converging lens as a single element. For this reason, it can raise mass-production effect of a converging lens.

Moreover, since a center use wavelength is controlled by changing radius curvature of the cemented surface of a chromatic aberration correction element, a converging lens can be shared to a different operating wavelength.

What is claimed is:

1. A collimating lens system for an optical system using a laser, for collimating a divergent beam of light, said collimating lens system comprising:

a converging lens which has both surfaces formed as aspherical surfaces; and a chromatic aberration correction element adapted to correct a chromatic aberration of said converging lens, said element being constructed of positive and negative lenses cemented to each other, said positive lens and said negative lens having substantially the same refractive index, and having different dispersion.

2. A collimating lens system for an optical system using a laser.

3. A collimating lens system for an optical system using a laser according to claim 1, said lens satisfying the following conditions;

$$0.50 < |f\,cn \times Cs X(\Delta n\,n + \Delta n p)\,(n\,cn-1)/\Delta n\,cn| < 1.50$$

$$|n\,p - n\,n| < 0.03$$

$$n\,dn > 1.70$$

$$v\,dn > 30$$

wherein, f cn is a focal length in center use wavelength of the converging lens, C s is the curvature of the cemented surface between the positive lens and negative lens, Δ n n is the changing ratio of the refractive index of the negative lens to the change of wavelength, Δ n p is the changing ratio of the refractive index of the positive lens to the change of wavelength, n cn is a refractive index in center use wavelength of the converging lens, Δ n cn is a changing ratio of the refractive index to a change of wavelength, n p is a refractive index in center use wavelength of the positive lens of the chromatic aberration correction element, n n is a refractive index in center use wavelength of the negative lens of the chromatic aberration correction element, n dn is a refractive index in the wavelength 588 nm(d-line) of the negative lens of the chromatic aberration correction element, and v dn is an Abbe number of the negative lens of the chromatic aberration correction element.

4. A collimating lens system for an optical system using a laser according to claim 1, both surfaces of said converging lens being formed of convex aspherical surfaces.

5. A collimating lens system for an optical system using a laser according to claim 1, said converging lens transforming a divergent beam of light emitted by a light source into a parallel beam of light.

6. A collimating lens system for an optical system using a laser according to claim 1, said collimating lens system satisfying the following relation:

$$|f/fa| < 0.20$$

wherein a focal length of said collimating lens system is represented by f, and a focal length of said chromatic aberration correction element is represented by fa.

7. An optical system using a laser and comprising an objective lens and a collimating lens system, said collimating lens system comprising:
- a converging lens which has both surfaces formed as aspherical surfaces;
- a chromatic aberration correction element adapted to correct a chromatic aberration of said converging lens, said chromatic aberration correction element being constructed of positive and negative lenses cemented to each other, said positive lens and said negative lens having substantially the same refractive index, and having different dispersion.

8. An optical system according to claim 7, both surfaces of said converging lens being formed of convex aspherical surfaces.

9. An optical system according to claims 7, said converging lens transforming a divergent beam of light emitted by a light source into a parallel beam of light.

10. An optical system according to claim 7, wherein said collimating lens system satisfying the following relation:

$$|f/fa| < 0.20$$

wherein a focal length of said collimating lens system is represented by f, and a focal length of said chromatic aberration correction element is represented by fa.

11. An optical system according to claim 7, wherein said positive lens is a plano-convex lens and said negative lens is a plano-concave lens.

* * * * *

UNITED STATES PATENT AND TRADEMARK OFFICE
CERTIFICATE OF CORRECTION

PATENT NO. : 5,491,587
DATED : February 13, 1996
INVENTOR(S) : M. IWAKI et al.

It is certified that error appears in the above-indentified patent and that said Letters Patent is hereby corrected as shown below:

At column 26, line 19 (claim 2, line 3), after "laser" insert --- according to claim 1, wherein said positive lens is a plano-convex lens and said negative lens is a plano-concave lens---.

Signed and Sealed this

Fourth Day of February, 1997

Attest:

BRUCE LEHMAN

Attesting Officer          Commissioner of Patents and Trademarks